(12) United States Patent
Yokoi

(10) Patent No.: US 6,781,105 B2
(45) Date of Patent: Aug. 24, 2004

(54) OPTICAL INFORMATION RECORDING EMPLOYING IMPROVED RECORDING POWER CONTROL SCHEME

(75) Inventor: Kenya Yokoi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/465,639

(22) Filed: Jun. 20, 2003

(65) Prior Publication Data

US 2004/0011945 A1 Jan. 22, 2004

Related U.S. Application Data

(62) Division of application No. 09/987,125, filed on Nov. 13, 2001, now Pat. No. 6,664,526.

(30) Foreign Application Priority Data

| Nov. 15, 2000 | (JP) | 2000-348777 |
| Nov. 27, 2000 | (JP) | 2000-360017 |
| Nov. 29, 2000 | (JP) | 2000-362367 |
| Jan. 11, 2001 | (JP) | 2001-003409 |

(51) Int. Cl.[7] ............................................. G02B 7/04
(52) U.S. Cl. ............................... 250/201.5; 250/205
(58) Field of Search ............................ 250/201.5, 205; 369/59.19, 59.17, 59.11, 47.5, 47.51, 47.15

(56) References Cited

U.S. PATENT DOCUMENTS

| 5,732,062 A | 3/1998 | Yokoi et al. |
| 6,426,929 B1 | 7/2002 | Watabe et al. |
| 6,459,666 B1 | 10/2002 | Yokoi |
| 6,487,149 B1 | 11/2002 | Yokoi et al. |
| 6,664,526 B2 * | 12/2003 | Yokoi .................... 250/201.5 |

FOREIGN PATENT DOCUMENTS

| JP | 54-143109 | 11/1979 |
| JP | 57-092438 | 6/1982 |
| JP | 57-60696 | 12/1982 |
| JP | 2-13372 | 4/1990 |
| JP | 5-225570 | 9/1993 |
| JP | 10-106008 | 4/1998 |

* cited by examiner

*Primary Examiner*—Que T. Le
(74) *Attorney, Agent, or Firm*—Dickstein Shapiro Morin & Oshinsky LLP

(57) ABSTRACT

A disk apparatus performs optical recording onto an optical disk with a record mark by using a light beam modulated in a manner of multi-pulse series, includes. A detection pulse generating part generates a detection pulse to replace the multi-pulse series; and a detection power control part controls the power of the detection pulse to be smaller than the power of the multi-pulse series.

36 Claims, 35 Drawing Sheets

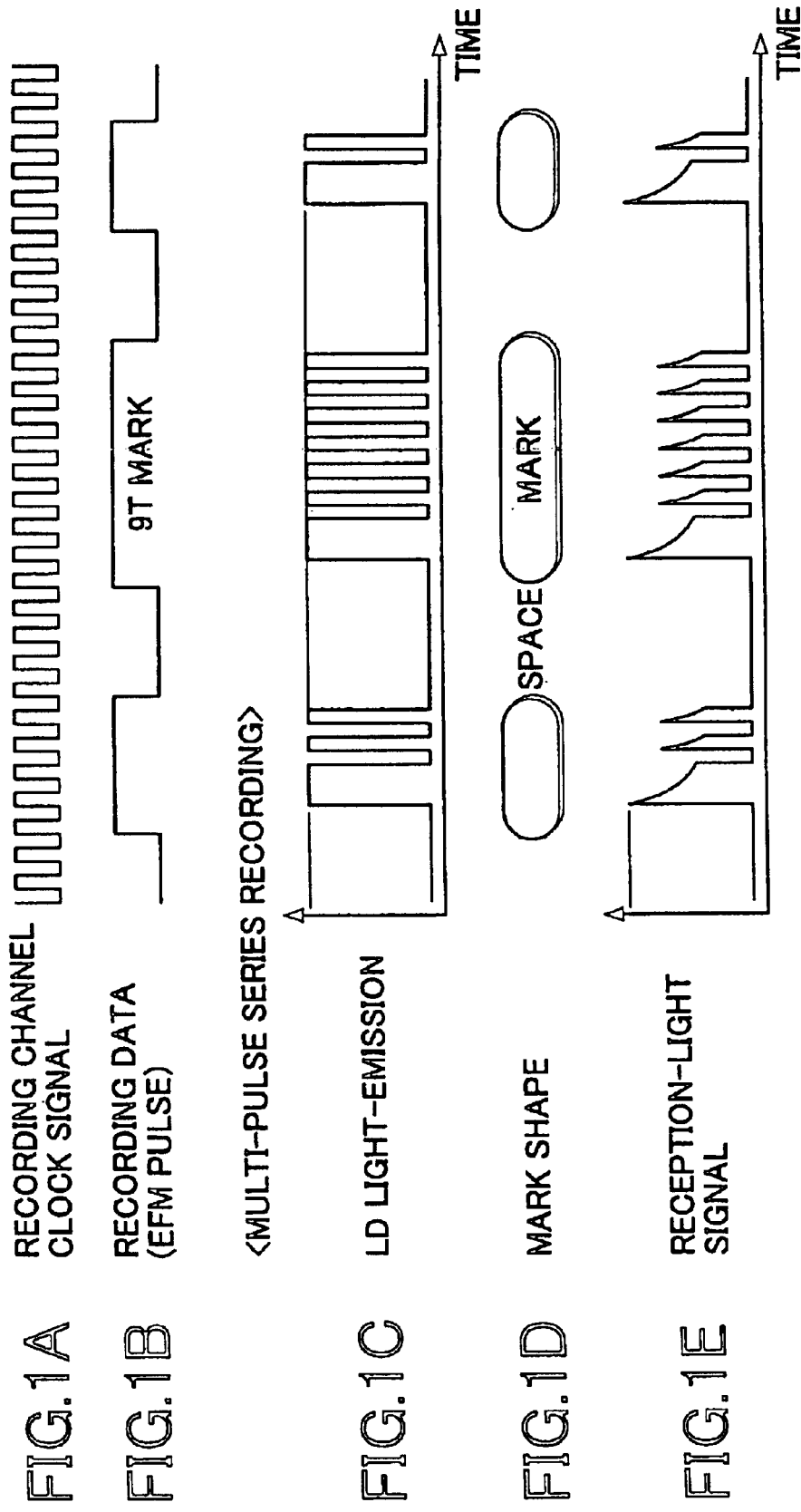

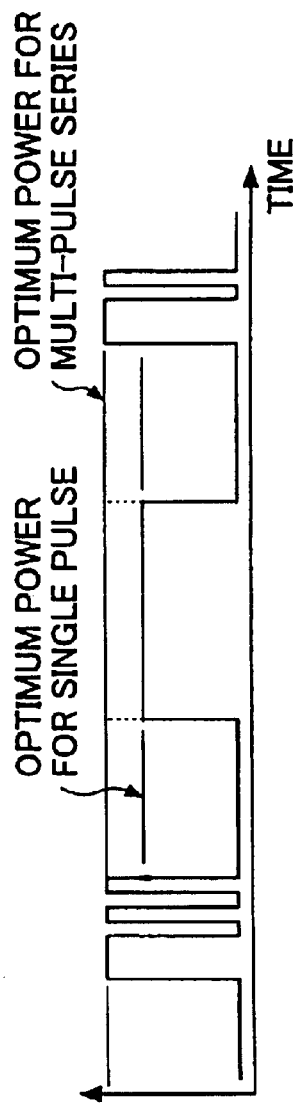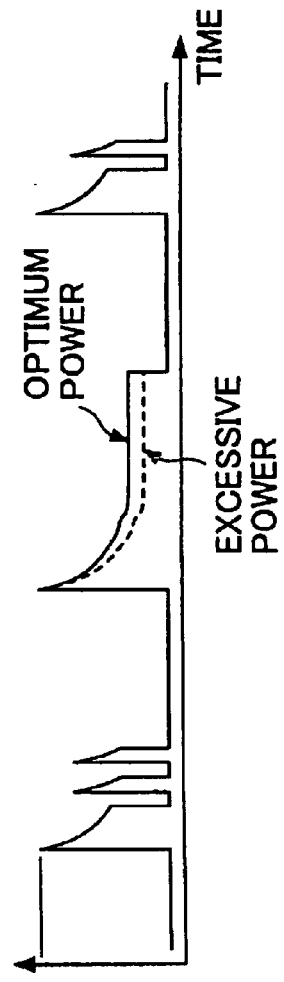

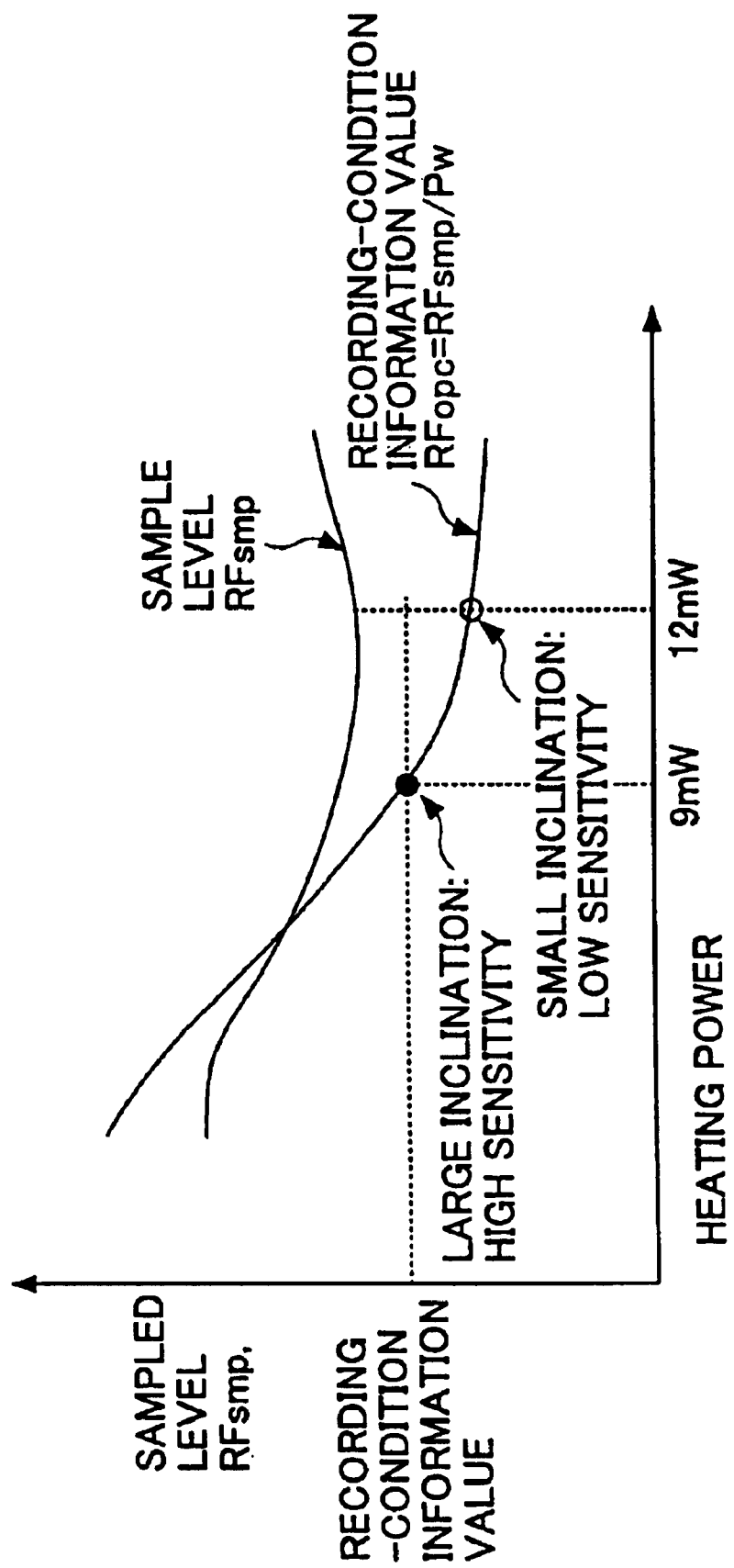

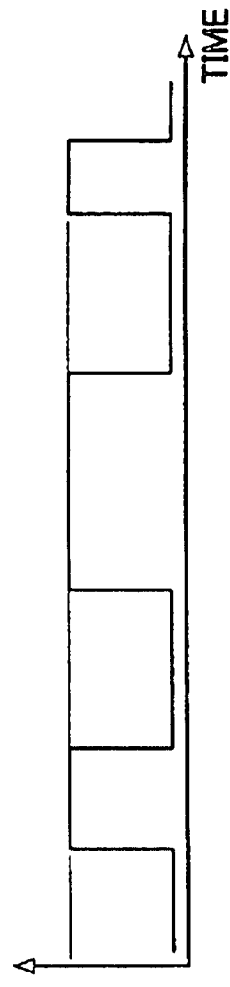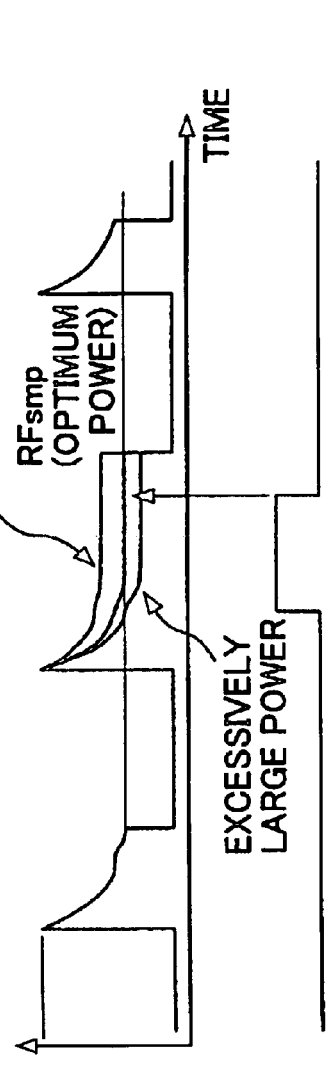
FIG. 4A  RECORDING CHANNEL CLOCK SIGNAL
FIG. 4B  RECORDING DATA (EFM PULSE) — 9T MARK
<SINGLE-PULSE RECORDING>
FIG. 4C  LD LIGHT-EMISSION
FIG. 4D  MARK SHAPE — SPACE, MARK
FIG. 4E  RECEPTION-LIGHT SIGNAL — EXCESSIVELY SMALL POWER, RFsmp (OPTIMUM POWER), EXCESSIVELY LARGE POWER
FIG. 4F  HOLD PULSE
FIG. 4G  SAMPLE PULSE

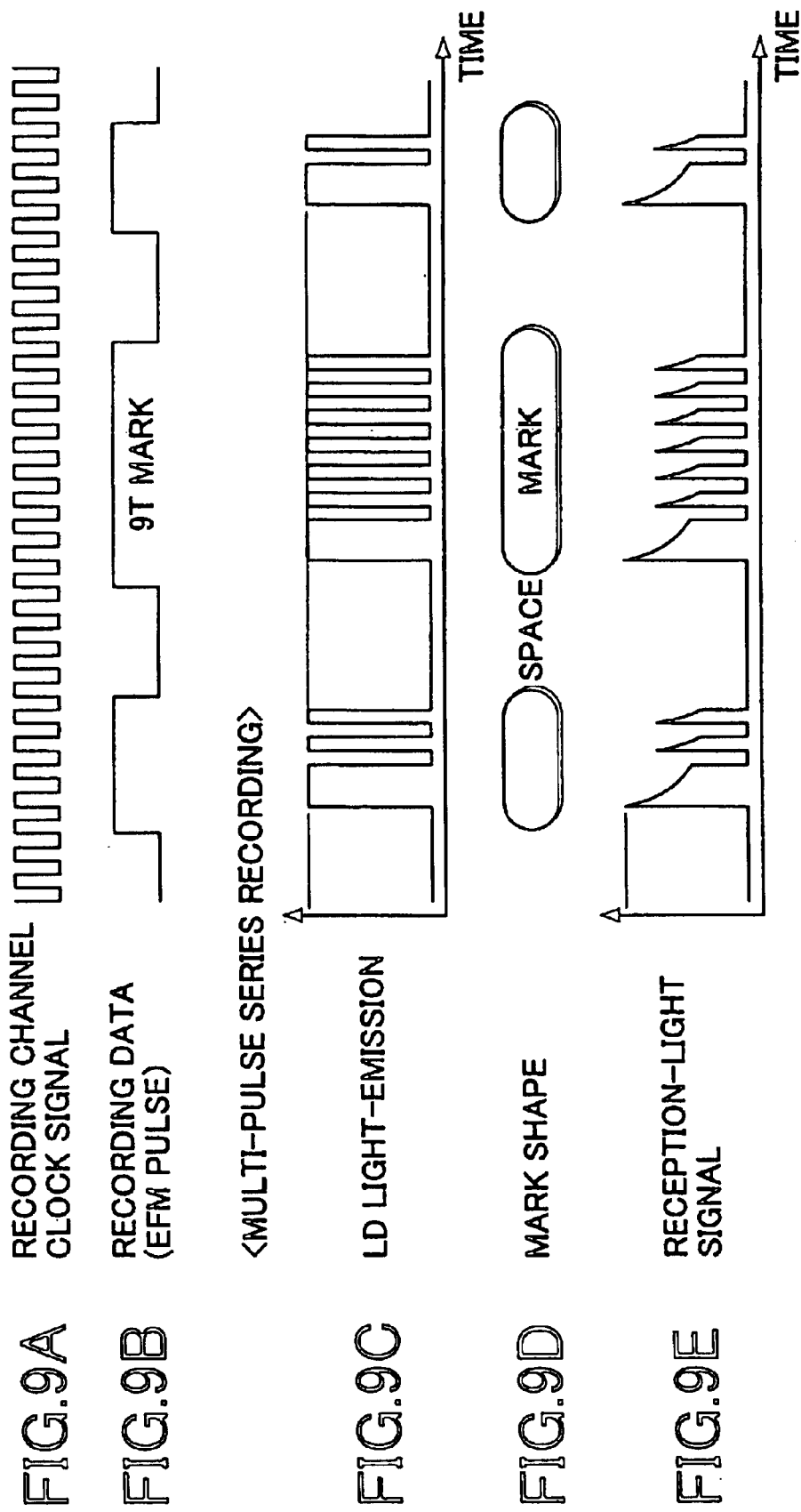

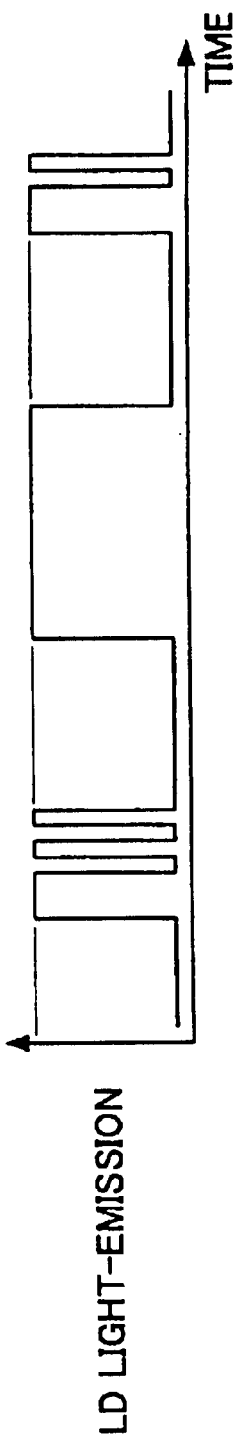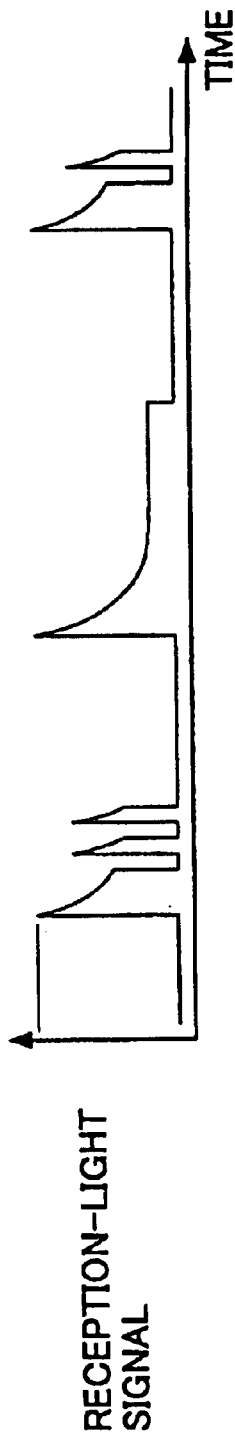
<REPLACE MULTI-PULSE SERIES BY DETECTION PULSE>
FIG.9F  LD LIGHT-EMISSION
FIG.9G  MARK SHAPE
FIG.9H  RECEPTION-LIGHT SIGNAL

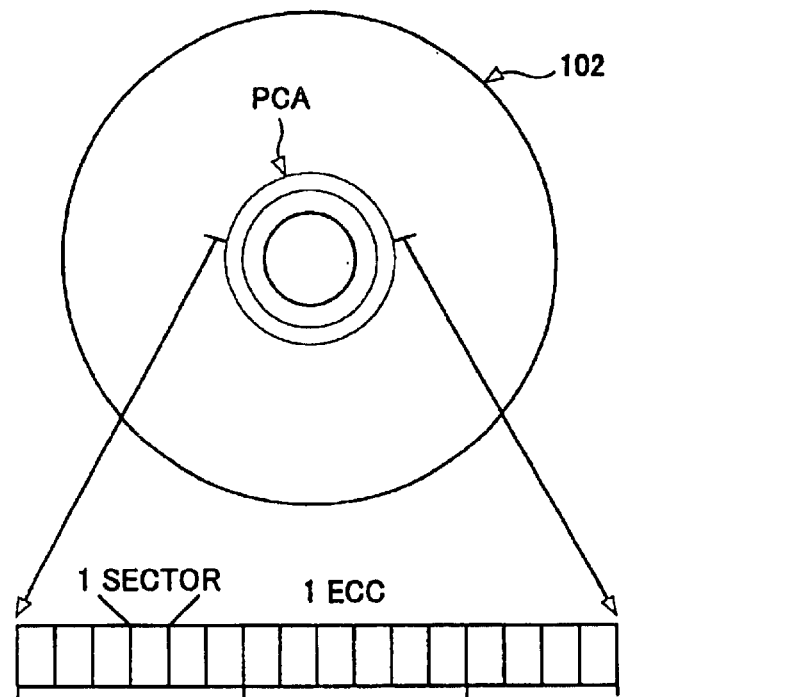
FIG.12A
FIG.12B
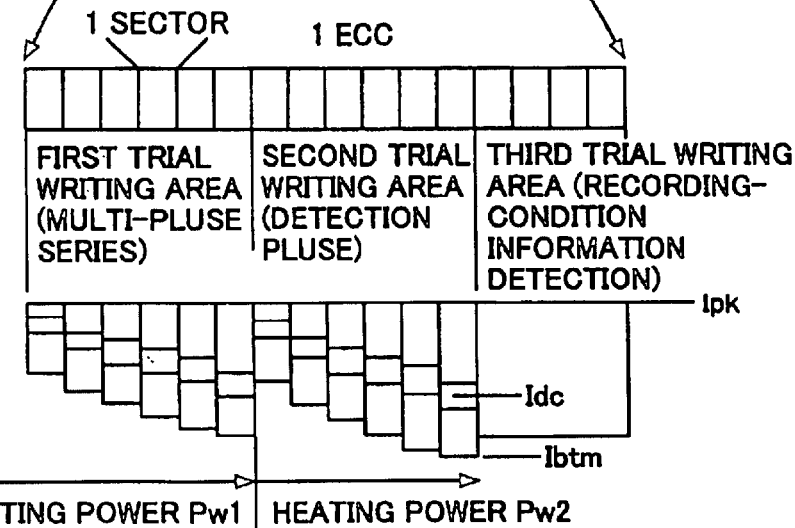
FIG.12C
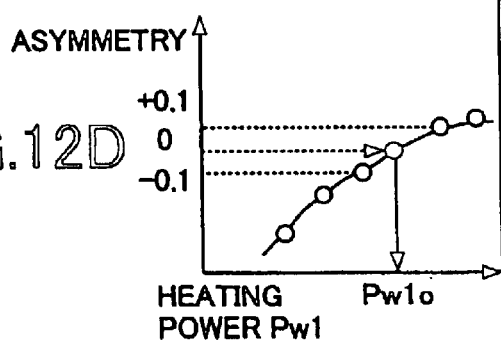
FIG.12D

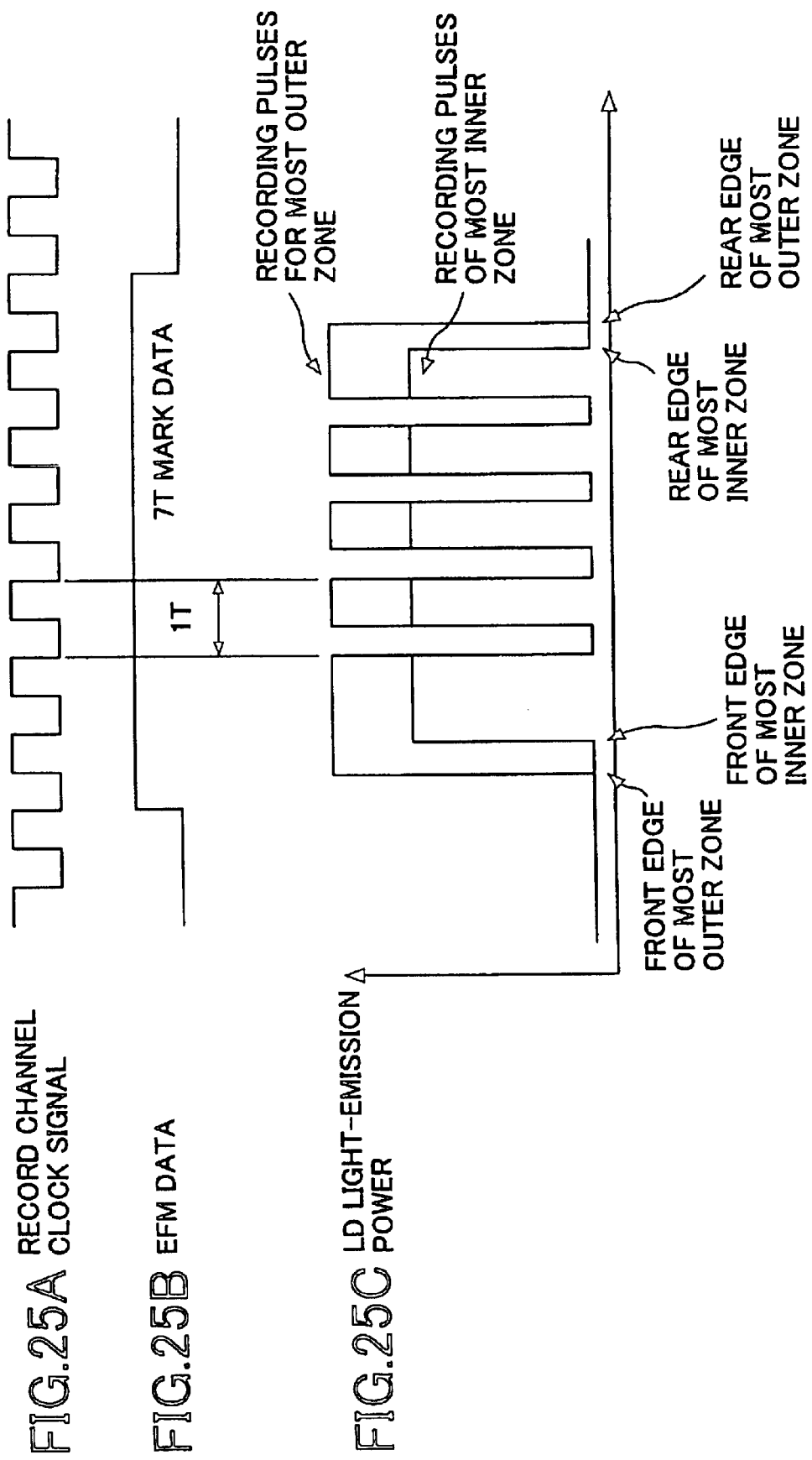

DEVIDED RECORDING ZONE

OPTICAL INFORMATION RECORDING EMPLOYING IMPROVED RECORDING POWER CONTROL SCHEME

This application is a divisional of application Ser. No. 09/987,125 filed on Nov. 13, 2001, now U.S. Pat. No. 6,664,526, which claims priority under 35 U.S.C. 119 to the following foreign applications: Japanese Application No. 2000-348777, dated Nov. 15, 2000; Japanese Application No. 2000-360017, dated Nov. 27, 2000; Japanese Application No. 2000-362367, dated Nov. 29, 2000; and Japanese Application No. 2001-003409, dated Jan. 11, 2001, which are hereby incorporated by reference.

BACKGROUND OF THE INVENTION

1. Field of the Invention

The present invention generally relates to an optical information recording, and, also, the present invention relates to optical information recording to be performed on an optical disk media, such as DVD-R (Digital Video or Versatile Disk, Recordable), a DVD-RW (ReWriteable), or the like, having compatibility in format with DVD media such as DVD, DVD-ROM of read-only type.

2. Description of the Related Art

A single pulse recording manner as shown in FIGS. 4C and 4D using such a light-emission waveform of an LD (Laser Diode) which is a light source to be applied to an optical disk is used as a general record waveform for CD-R. According to the recording manner, a recording power level which may have two values, or modify a rear edge of a heating pulse for the shortest data length, and, thereby, attains mark edge (PWM) recording. Information is given to both edges of the record mark according to such a PWM recording manner.

However, when this single pulse recording manner as shown in FIG. 4C is used as a recording waveform in a large data recording on a DVD-R, etc., since a record mark may include a distortion into a shape like a tear due to heat storage, or the edge may shift according to a data length, remarkably, as shown in FIG. 4D. Thereby, it may be difficult to provide a non-problematic jitter characteristic according to the single pulse recording manner.

For this reason, a multi-pulse recording manner as shown in FIGS. 9C and 9D employing such a light-emission waveform from an LD which is a light source of the laser to be applied to an optical disk may be used. Thereby, the duty of the heating pulses is adjusted, and, as a result, a proper recording power can be applied such as to result in record marks as shown in FIG. 9D, in which the influence of heat storage may be easily eliminated, and edge shift at both edges of a record mark can be effectively reduced.

However, when performing data recording according to the above-described single pulse recording manner, it is possible to know the formation state of a mark during recording by detecting the luminous energy of light reflected by the optical disk as a light-receiving signal waveform shown in FIG. 4E for a single pulse interval.

Therefore, even when recording is made while the recording power changes, the signal which shows a change in luminous energy of reflected light can be obtained. Thereby, data record can be performed with controlling to correct deviation of the recording power occurring due to LD power fluctuation, tilt error, media sensitivity unevenness, etc., in accordance with the state of this change in the luminous energy thus detected. Such a control scheme is generally referred to as an R-OPC (Running-Optimum Power Control) scheme.

Japanese Patent Publication No. 2-13372 discloses a technique of feeding reflected light back to a laser, and determining whether or not recording is properly performed based on change along a time axis of the laser-light detection signal obtained simultaneously with the recording.

However, according to the multi-pulse recording scheme described above with reference to FIG. 9C suitable for a large data recording occasion, as shown in FIG. 9E, since the luminous energy of the reflected light decreases rapidly by the interception pulse before detecting change in luminous energy of the reflected light due to the recording power, then, the luminous energy of the reflected light increases rapidly by the heating pulse applied again, and, thus, the light-emission state of the LD changes by short time intervals, it may be difficult to detect luminous-energy change for a constant power required in order to determine the formation state of a mark, and, thus, it may be difficult to properly perform controlling the power by the R-OPC.

With spread of multimedia, media only for reading such as DVD, DVD-ROM, write-once-type media such as DVD-R employing a pigment material as a recording layer, rewriteable media such as DVD-RW employing a phase-change material have been developed.

The information (sectors, in this example) recorded on such DVD media has a format as shown in FIG. 10A. According to this format, as shown in FIG. 10A, data (sectors) is continuously recorded at a fixed line density on all the tracks of the medium.

In order to prepare an information recording medium having a format having a compatibility with media for only reading, information is recorded at a frequency of a fixed recording channel clock signal while controlling the rotation speed of the medium to be inverse proportion to the track radius using a CLV (Constant Linear Velocity) scheme as shown in FIG. 10B, and, thereby, the line velocity on the track is made fixed.

However, in order to control the rotation speed of disk by the CLV scheme, to always make the line velocity on the track constant, it is necessary to change the rotation speed of the disk appropriately. For this purpose, a spindle motor which rotationally drives the disk medium should provide a large torque so as to perform velocity shift, and thus should be of a large-sized, expensive type. Moreover, as a time is required for completing a predetermined velocity shift, an extra time may be taken for accessing the disk medium as compared with HDD, MO drive, etc., for this reason.

In order to avoid necessity of rotation speed shift in recording data onto a disk medium, a recording format such as that shown in FIG. 11A may be employed. That is, as shown in FIG. 11C, the frequency of a channel clock signal to be recorded onto the disk medium is controlled as being in proportion to the radius of the track such that the frequency becomes larger as the track radius increases. Thereby, since the recording line velocity is large at the perimeter zone but is small at the central zone, as shown in FIG. 11D, the recording line density can be made fixed. It is thus possible to perform information recording on the disk medium according to a CAV (Constant Angular Velocity) scheme in which the rotation speed of the disk medium is fixed as shown in FIG. 11B.

Thereby, according to this manner, it becomes not necessary to perform control of variable rotational speed of a spindle motor which rotationally drives the disk medium, and, thus, the spindle motor should not have a large torque, and, thus, may be a small, inexpensive one. Moreover, since no rotation speed change is needed, any extra time occurring due to the velocity change is needed, and, thus, it is possible to shorten the access time needed for seeking a desired track on the disk medium.

However, the pulse width and recording power of a recording pulse series by laser light-emission for recording are optimized with respect to a specific recording line velocity for a DVD-R medium employing a pigment-made recording layer, or a phase-change medium for which, generally, a pit (mark) is formed on the disk medium at a heat mode. Therefore, the state of the mark formed or space therebetween differ at a different recording line velocity. That is, when the pulse width or recording power differ, the heat energy required for formation of a mark may vary, and, the heating temperature which can be reached varies for every mark length with respect to the optimum deformation temperature differs, and, thereby, average mark length may vary, and optimum pulse width may vary. As a result, it becomes not possible to obtain a uniform mark length, and a width of a mark may changes according to a mark length. Thus, tapering of a mark may occur (so-called tear-like mark). Thereby, the jitter characteristic may become problematic.

According to Japanese Laid-Open Patent Application No. 5-225570, in order to obtain the optimum recording luminous energy for every recordable zone of a disk medium for a short time, the optimum recording luminous energies at specific two recording line velocities are obtained at an equal recording line velocity for a trial writing zone for at least two positions, and, by performing inside or outside interpolation on the optimum recording luminous energies for two recording line velocities obtained by an interpolation routine, the optimum recording luminous energy for every recording line velocity can be obtained by performing interpolation processing on the thus-obtained optimum recording luminous energies According to Japanese Laid-Open Patent Application No. 5-274678, in order to reduce the laser power required for recording without worsening the jitter characteristic, recording is performed while rotating the optical disk at a uniform rotational speed, in which the light beam which has undergone intensity modulation according to the information signal based on the reference clock signals which differ for particular zones is used. Thereby, information is recorded in a zone on the perimeter side on a frequency higher than a frequency on which information is recorded in a zone on the central side. In this method, the light beam is made to have periodical pulses at a frequency which is an integral multiple of the frequency of a reference clock signal for each zone, wherein the light beam is applied to the disk medium for a zone on the perimeter side by a duty ratio of pulse-wise light emission larger than that by which the light beam is applied to the disk medium for a zone on the central side.

According to Japanese Laid-Open Patent Application No. 10-106008, in order to provide an optical disk apparatus which can perform information recording at a high velocity and with high reliability, an optical disk, an optical head, a synchronized signal generation means, a VCO, a phase comparison means, a controller, and a record signal generation means are provided, wherein recording can be performed on the best recording conditions by appropriately controlling the pulse height and pulse width of a recording signal according to a recording line velocity.

In these prior arts, the certain setting values of the recording pulses such as the duty ratio of pulse-wise light-emission are controlled according to a recording line velocity in the CAV scheme. Such a scheme is effective as long as a recording sensitivity distribution of the optical disk medium is uniform through the entire recording area of the disk, and an error of the recording power with respect to the setting value is kept constant through the entire recording area of the disk. However, for an actual disk medium, in particular, a DVD, it is difficult to perform recording uniformly through the entire recording area of the disk due to unevenness in recording sensitivity on the disk, power variation and/or wavelength variation of the LD (laser diode) due thereto.

That is, since a plurality of fluctuation factors mutually give influences on the characteristics of recorded information (RF signal), such as the jitter characteristic, it may not be possible to perform recording at a uniform signal characteristic throughout the recording area of the disk according to the above-described manners in the related art. As a result, it may not be possible to obtain the expected effects satisfactorily. Especially, in a case where the optical disk medium is concentrically divided into a plurality of recording zones, and control is made such as to interrupt and restart recording operation repeatedly across borders between different zones, so as to cope with difference in relationship between data transfer rate from a host apparatus and a data recording rate, it is difficult to perform recording at a uniform signal characteristic throughout the recording area of the disk medium.

SUMMARY OF THE INVENTION

An object of the present invention is to enable highly sensitive detection of the formation state of a mark when employing a multi-pulse series in pulse-wise light emission for recording.

Another object of the present invention is to enable acquisition of stable reproduction signal with small jitter.

Another object of the present invention is to calculate a heating power of a detection pulse easily from a recording power of a multi-pulse series of light emission, and detect the formation state of a mark with high sensitivity, in the above-mentioned case.

Another object of the present invention is to enable maintaining of the jitter characteristic non-problematic, by preventing the data of recorded information from being destroyed in the above-mentioned case.

Another objet of the present invention is to enable process any optical disk in a recording type different between one employing single pulse for each mark and the other employing the multi-pulse series for each mark in the above-mentioned case.

Another object of the present invention is to provide an information recording scheme in which an optical disk medium is divided concentrically into a plurality of recording zones, the optical disk medium is rotated, and at the same time, setting of recording pulse series is changed dynamically. In this case, without performing control of variable rotational speed of the disk medium, with maintaining compatibility in recording format with conventional media, and, also, through a simple scheme, recording can be made at a uniform signal characteristic throughout the recording area of the disk medium.

Another object of the present invention is to provide an information recording scheme by which a recording pulse series is corrected according to unevenness of disk characteristic and variation for particular recording apparatus. Thereby, aggravation of the jitter characteristic can be prevented, and stable operation of PLL for a reproduction clock signal can be attained.

Another object of the present invention is to provide an information recording scheme by which, when recording by CAV control is made, simple setting of a recording pulse series is made for every recording line velocity, while simple correction of recording power is made so that recording for low jitter can be attained throughout the disk medium.

An information recording apparatus, according to the present invention, of performing optical recording on a recording medium with a record mark by using a light beam modulated in a manner of multi-pulse series, includes:

a detection pulse generating part (8) generating a detection pulse to replace a multi-pulse series; and a detection power control part (29) controlling the power of the detection pulse to be smaller than the power of the multi-pulse series.

Thereby, although during recording in a manner of basically using multi-pulse series, it is possible to detect a condition of mark formation with high sensitivity, by replacing a multi-pulse series by a detection pulse.

The apparatus may further include a recording power setting part (29) setting the power of the multi-pulse series such that a ratio between the detection pulse and multi-power series may be fixed.

Thereby, the heating power is controlled for both multi-pulse series for normal recording and detection pulse for detection so as to maintain a proper mark-formation condition, and, thereby, it is possible to obtain a stable reproduction signal from a thus-recorded information with low jitter.

The ratio of power of the detection pulse to the multi-pulse series may be in a range of 0.6 and 0.9.

Thereby, it is easy to calculate the heating power for the detection pulse from the heating power for multi-pulse series.

The power control part may control the power of recording pulses by using a recording-condition information value obtained by normalizing an output value of a photodetector which receives reflected light from the recording medium during recording operation, by luminous energy currently emitted by a light-emitting device to the recording medium.

Thereby, it is possible to detect a condition of mark formation with high sensitivity even during receiving in a manner of multi-pulse series power control.

The detection pulse generating part may replace mark data of a multi-pulse series by the detection pulse.

Thereby, it is possible to maintain the jitter characteristic to a non-problematic condition without destroying original recording information.

The apparatus may further include:

a medium-type detecting part (12) detecting a type of the recording medium loaded; and a selection part (12) selecting as to whether a single pulse or a multi-pulse series is used for forming each record mark, according to detection result of the medium-type detection part.

Thereby, by appropriately switching the heating power for the detection pulse according to the selection from among different recording manners, such as those of CD-R and DVD-R for example, it is possible to surely process the different types of recording media.

The power control part may control so that the power of the detection pulse is approximately the same as that of the recording pulse when the selection part determines that a single pulse is used for forming each record mark.

Thereby, the recording power for the detection pulse is the same as that for the normal recording pulses in the case of the manner where a single pulse is used for forming each mark, while the heating power for the detection pulse is lower than that for the normal recording pulse in the case of the manner where multi-pulse series is used for forming each mark. Thereby, it is possible to properly deal with the different types of recording medium, such as CD-R and DVD-R.

An information recording apparatus, according to another aspect of the present invention, of performing optical recording on a recording medium with a record mark by using a light beam modulated in a manner of multi-pulse series, includes:

a detection pulse generating part (108) generating a detection pulse to replace a multi-pulse series;

a trial writing part (112) performing trial writing onto a predetermined zone of the recording medium (102) by using a plurality of different powers applied in sequence; and a detection power control part (119, 123) controlling the power of the detection pulse according to a light-reception signal obtained from record data made by the trial writing part.

Thereby, by performing trial writing, it is possible to determine the optimum (heating) power of the detection pulse.

The apparatus may further include a recording power setting part (119, 123) setting the power of the multi-pulse series according to a light-reception signal obtained from record data made by the trial writing part, but the record data is different from record data used by the detection power control part in position of the predetermined zone prepared for the trial writing.

Thereby, by performing trial writing, also the optimum heating power of the multi-pulse series can be determined.

The trial writing part may perform the trial writing in such a manner that:

power is changed stepwise for trial writing onto a first portion of the predetermined zone for a use by the detection power control part;

power is changed stepwise for trial writing onto a second portion of the predetermined zone for a use by the recording power setting part; and the first and second portions are adjacent in position.

Thereby, it is possible to obtain the optimum heating powers of the multi-pulse series and detection pulse at high accuracy from trial writing performed using a small-sized area of the recording medium.

The trial writing part may perform the trial writing in such a manner that:

power is changed stepwise for trial writing onto first portions of the predetermined zone for a use by the detection power control part;

power is changed stepwise for trial writing onto second portions of the predetermined zone for a use by the recording power setting part; and the first and second portions are arranged alternately one by one in position.

Thereby, it is possible to obtain the optimum heating powers of the multi-pulse series and detection pulse at high accuracy from trial writing performed using a small-sized area of the recording medium.

The trial writing part may perform trial writing in such a manner that:

trial writing is performed onto a first portion of the predetermined zone;

trial writing is performed onto a second portion of the predetermined zone;

trial writing is performed onto a third portion of the predetermined zone; and the power to be used for the trial writing onto the third portion is adjusted based on at least a light-reception signal from the record data of the trial writing made onto one of the first and second portions.

Thereby, it is possible to obtain a target value of recording-condition information for performing R-OPC by recording with multi-pulse series, by using the detection pulse having the optimum heating power.

The trial writing part may perform trial writing in such a manner that:

multi-pulse series is used for performing trial writing onto the second and third portions of the predetermined zone; and the thus-used multi-pulse series are replaced by the detection pulses at a predetermined frequency or all of the multi-pulse series are replaced by the detection pulses.

Thereby, it is possible to obtain both the optimum heating power of the detection pulse and the target value of recording condition for performing R-OPC by recording with the multi-pulse series, at high accuracy.

The trial writing part may perform trial writing in such a manner that:

trial writing onto the first, second and third portions is performed at a stretch.

Thereby, it is possible to obtain both the optimum heating powers of the multi-pulse series and detection pulse and the target value of recording-condition information for performing R-OPC by recording, only through a stretch of trial writing operation.

The trial writing part may perform trial writing in such a manner that:

a target value for the light-reception signal to be used for recording onto the recording medium is determined based on the actually obtained light-reception signal in performing trial writing onto the third portion of the predetermined zone.

Thereby, it is possible to obtain a target value of recording-condition information for R-OPC by recording with multi-pulse series.

At least one of the power of the detection pulse and a ratio in power between the detection pulse and multi-pulse series obtained based on the light-reception signal obtained from the trial writing may be stored as recording-condition information.

Thereby, it is possible to record onto the recording medium (optical disk) the information for R-OPC obtained through trial writing, for a use at a subsequent occasion.

An information recording apparatus, according to another aspect of the present invention, of performing optical recording onto a recording medium with a record mark by using a light beam modulated in a manner of multi-pulse series, includes:

a detection pulse generating part (108) generating a detection pulse to partially replace the multi-pulse series; and a power control part (119, 123) controlling the powers of the detection pulse and multi-pulse series according to at least one of the powers of the detection pulse and multi-pulse series or ratio therebetween previously recorded as recording management information of the recording medium.

Thereby, by utilizing information for R-OPC operation obtained through past trial writing recorded on the recording medium, it is possible to easily perform R-OPC with high sensitivity.

A recording medium, according to the present invention, to which information can be recorded, includes recording management information recorded therein, the recording management information comprising at least one of the powers for the detection pulse and multi-pulse series or ratio therebetween previously recorded as recording management information of the recording medium.

Thereby, by utilizing information for R-OPC operation obtained through past trial writing recorded on the recording medium, it is possible to easily perform R-OPC with high sensitivity.

An information recording apparatus, according to another aspect of the present invention, of performing optical recording onto a recording medium (202) with a record mark by using a light beam modulated in a manner of multi-pulse series, includes:

a detection pulse generating part (208) generating a detection pulse to replace a multi-pulse series;

a trial writing part (212) performing trial writing onto the recording medium by using a plurality of different powers applied in sequence;

a calculating part (212) calculating modulation degrees of the recording medium for the detection pulse based on a light-reception signal obtained from record data made by the trial writing part; and a detection power control part (219, 223) controlling the power of the detection pulse based on the thus-obtained data of modulation degrees.

Thereby, it is possible to perform output of the detection pulse with the optimum heating power, by performing the trial writing.

The detection power control part may determine the power such that the data of modulation degree obtained from the record data made by the trial writing part by the power may fall in a range between 0.5 and 0.8 as an optimum power.

Thereby, it is easy to calculate the optimum heating power of the detection pulse.

The detection power control part may control the power of the detection pulse based on a change of the modulation degree with respect to the power applied.

Thereby, it is possible to obtain the optimum heating power more accurately so as to control a change in modulation degree occurring due to an influence of surface inclination of the recording medium or the like.

The detection power control part may determine the power such that the change in modulation degree of the recording medium obtained from a light-reception signal obtained from record data made by the trial writing part with the power with respect to the power applied may fall in a range between 1.0 and 2.0 as an optimum power.

Thereby, it is easy to calculate the optimum heating power of the detection pulse.

The apparatus may further include:

a recording modulation calculation part (212) obtaining data of modulation degree of the recording medium for the multi-pulse series based on the light-reception signal; and a recording power control part (219, 223) controlling the power of the multi-pulse series based on the thus-obtained data of modulation degrees.

Thus, by performing the trial writing, it is possible to also output multi-pulse series with the optimum heating power.

The detection power control part may determine such a power as an optimum power for the detection pulse as that resulting in the modulation degree approximately equal to the modulation degree obtained for the multi-pulse series obtained by the recording modulation calculating part.

Thereby, it is possible to obtain the optimum heating power of the detection pulse corresponding to the optimum heating power of multi-pulse series.

The detection power control part may obtain a change in modulation degree of the recording medium obtained by the calculation part with respect to the power applied;

the recording power control part may obtain a change in modulation degree of the recording medium obtained by the recording modulation calculation part with respect to the power applied; and the detection power control part may determine such a power as an optimum power for the detection pulse as that resulting in the change of modulation degree with respect to the power applied approximately equal to the change of modulation degree obtained for the multi-pulse series obtained by the recording modulation calculating part with respect to the power applied.

Thereby, it is possible to obtain the optimum heating power of the detection pulse corresponding to the optimum heating power of multi-pulse series, at higher accuracy.

The recording power control part may control the power of the multi-pulse series so that a ratio thereof to the power of the detection pulse controlled by the detection power control part may fall in a predetermined fixed value.

Thereby, even during recording onto the recording medium, the respective heating powers of multi-pulse series and detection pulse can be made as optimum values.

The recording power control part may control the power of the multi-pulse series so that a ratio in power of an optimum value for the multi-pulse series obtained thereby to an optimum value for the detection pulse obtained by the detection power control part may fall in the predetermined fixed value.

Thereby, even during recording onto the recording medium, the respective heating powers of multi-pulse series and detection pulse can be made to be optimum values.

An information recording method, according to the present invention, of performing optical recording onto a recording medium (202) with a record mark by using a light beam modulated in a manner of multi-pulse series, includes the steps of:

a) generating a detection pulse to replace a multi-pulse series;

b) performing trial writing onto the recording medium by using a plurality of different powers applied in sequence;

c) calculating modulation degrees of the recording medium for the detection pulse based on a light-reception signal obtained from record data made by the step b); and d) controlling the power of the detection pulse based on the thus-obtained data of modulation degrees.

An information recording apparatus, according to another aspect of the present invention, of performing optical recording onto a recording medium (401) with a record mark by using a light beam modulated in a manner of recording pulse series, comprising:

a clock frequency change part (411) changing a recording clock frequency according to a recording line velocity so as to make a recording line density uniform; and a recording power calculating part (414) calculating a recording power in accordance with the change in recording line velocity by using an approximation formula, wherein:

a recording area of the recording medium (401) is concentrically divided into a plurality of recording zones;

an end portion of record data recorded on a recording zone of the plurality of recording zones is reproduced;

from a signal characteristic obtained from a thus-obtained reproduction signal, the approximation formula is corrected so that an ideal signal characteristic may be obtained; and the thus-corrected approximation formula is used for determining the recording power for recording onto a subsequent recording zone.

Thereby, even when the recording line velocity changes by CAV control such that the disk rotation speed may be fixed, and, thus, the optimum condition on recording is shifted from the setting values, it is possible to perform correction such that the optimum recording pulses can be provided for each recording line velocity. Thereby, it is possible to perform recording throughout the optical disk with uniform characteristics. Especially in case where the disk medium is divided concentrically into a plurality of recording zones in accordance with data amounts to be recorded, recording is made on a recording zone after performing correction on recording power made based on a result of reproduction of record data recorded on a preceding recording zone. Thereby, it is possible to perform recording throughout the disk medium with uniform characteristics regardless of whether or not the recording operation is interrupted and resumed.

Trial writing may be performed onto the recording medium for at least one of the minimum recording line velocity and maximum recording line velocity with plurality of recording powers;

the optimum recording power may then be calculated from signal characteristics obtained from thus-obtained reproduction signal;

the optimum recording powers for both the minimum and maximum recording line velocities obtained from either the trial writing or disk information previously recorded onto the recording medium may be used, and thus, a first approximation formula for obtaining the recording power in accordance with change in the recording line velocity may be calculated;

the first approximation formula may then be used for recording onto a most inner recording zone of the recording medium; and an end portion of record data thus recorded on the most inner recording zone of the plurality of recording zones may then be reproduced;

from a signal characteristic obtained from a thus-obtained reproduction signal, the first approximation formula may be corrected so that an ideal signal characteristic may be obtained; and the thus-corrected approximation formulas may be used for determining the recording power for recording onto subsequent recording zones.

Thus, the approximation formulas for the respective recording zones can be calculated, and thereby, appropriate correction can be made for the respective recording zones. Especially, even when the recording power changes due to unevenness of sensitivity across the disk medium, temperature characteristic, mechanical shift and so fourth, it is possible to appropriately eliminate the thus-occurring difference from the optimum recording power. Thus, it is possible to perform recording throughout the disk medium in a satisfactory condition. Further, the modulated data can be recorded across boundaries between the receiving zones continuously.

The recording medium may be a pigment-type recording medium employing a pigment material as a recording layer thereof.

Accordingly, in case recording is made for each of divided recording zones onto a so-called write-once type optical disk medium, it is possible to perform recording with characteristics uniform throughout the disk medium.

The recording medium may be a phase-change-type recording medium employing a phase-change material as a recording layer thereof.

Accordingly, in case recording is made for each of divided recording zones onto a so-called erasable type optical dusk medium, it is possible to perform recording with characteristics uniform throughout the disk medium.

Modulation or asymmetry may be calculated from the reproduction signal and is used to correct the approximation formula.

Thereby, even when the recording line velocity changes by CAV control such that the disk rotation speed may be fixed, and, thus, the optimum condition on recording is shifted from the setting values, it is possible to perform correction such that the optimum recording pulses can be provided for each recording line velocity. Thereby, it is possible to perform recording throughout the optical disk with uniform characteristics. Especially in case where the disk medium is divided concentrically into a plurality of recording zones in accordance with data amounts to be recorded, recording is made on a recording zone after performing correction on recording power made based on a result of reproduction of record data recorded on a preceding recording zone. Thereby, it is possible to perform recording throughout the disk medium with uniform characteristics regardless of whether or not the recording operation is interrupted and resumed. Especially, it is possible to attain recording according to CAV control with a simple and small-sized circuit configuration.

An information processing apparatus according to the present invention may have the above-described information recording apparatus.

Thereby, in case a lot of data is recorded on the optical disk medium, the optical disk medium may be divided concentrically into a plurality of recording zones in consideration of difference between the data transfer rate from the information processing apparatus body to the information recording apparatus and the data recording rate of the information recording apparatus itself, and thus, control should be made such that recording operation is interrupted and resumed across a boundary between different recording zones. Even in such a case, throughout all over the optical disk medium, recording with uniform signal characteristic can be performed, and, thus, the information recording apparatus can be effectively used together with the information processing apparatus such as a personal computer.

BRIEF DESCRIPTION OF THE DRAWINGS

Other objects and further features of the present invention will become more apparent from the following detailed description when read in conjunction with the following accompanying drawings:

FIGS. 1A through 1H illustrate waveforms of various signals and conditions of mark formation according to each of embodiments of the present invention;

FIG. 3 illustrates a relationship between heating power and recording-condition information;

FIGS. 4A through 4G illustrate waveforms of various signals and conditions of mark formation in a case of single-pulse recording scheme;

FIGS. 9A through 9H illustrate waveforms of various signals and conditions of mark formation in an example in which simply a detection pulse replaces a multi-pulse series;

FIGS. 12A through 12F, 13 and 14 illustrate a PCA of an optical disk and trial writing performed thereon according to a second embodiment of the present invention;

FIGS. 25A through 25C show waveforms illustrating recording pulse series including the head heating pulse and subsequent heating pulses in relationship with other signals both for the most outer zone and most inner zone together in a time scale such that the periods of the corresponding clock pulses are made to be equal to one another, comparatively according to the fourth embodiment of the present invention;

DETAILED DESCRIPTION OF THE PREFERRED EMBODIMENTS

First, an information recording system employed by an optical disk apparatus in a first embodiment of the present invention will now be described.

In this information recording system, code data of a DVD-ROM format is recorded on a recording layer of a DVD-R which employs a pigment material, for example. As a data modulation type, EFM (Eight to Fourteen Modulation) Plus modulation code, as shown in FIG. 1B, is used, and, mark edge (PWM: Pulse Width Modulation) recording is performed. A data length of a mark and space formed on the recording layer of the disk medium is in a range between 3T and 14T. In the embodiment, the above-mentioned medium and recording data are used, recording marks are formed on the medium through multi-pulse light emission of a semiconductor laser (LD: Laser Diode), and, thus, information is recorded onto the DVD-R.

Fundamental recording operation in the case of recording on the optical medium employing of a pigment material recording layer is the same as that described above for the related art. The optimum heating power of a multi-pulse series in this case should be higher than the case of CD-R where a single pulse series is used as a recording waveform, by a factor of approximately 20 through 30 percents (see FIG. 1F). Further, as shown in FIG. 1A, the period of a recording channel clock signal is approximately 38 nanoseconds, and a recording line velocity is 3.5 m/s.

In this embodiment, as shown in an LD light-emission waveform of FIG. 1F, when a mark data length is longer than 9T, the normal multi-pulse series is replaced by a 7T-length single pulse (detection pulse). When such a recording scheme is applied to a pigment-recording-layer DVD-R, as reflected light from the DVD-R during recording, the luminous energy (RF detection) signal of the reflected light as shown in FIG. 1H is obtained. As for the above-mentioned 7T-length detection pulse, the luminous energy change occurs during mark formation as in the above-mentioned R-OPC used for the CD-R.

However, if the single pulse having the same heating power as the multi-pulse series were used for the replacement during recording with multi-pulse series onto the DVD-R, a mark formation state would be such that excessive power were applied and the sensitivity for change in the disk drive apparatus due to aging such as defocus, tilt, power deviation or the like would be degraded. This is because the optimum power for the multi-pulse series is different from that for the single pulse although formation of a mark can be made onto the pigment-recording-layer optical disk either by the multi-pulse series or the single pulse.

Figure 2:
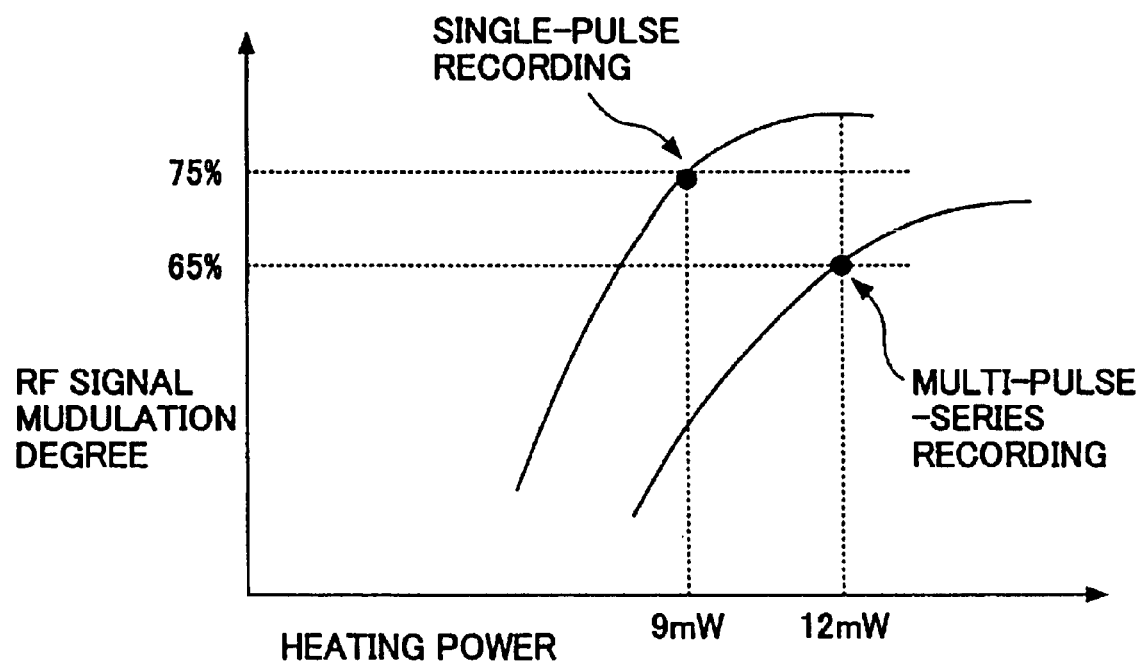
FIG. 2 illustrates a relationship between heating power applied to an optical disk and modulation degree of RF signal obtained from the optical disk.

More specifically, as shown in FIG. 2, when a multi-pulse series is used for a typical DVD-R by an optimum heating power, the optimum value of the heating power Pw1 (heating power of the multi-pulse series) is about 12 mW, the degree of 14T modulation by this power becomes around 65%, and, thus, the best jitter characteristic is obtained there.

The heating power Pw2 suitable for the above-mentioned detection pulse can be approximated by "Pw2=α·Pw1" in this case by multiplying the heating power Pw1 for the multi-pulse series by a coefficient α, which is 0.75, and the heating power Pw2 at this time is set as a value smaller than the heating power Pw1. That is, since the detection pulse used by R-OPC is a single pulse, the power which may result in a satisfactory recording condition can be obtained by multiplying with this coefficient "α=0.75".

Since the light-reception power level of the reflected-light signal RF becomes stable for the portion after the 3 T length from the front end during the interval of the above-mentioned detection pulse, this level is sampled by a sample-and-hold circuit, and, an RFsmp value (sampled value of the reflective-light signal RF) is obtained by an A-D converter. Thus, the necessary information concerning the recording condition of the optical disk used in the R-OPC operation is obtained. Since this value expresses the luminous energy of the reflected light from the optical disk, the recording-condition information expressing the recording condition of the optical disk is obtained by "RFopc=RFsmp/Pw2", through this normalization by the heating power Pw2 expressing the light-emission luminous energy applied to the optical disk.

As shown in FIG. 3, this recording-condition information RFopc by the single pulse shows a negative large inclination around the "Pw2=9 (mW)" obtained by the above-mentioned coefficient α or for the power less than it. This means that, for this power range, this information has a high sensitivity for various changes/shifts in the drive apparatus due to aging. However, as indicated by the broken line shown in FIG. 1H, if the RFsmp value were obtained in a case where the power same as the heating power Pw1 optimum for the multi-pulse series were applied in the single pulse, the mark would be formed too much, thereby, the 14T modulation level and the RF light-reception level during the interval of the detection pulse would be saturated as shown in FIG. 3 (right side), and, thus, merely little change would occur in response to change/shift in the heating power.

The coefficient α is set so that the ratio of the heating power Pw1 employed for the normal recording operation by the multi-pulse series to the heating power Pw2 employed for the detection pulse which is a single pulse may be fixed. By sampling the luminous energy of the reflected light for a range of front half between the front end and the 5T length of the detection pulse as the detection signal, the condition of mark formation at this time can be known. As shown in FIG. 4E, when the recording power is excessively large, the detection signal of the reflected-light level falls more sharply. By detecting this change, it can be determined that the mark formation is made too much. When the recording power is excessively small, the detection signal of the reflected-light level falls less sharply. By detecting this change, it can be determined that the mark formation is insufficient.

Figure 5:
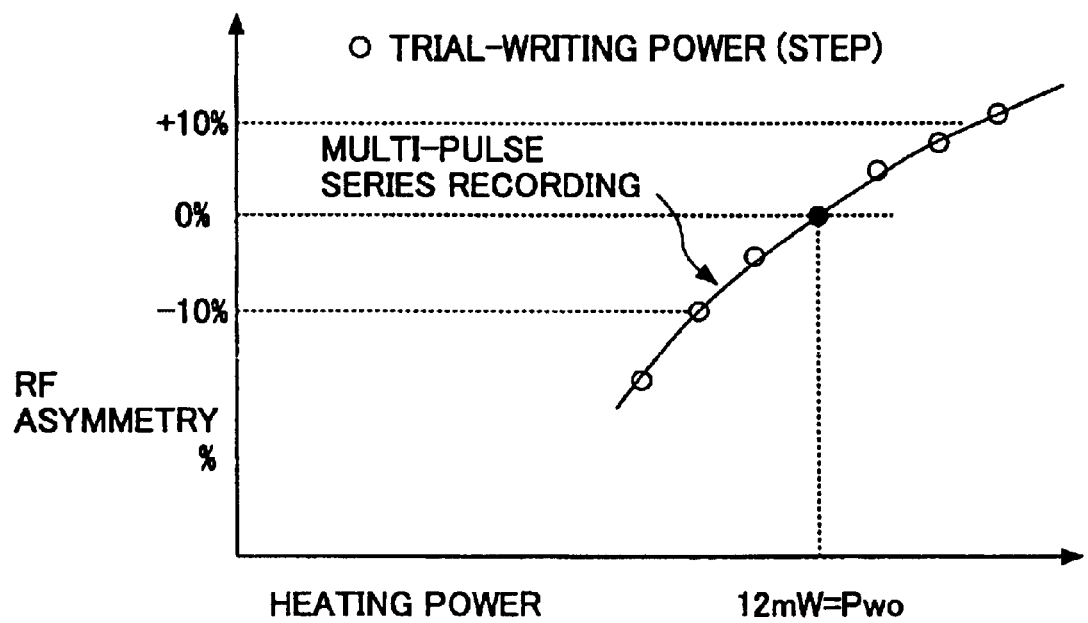
FIG. 5 illustrates trial writing according to a first embodiment of the present invention.

Before the normal recording operation (before the R-OPC operation), trial writing (OPC) is performed. Specifically, as shown in FIG. 5, the magnitude of the heating power is changed by multiple steps, and recording a mark of small size is performed for each heating power level. Then, after this trial recording, the optimum heating power Pwo, and the recording-condition information value "RFopco=RFsmp/Pwo" are calculated from "asymmetry" of the reproduced signal obtained therefrom, previously. When the value of RFopc obtained in the R-OPC operation is larger than this target value RFopc, the light-emission power of the LD is controlled so as to cause it to be larger. When the RFopc value is smaller, the light-emission power of LD is controlled so as to cause it to be smaller. (The reason therefor/logic thereof will be described later.) Thus, the heating power Pw2 of the detection pulse is controlled so that the recording condition may be obtained such that the target value RFopco may be reached. Then, by using the above-mentioned coefficient α by which Pw2 is to be divided, the heating power Pw1 of multi-pulse series can also be appropriately corrected. Thereby, the light-emission power of LD can be controlled based on the mark-formation condition, and it becomes possible to perform mark formation having a uniform state even when the drive apparatus changes in performance thereof due to aging.

In the above-described example, the coefficient α to be multiplied to the heating power Pw1 for the multi-pulse series is determined as 0.75. However, a different value may be selected for the coefficient α according to the pigment material used in the optical disk, setting of the recording line velocity, the multi-pulse width, and so forth. The possible variable range of the coefficient α for various combinations of these factors is preferably a range between 0.6 and 0.9 as a result of study being made, and by choosing the coefficient α within the range, the high sensitivity recording-condition information value RFopc can be obtained.

The above-mentioned detection pulse is inserted so as to replace the mark data in recording operation performed basically by the multi-pulse series. The length of the single pulse as the detection pulse is made into (n−2)T for the mark length n so that the mark length formed by the single pulse may be equal to that which should be obtained from the original multi-pulse series. Also, the length of this single pulse may be determined as being optimum according to the pigment material of the optical disk and the recording line velocity. The position of sampling for the detection pulse may be determined in consideration of a time interval for which the level of the reflected-light signal RF is stabilized enough, and, also, the time interval of the sampling may be determined in consideration of the acquisition time of the relevant sampling circuit. A time interval to be taken after each sampling may be determined in consideration of aperture delay of the sampling circuit, and, thus, it can be expected that the sampling circuit is realized by an inexpensive configuration and provides a stable operation. Thus, according to this embodiment, even in the case of recording basically by the multi-pulse series, the detection pulse replaces a multi-pulse series, and, thus, it becomes possible by multiplying with the coefficient so that the heating power Pw2 may become smaller, so as to provide such a heating power of the detection pulse as to obtain the state of the mark formation during recording, properly.

The optical disk apparatus embodying the above information recording system according to the first embodiment of the present invention will now be described.

Figure 6:
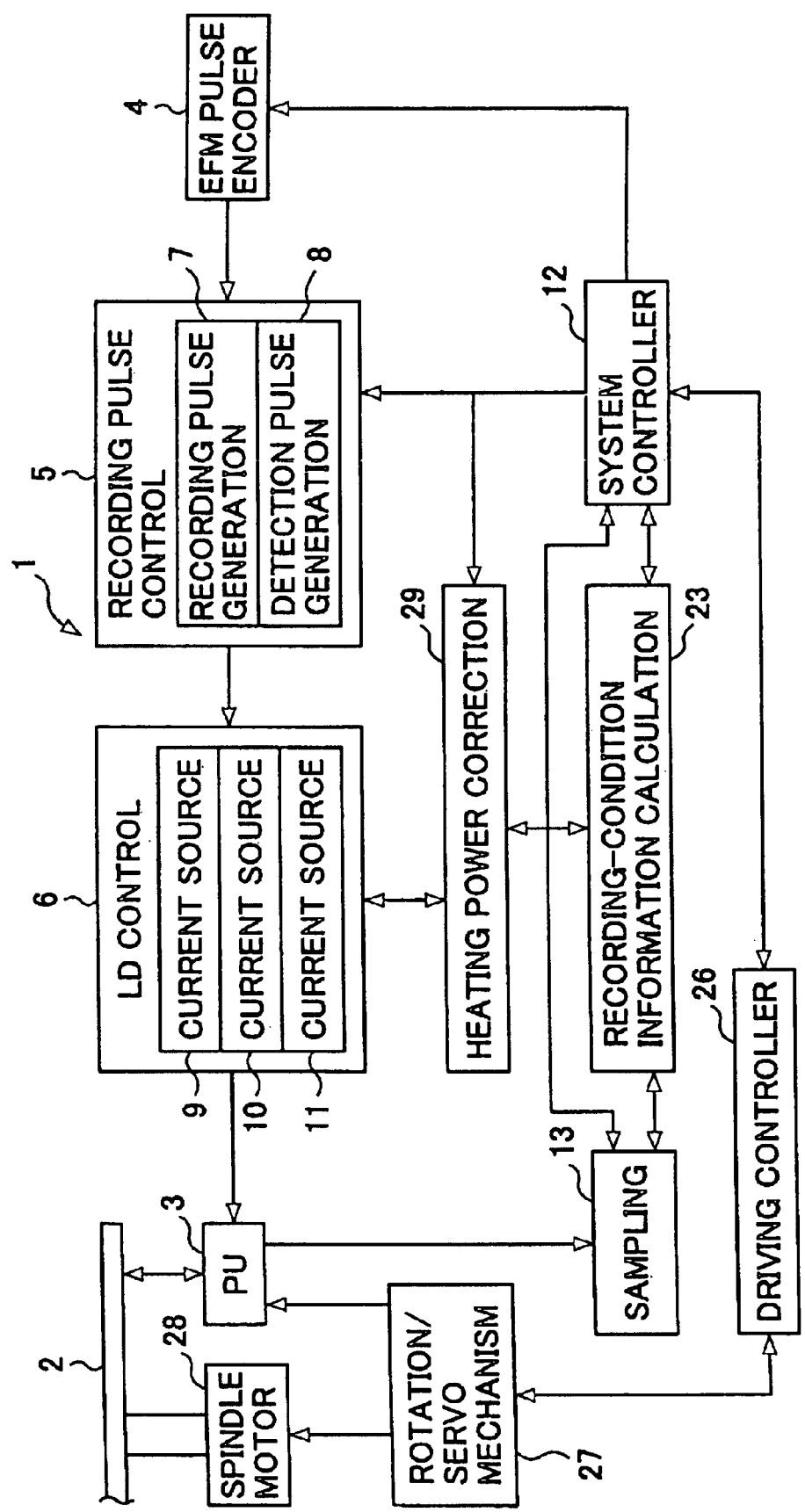
FIG. 6 shows a block diagram illustrating a general configuration of an optical disk apparatus in the first embodiment of the present invention.
Figure 7:
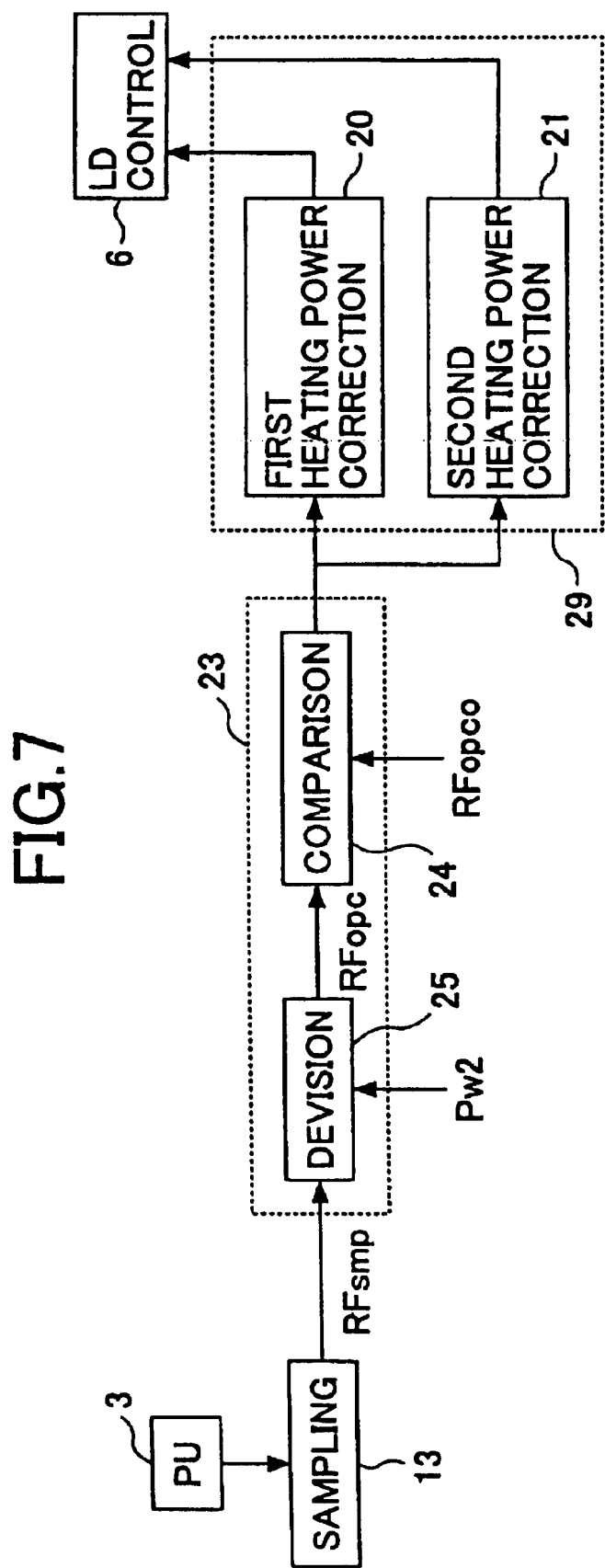
FIG. 7 shows a block diagram illustrating part of the configuration shown in FIG. 6 in detail.

FIGS. 6 and 7 show block diagrams illustrating a circuit configuration of the optical disk apparatus in the first embodiment of the present invention. This optical disk apparatus 1 has a pickup 3 including a an LD (not shown in the figures) which is a light source for recording information onto an optical disk 2, an EFM pulse encoder 4 which generates recording data, a recording pulse series control part 5 for modulating light emitted from the LD based on the recording data, and an LD control circuit 6 which makes LD emitting light have a desired light-emission waveform based on the recording pulse series control signal which the recording pulse series control part 5 outputs.

The recording pulse series control part 5 generates an LD control signal for driving the LD from the recording data which the EFM pulse encoder 4 outputs. This recording pulse series control part 5 includes a recording pulse series generation part 7, and the recording pulse series generation part 7 generates multi-pulse series. A detection pulse generation part 8 which generates a detection pulse of a single pulse for the R-OPC operation is also provided in the recording pulse series control part 5, and the detection pulse to be included in the recording pulse series is generated. Thus, the LD control signal is generated as multi-pulse series including the detection pulse, and the LD control signal is input to the LD control circuit 6.

The LD control circuit 6 includes LD driving current sources 9, 10 and 11 which act as current sources driving the LD. The LD driving current source 9 outputs a heating power for peak level of each pulse of multi-pulse series, the LD driving current source 10 outputs a heating power for a peak level of the detection pulse for the R-OPC operation, and the LD driving current source 11 outputs a bottom power for a bottom level of each pulse. The LD control circuit 6 switches or adds the output of the LD driving current source 9 or 10 and the LD driving current source 11 based on the LD control signal, and outputs the result to the LD, and, thus, produces the LD light-emission waveform (as shown in FIG. 1F) of the multi-pulse series containing the detection pulse. The recording pulse series generation part 7 and the LD driving current source 9 act as a multi-pulse series generation part, and the detection pulse generation part 8 and the LD driving current source 10 act as a detection pulse generation part.

A light-receiving device (not shown in the figures) provided in the pickup 3 receives reflected light from the optical disk 2, and outputs a reflected-light signal RF. In a sampling circuit 13, a sampling-and-holding operation is performed on the reflected-light signal RF at a detection position of a sampling signal, and the detection pulse in a recording pulse series is sampled and undergoes A-D conversion by an A/D converter, not shown in the figure, and, thus, a signal RFsmp showing a sampled level of the luminous energy of reflected light is obtained.

The level of the reflected light changes according to the luminous energy emitted from the LD. Therefore, the luminous energy level of the reflected light is divided by the heating power for the detection pulse so that it is normalized, and, thus, a recording-condition information value which reflects a state of formation of the record mark formed on the optical disk 2 is calculated by the recording-condition information calculation circuit 23. Namely, the light-emission luminous energy level Pw of the LD is used for the dividing and thus normalization calculation operation is performed by a dividing circuit 25.

Then, the recording-condition information value RFopc reflecting the state of formation of the record mark is calculated. This recording-condition information value RFopc is stored in a RAM or the like of a system controller 12, for example, as a target value RFopco. The R-OPC operation is started immediately after starting a normal recording operation, and the recording-condition information value RFopc is calculated as described above at predetermined intervals. Then, since it can be determined that the record mark is smaller than an ideal size (thereby the reflectance of the medium there is still kept higher as less luminous energy is applied there and thus the reaction of the medium is insufficient) when the recording-condition information value RFopc obtained is larger than the target value RFopco as compared with the above-mentioned target value RFopco by a comparator 24, controlling is made by a first heating power correction circuit 20 of a heating power correction circuit 19 to the LD driving current source 9, and, thus, the heating power Pw2 of the detection pulse is increased. On the contrary, since it can be determined that the record mark is larger than the ideal size (thereby the reflectance of the medium there has become lower as much luminous energy applied there and thus reaction of the medium is too much or excessive) when the recording-condition information value RFopc obtained is smaller than the target value RFopco, the heating power Pw2 of the detection pulse is corrected so that it may become smaller. The comparator 24 and the first heating power correction circuit 20 act as a first heating power setting part.

Since only the detection pulse is controlled so that the mark formation condition therefor is controlled properly as described above, the heating power Pw1 of the normal multi-pulse series should also be corrected by dividing the heating power Pw2 of the detection pulse corrected as mentioned above by the above-mentioned predetermined coefficient α by a second heating power correction circuit 21. The second heating power correction circuit 21 acts as a second heating power setting part.

By carrying out the above-described operation of R-OPC, the heating power Pw1 for the multi-pulse series and the heating power Pw2 for the detection pulse are well controlled so that the ratio therebetween is kept constant as the predetermined coefficient α.

Therefore, since thus the mark formation condition for each of the heating powers Pw1 and Pw2 is maintained as the optimum recording condition, even when any change in performance/characteristic of the driving apparatus occurs, a non-problematic jitter characteristic will be able to obtained from the reproduction signal.

It is possible that a microcomputer such as the system control 12 may perform functions of part or all of the sampling circuit 13, the recording-condition information operation circuit 23, the heating power correction circuit 19, etc.

Figure 8:
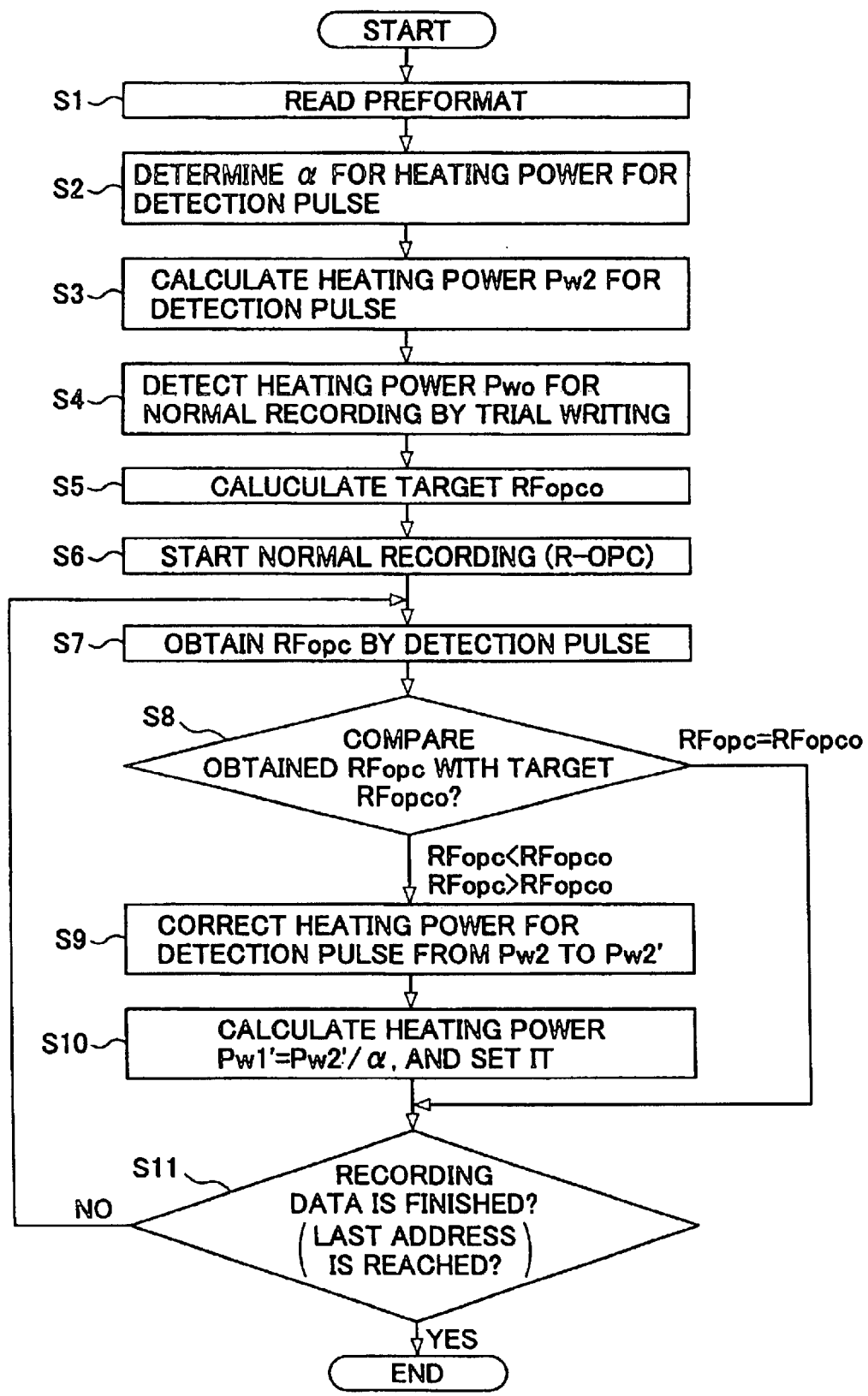
FIG. 8 shows an operation flow chart illustrating operation of the optical disk apparatus according to the first embodiment of the present invention.
Figure 10A:
FIGS. 10A through 10D illustrate a CLV system in the related art.
Figure 10B:
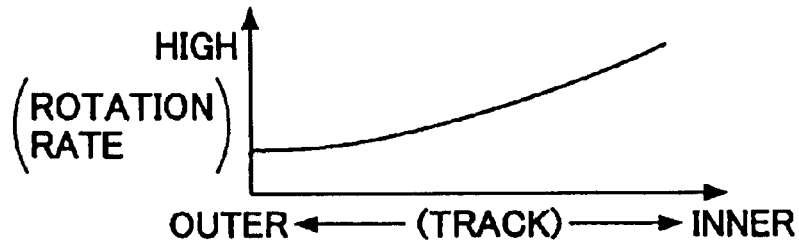
Figure 10C:
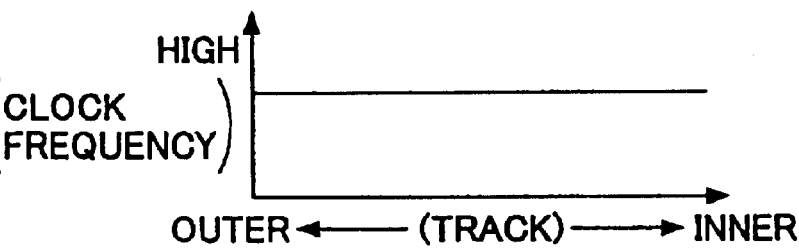
Figure 10D:
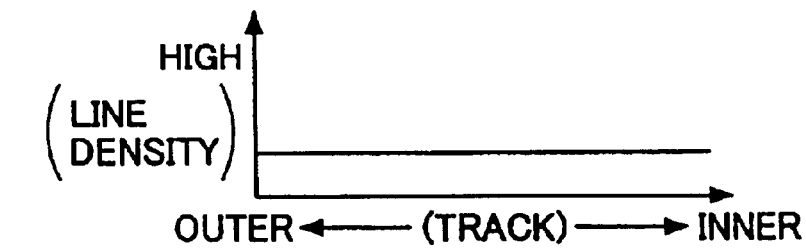
Figure 11A:
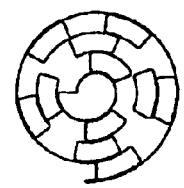
FIGS. 11A through 11D illustrate a CAV system in the related art.
Figure 11B:
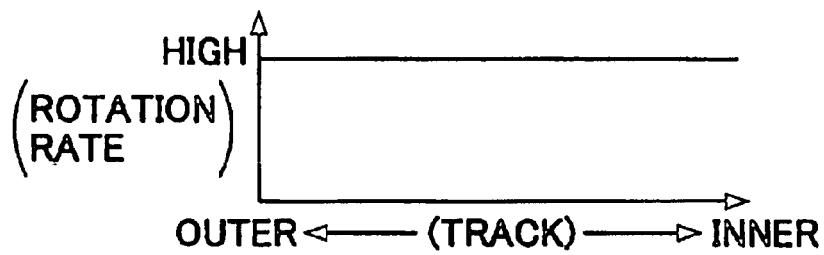
Figure 11C:
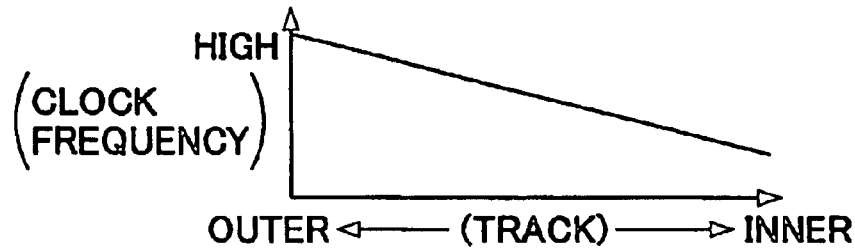
Figure 11D:
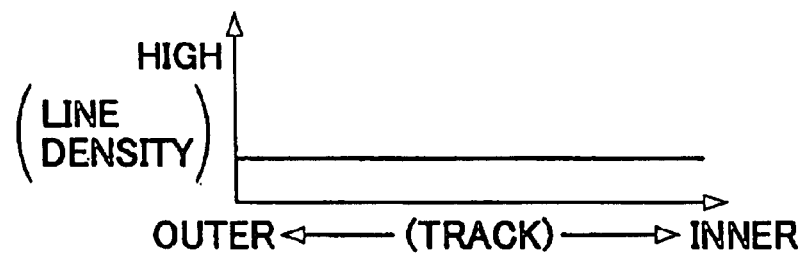

With reference to FIG. 8, the trial writing operation and subsequent normal recording operation of the above-mentioned optical disk apparatus 1 according to the first embodiment of the present invention will now be described. As shown in the figure, first, from a preformat of the optical disk 2, pulse width setting information for multi-pulse series and a recommended heating power value are read (in a step S1), the predetermined coefficient α is determined (in a step S2), and the heating power Pw2 for the detection pulse is calculated (in a step S3), as described above. Then, since the actual heating power may have an error depending on a particular driving apparatus, the target value RFopco of the recording-condition information value RFopc is calculated (in a step S5) by detecting the optimum recording power Pwo through the trial writing operation as described above (in a step S4).

Then, normal recording (R-OPC operation) is started (in a step S6), and steps S7 through S10 are performed. That is, a multi-pulse series is replaced by the detection pulse as mentioned above, and the recording-condition information value RFopc is calculated through normalization by the dividing circuit 25 (in a step S7). The comparator 24 compares this recording-condition information value RFopc with the target value RFopco (in a step S8). Then, when both are not equal to one another, the heating power Pw2 of the detection pulse is corrected by the first heating power correcting circuit 20 so as to change it into a power Pw2' (in a step S9), as described above, and, then, a power Pw1' is calculated by dividing the value of Pw2 by the coefficient α by the second heating power correction circuit 21, and the thus-obtained heating power Pw1' is set for multi-pulse series (in a step S10). Processing of steps S7 through S10 is performed until the end address of recording data is reached (No of the step S11). Thus, the heating power Pw2 for the detection pulse is corrected in the R-OPC operation, and, then, the dividing operation by the predetermined coefficient α is performed, thus, the heating power for normal multi-pulse series is also corrected as "Pw1=Pw2/α". Thereby, the heating powers Pw1 and Pw2 are maintained of having the fixed ratio therebetween.

It is possible to configure the optical disk apparatus 1 so that the apparatus 1 can handle either CD-R or DVD-R by selecting either one, as will now be described. That is, normally, in a case of the optical disk apparatus 1 which can carry out recording and reproduction on each of CD family and DVD family, after the optical system and signal processing system of the pickup determine the disk type of the currently loaded disk, they are switched appropriately so that they can properly process the CD family or DVD family according to the determination.

With regard to the recording pulse series (for normal recording operation), identification is performed as to whether the currently loaded disk is CD-R or DVD-R (this may be determined by reading the preformat in the above-mentioned step S1). This function corresponds to that of a type detection part. Then, switching is made for the recording pulse series based on the result of this identification determination. That is, when the currently loaded optical disk is a CD-R, single pulse recording scheme is selected, recording is performed by the single pulse recording scheme as shown in FIGS. 4C and 4D, for example, in which a signal pulse is used for forming each record mark. On the other hand, recording is performed by multi-pulse series in which a multi-pulse series is used for forming each record mark, as shown in FIG. 1C, at a time of DVD-R.

Then, according to the identification of disk type and its recording pulse series for each type of optical disk, the heating power of the detection pulse when operating R-OPC is appropriately switched. That is, at a time of CD-R, the normal heating power and the heating power of the detection pulse by the single pulse series are made coincident. On the other hand, in the case of DVD-R, the normal heating power for the multi-pulse series is multiplied by the predetermined coefficient α, and, thereby, the heating power of the detection pulse may become smaller than the normal heating power for the multi-pulse series.

Moreover, also, in case of employing multi-pulse series and carrying out normal recording for CD-R, or in cases of employing single pulses and carrying out normal recording for DVD-R, it is determined as to whether or not the heating power of recording pulses is multiplied by the predetermined coefficient so as to obtain the heating power for the detection pulse, not according to the disk type of the currently loaded optical disk, but according to the type (multi-pulse series of single pulses) of recording pulses used for normal recording.

Thus, by performing switching as described above, it becomes thus possible to detect the record-mark recording condition at a high sensitivity for particular disk types and particular types of recording pulses, and, thereby, it becomes possible to correct the heating power appropriately so that the jitter problem which otherwise occurs due to change in performance/characteristic of the driving apparatus may be solved.

A configuration of the optical disk 2 suitable for the above-described embodiment, and, also, a method of detecting the mark-formation condition at high accuracy will now be described.

A recording layer of the optical disk 2 is such that optical change is caused by thermal decomposition due to laser-light application and/or substrate deformation occurring thereby, and, thereby, a record mark is formed. When recording on the optical disk by marks formed due to the above-mentioned heat mode is performed, change in luminous energy of the reflected light has a very high sensitivity, and therefore, this type of disk medium is suitable for the above-described embodiment of the present invention.

Typically, an organic pigment may be used for the recording layer, such as a polymethine pigment, dye of a naphthalocyanine family, a phthalocyanine family, a squalirium family, a croconium family, a pyrylium family, a naphthoquinone family, an anthraquinone family (indanthrene family), a xanthene family, a triphenylmethane family, an azulene family, a tetrahydrocorrin family, a phenanthrene family, a triphenothiazine family, a metal complex compound thereof, etc. may be used, for example. These pigments may be mixed or laminated with other organic pigment, metal, metal compound and/or the like for the purpose of improving the optical characteristic, recording sensitivity, signal characteristic, etc., thereof. Examples of the metals and metal compounds applicable thereto are In, Te, Bi, Se, Sb, Ge, Sn, Al, Be, $TeO_2$ and SnO, As, Cd, etc. It is also possible to use them in a form of distributed mixture or lamination.

Formation of the recording layer may be performed by a well-known method, such as vacuum deposition, sputtering, CVD, a solvent application, or the like. When employing the solvent application method, the above-mentioned dye etc. can be dissolved into an organic solvent, and then, it is applied by a common coating method, such as spraying, roller coating, dipping, spin coating, etc. When the optical disk formed as described above is used in the above-described embodiment of the present invention, the luminous energy of reflected light therefrom reflects the condition of the mark formation during recording with high sensitivity enough by the detection pulse in the form of the single pulse as described above. Therefore, by using the above-mentioned optical disk in the embodiment of the present invention, correction of the recording heating power according to change of performance/characteristic such as defocus, tilt, temperature dependency of LD output, etc. of the driving apparatus can be attained. Thereby, it is possible to perform recording operation in a satisfactory mark formation condition such as to result in non-problematic jitter characteristic throughout the recording area of the disk medium.

Moreover, although the rate of the optical change during mark formation at the time of recording changes according to the above-mentioned recording material, film thickens of the recording layer, etc., it is possible to detect the mark formation condition with high sensitivity by appropriately setting the detection position of the single detection pulse at which the luminous energy of the reflected light is detected according to the above-mentioned rate of the optical change.

In addition, for other recording material for which mark formation is performed by a heat mode, change of the luminous energy of reflected light during recording has almost the same tendency. Therefore, the above-described method according to the present invention can also be applied thereto.

As mentioned above, if a normal multi-pulse series were merely replaced by a single detection pulse as shown in FIG. 9F, the luminous energy signal of the reflected light (reflected-light signal RF) such as that shown in FIG. 9H would be obtained. This detection pulse would reflect the luminous energy change occurring according to the condition of mark formation in the same manner as in the above-mentioned R-OPC operation applied to a CD-R system.

However, as the replacement were made merely by the single pulse having the same heating power as that of normal multi-pulse series, an excessive power would be applied to the disk medium, and, thereby, the mark formation condition would be such that the mark would be formed to be so large as to be reduced in reflectance of the medium and thus reduced in the detection level as shown in FIG. 9H. Thereby, as described above with reference to FIG. 3, it would be not possible to obtain sufficient information from the reflected-light signal as the detection level would not be sufficiently sensitive for detecting a degree of aging of the driving apparatus such as defocus, tilt, temperature dependency of heating power, and so forth, by the reason described above for DVD-R or the like having the recording layer made of pigment, in general.

A second embodiment of the present invention will now be described.

In the second embodiment, same as in the above-described first embodiment, immediately before starting normal recording operation, trial writing (OPC) is performed as preparation work before the R-OPC operation. As shown in FIG. 12A, a PCA (Power Calibration Area) is provided in the optical disk at the inner or central portion thereof, and, by using this area, many number of times of trial writing can be made. As shown in FIG. 12B, for example, one trial writing is made for 1ECC=16 sectors which is a recording unit. Thereby, when one step is assigned to 1 sector as a minimum unit, it is possible to change the heating power stepwise and to perform trial writing of 16 steps at the maximum.

Figure 13:
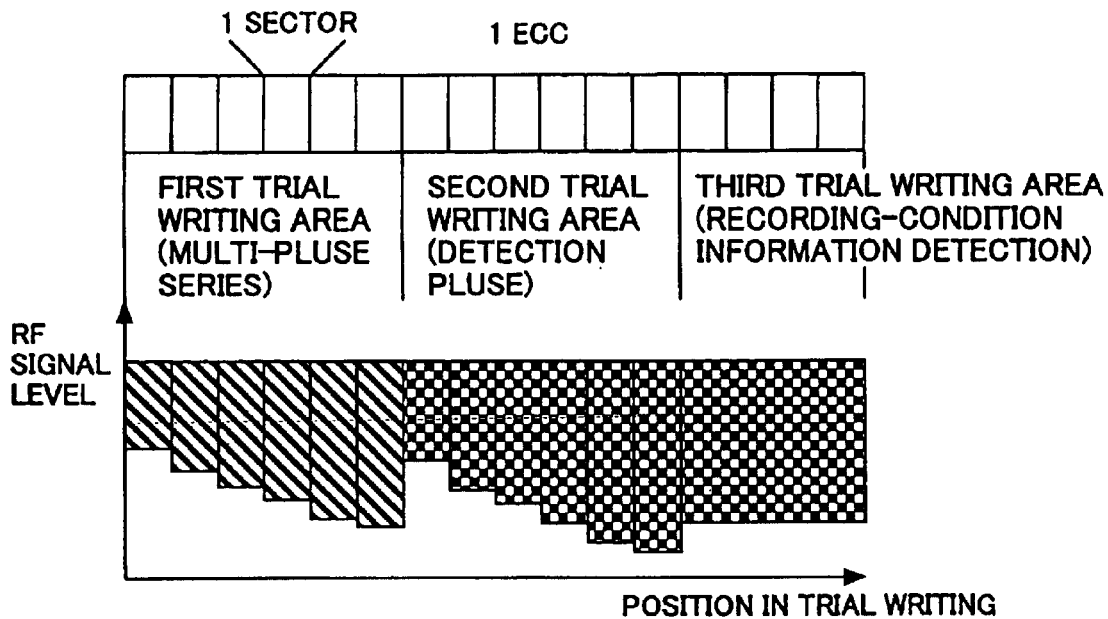

Then, as shown in FIG. 13, first, the heating power of multi-pulse series is changed by six steps in total, and trial writing is made onto 6 sectors (which zone is referred to as a first trial writing zone). Then, the heating power of the detection pulse used in the R-OPC operation is similarly changed by six steps in total, and trial writing is made onto 6 sectors (which zone is referred to as a second trial writing zone). Thus, the zones of total 12 sectors are used by the trial writing.

Figure 12E:
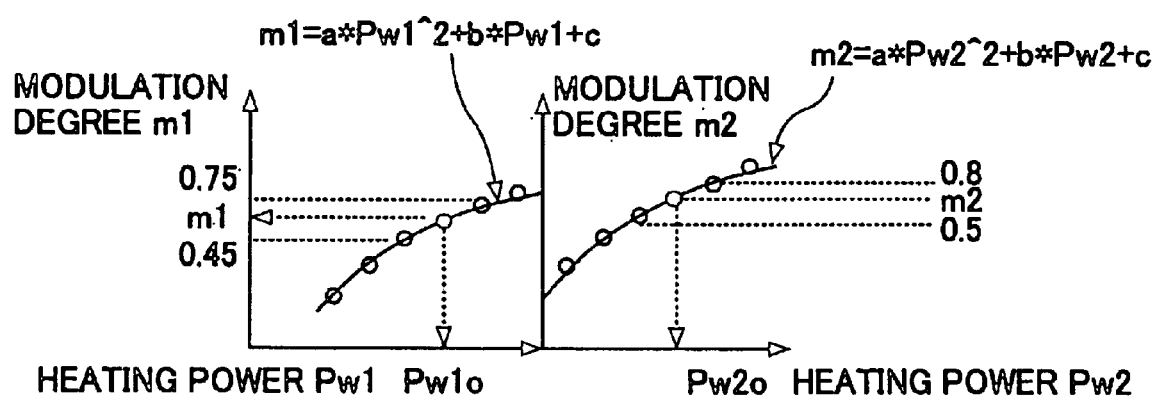

Then, by performing reproduction operation on the above-mentioned first trial writing zone, a maximum level Ipk, a minimum level Ibtm, and an average level Idc are detected, as shown in FIG. 12C. Then, as shown in FIG. 12E, 'modulation degree' on the maximum amplitude "ml= (Ipk−Ibtm)/Ipk" is calculated, and is held, and, also, as shown in FIG. 12D, 'asymmetry' on the maximum amplitude Imax and average value Idc is calculated "β=[(Ipk−Idc)−(Idc−Ibtm)]/(Ipk−Ibtm)" and is held. Furthermore, as shown in FIG. 12D, an approximation formula is calculated from these plotted points, and the optimum heating power Pw1o for the multi-pulse series such that β=0 is calculated. Furthermore, the modulation degree m1 at this time is obtained.

Then, as shown in FIG. 12E, the modulation degree m2 on the maximum amplitude Imax is calculated from the reproduction signal obtained from the second trial writing zone, by the same methods of level detection and calculation. Then, the optimum heating power Pw2o for the detection pulse is calculated from these modulation degrees m1 and m2. For the details of calculation, description will be made later.

In this method, the first trial writing zone and the second trial writing zone can be set adjacent and regarded as one zone, and, thus, recording operation and reproduction operation therefor can be attained by single operation each.

The method of obtaining the optimum heating powers for the multi-pulse series and detection pulse by trial writing will now be described in detail.

Generally speaking, the modulation degree falls in a range between 0.6 and 0.7 when recording is made by the optimum-heating power for DVD-R, using multi-pulse series. In contrast thereto, when recording is made by the optimum heating power using single pulse, the modulation degree falls in a range between 0.7 and 0.8, in general. Thereby, as a first process, the heating power can be used as the optimum heating power such that the modulation degree m2 of the above-mentioned detection pulse should be equal to or larger by approximately 0.1 than the modulation degree m1 obtained from the optimum heating power for the multi-pulse series. Therefore, for the optical disk manufactured according to the standard, the heating power which results in the modulation degree predetermined for a particular type of the optical disk or a particular type of the optical disk apparatus from among a plurality of modulation degrees in a range between 0.5 and 0.8 for the detection pulse is previously set as the optimum heating power.

Then, as a second process, for the optimum heating power for performing normal recording by using multi-pulse series, the modulation degree m1 and the asymmetry β obtained by the above-mentioned trial writing are used, the optimum heating power Pw1o for the multi-pulse series such that β=0 is calculated, and, also, the modulation degree m1o on this-optimum heating power is calculated. Also for the detection pulse, similarly, the optimum heating power Pw2o is calculated for the detection pulse on the modulation degree m2 which is approximately equal to the modulation degree m1o on the above-mentioned optimum heating power for the multi-pulse series, from the modulation degree m2 obtained by the trial writing.

Figure 12F:
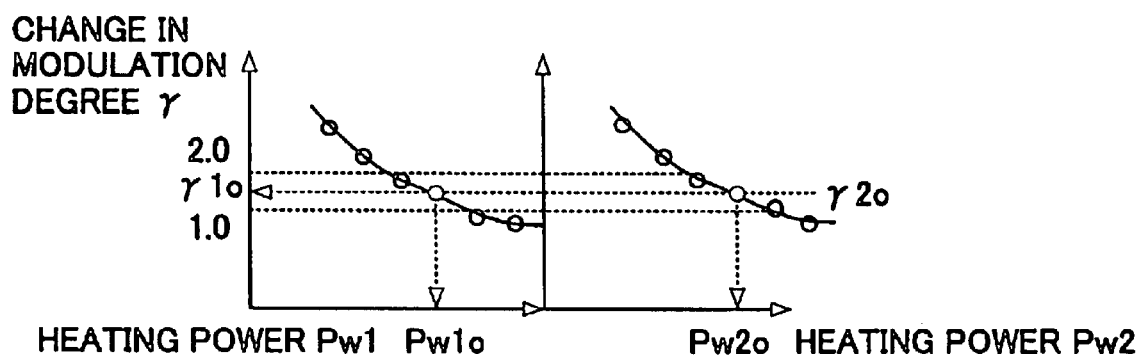

As a third process, as shown in FIG. 12F, for the purpose of eliminating adverse influence of change in the modulation degrees m1 and m2 due to surface inclination of the optical disk or the like, by using not the modulation degree itself, but change in the modulation degree with respect to the heating power, i.e., "γ=(dm/dPw)×(Pw/m)" obtained from relationship between the modulation degree and heating power obtained from trial writing is used. Thereby, it is possible to improve the detection accuracy. That is, it can be determined that the detection sensitivity is satisfactory when the change in the modulation degree γ obtained from trial writing for the detection pulse falls within a proper range. For example, the detection sensitivity is too small when γ<1.0, while, since the heating power is so low that the mark formation is not stabilized yet, and, thus, rather detection error becomes larger, when γ>2.0. Accordingly, a predetermined heating power such as to provide a predetermined change in modulation degree γ in the range between 1.0 and 2.0 should be used as the optimum heating power.

As a fourth process, in order to perform normal recording by using multi-pulse series, the optimum heating power Pw1o for multi-pulse series such that β=0 is calculated from the above-mentioned modulation degree m1 and asymmetric β obtained from trial writing, also, an approximation formula for the modulation degree and heating power is derived from the modulation degrees m1 on respective heating powers, and, then, the change in modulation degree with respect to the heating power γ1o on the optimum heating power Pw1o is calculated. Similarly, for the detection pulse, by trial writing, the modulation degree m2 of the reproduction signal is obtained and held, and, then, the optimum heating power Pw2o for the detection pulse on the change in modulation degree with respect to the heating power γ2o obtained from the approximation formula of the modulation degree and heating power which is approximately equal to the above-mentioned change in modulation degree with respect to the heating power γ1o for the multi-pulse series is calculated. By this process, it is possible to obtain the optimum heating power for normal recording by using multi-pulse series and the optimum heating power for the detection pulse for OPC, with a little detection error even due to change in recording condition.

A specific process of calculating the change in modulation degree with respect to heating power γ and Pw to be obtained in the above-mentioned third and fourth processes will now be described. First, from a plurality of sets of characteristic data between the modulation degree and heating power obtained from trial writing, calculation is performed by the following quadratic approximation formula:

$$m = a \times Pw^2 + b \times Pw + c$$

where a, b and c denote constants. The approximation manner may be of a common approximation form, such as polynominal approximation, and, an approximation formula of more than quadratic one can result in coincidence between an actually measured value and the thus-calculated value.

Then, since "γ=dm/dPw×m/Pw" as mentioned above, and, "dm/dPw=2×a×Pw+b", the following formula can be obtained:

$$Pw = \frac{-b \times (\gamma - 1) \pm \sqrt{b^2 \times (\gamma - 1)^2 - 4 \times a \times (\gamma - 2) \times c \times \gamma}}{2 \times a \times (\gamma - 2)}$$

By performing the above-mentioned calculation, the objective Pw can be obtained which is the plus solution of the above-mentioned formula.

Although calculation through a quadrature approximation formula of γ and PW may be calculated after calculating each γ, the approximated value may likely to have an error from the actual measured value in this case, it is preferable to approximate the modulation degree m, as mentioned above.

Figure 14:
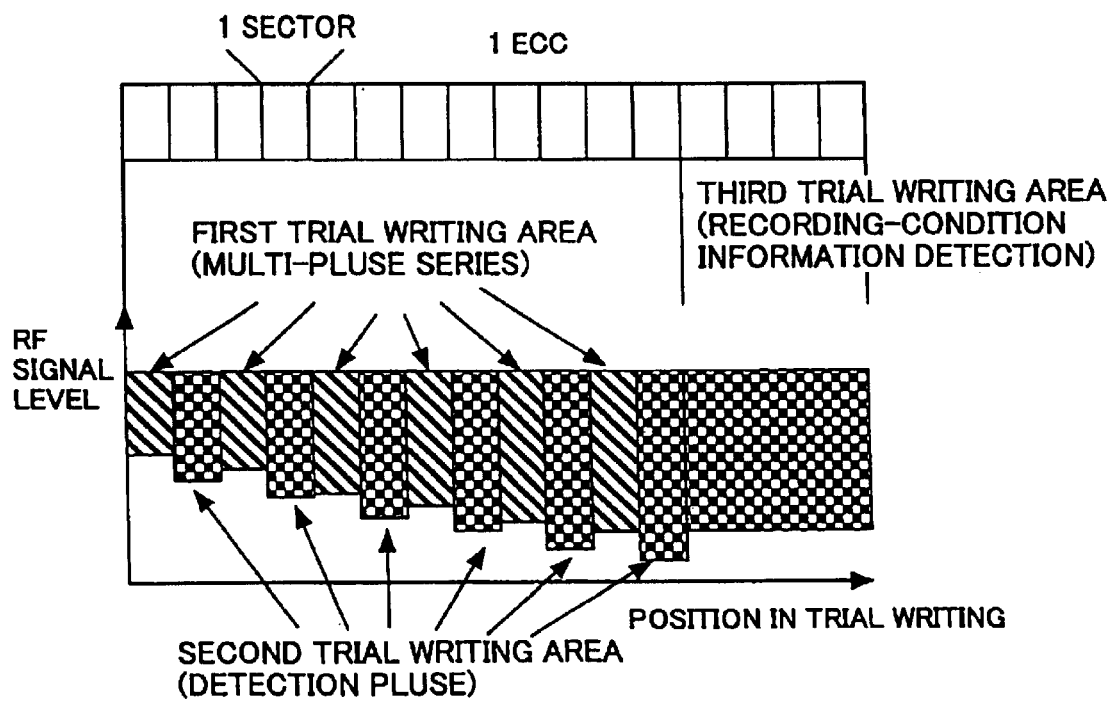

According to the above description, as shown in FIG. 13, the trial writing for each of the multi-pulse series and the detection pulse uses total 6 sectors for increasing the heating power by six steps. Further, the first and second trial writing zones are separate completely. However, it is also possible that, as shown in FIG. 14, total 12 sectors are used in which, setting of the recording pulse is switched, and the first and second trial writing operations are performed alternately sector by sector. In this case, also in the reproducing operation, by determining that the first and second trial writing zones are switched alternately sector by sector, it is easy to perform detection operation properly for the first and second trial writing zones. At this time, through the entire area of the first and second trial writing zones, the modulation degree does not change sharply, but approximately increases monotonously. Therefore, it becomes possible to reduce a change amount at a zone at which the heating power is minimum, and the calculation accuracy for each optimum heating power becomes better.

Although the above-mentioned PCA of the optical disk includes total 16 sectors, and, 4 sectors are left after the 12 sectors are used as mentioned above as the first and second trial writing zones, as shown in FIG. 14, and, these 4 sectors are used for a third trial writing zone for setting the target value RFopco of the recording-condition information used for the actual R-OPC operation, as shown in FIGS. 12B, 13 and 14. Specifically, the second optimum heating power Pw2o for the detection pulse is obtained from the reflected-light signal RF obtained from the first and second trial writing zones, and, this heating power is used for performing trial writing on this third writing zone. Thereby, the target value RFopco is obtained.

Thus, for recording on the third trial writing zone, the result of trial writing performed on the first and second trial writing zones is reflected, and, thus, it is not possible to perform the recording simultaneously. However, in order to perform the third trial writing as a part of a single trial writing operation, the third trial writing zone of 4 sectors are located adjacent to the first and second trial writing zones, and total 16 sectors are used for the trial writing as a whole. Since the purpose of this third trial writing is to perform detection of mark-formation condition during actual recording operation properly, the third trial writing may be performed by basically multi-pulse series, and, the multi-pulse series is replaced by the detection pulse according to a frequency of performance of the detection. Alternatively, all the recording pulses may include only the detection pulses, results of many times of detection by sampling, which will be described later, are held, and the average thereof is obtained, thereby the accuracy of the detection level and target value of the recording-condition information being able to be improved.

Moreover, actual trial writing operation is performed such that, subsequent to recording on the first trial writing zone by using multi-pulse series, recording on the second trial writing is performed by using multi-pulse series but partially replaced by the detection pulse adjacently. Then, reproduction operation can be performed on the first and second trial writing zones collectively at once. Therefore, one trial writing operation can be performed within a short time, needing only a small-sized zone on the optical disk, in which highly precise trial writing for multi-pulse series and the detection pulse can be performed. After calculating the optimum recording power for the multi-pulse series and that for the detection pulse as described above from the above-mentioned reproduction signals, the recording pulse series which contain the detection pulse are used for performing recording on the third trial writing zone, subsequently, adjacent to the first and second trial writing zones.

An optical disk apparatus according to the above-described second embodiment of the present invention will now be described, which performs the above-described scheme.

Figure 15:
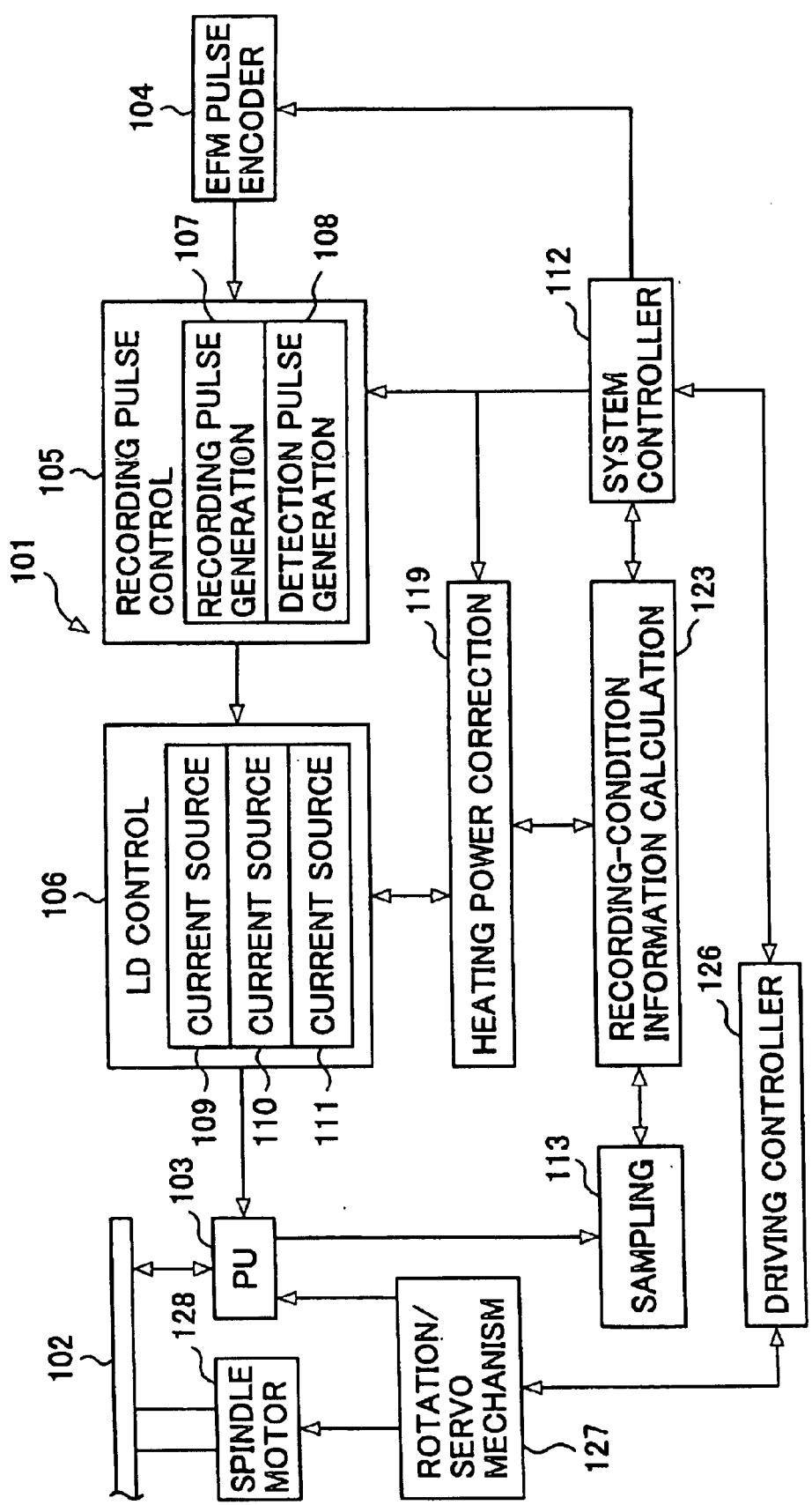
FIG. 15 shows a block diagram illustrating a general configuration of an optical disk apparatus in the second embodiment of the present invention.
Figure 16:
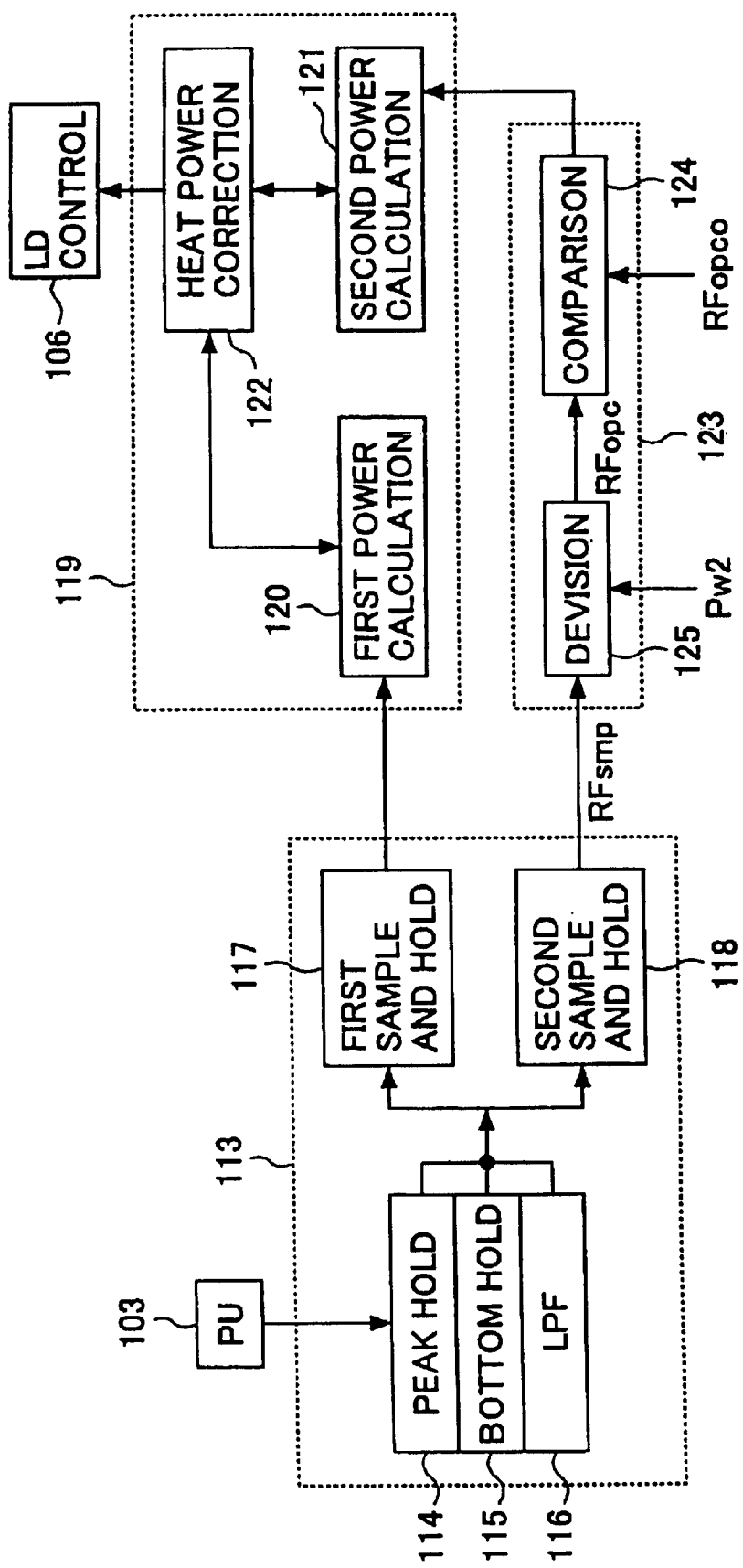
FIG. 16 shows a block diagram illustrating part of the configuration shown in FIG. 15 in detail.

FIGS. 15 and 16 are block diagrams showing a general configuration of the optical disk apparatus in the second embodiment of the present invention. The circuit configuration shown in FIG. 15 is the same as that shown in FIG. 6 of the first embodiment, and the duplicated description thereof is omitted.

Operation of the trial writing is performed as follows:

Necessary data such as values of heating power is read out from preformat previously recorded onto the optical disk 102, or previously stored in a ROM of a system controller 112 which controls the entirety of the optical disk apparatus 101. Then, by using the data, an LD control signal is generated by a recording-pulse-series generating part 107 and a detection-pulse generation part 108. A light beam emitted from an LD based on this LD control signal is applied to the optical disk 102, and thus, the trial writing is performed as describe above. The reflected light is received by a light-receiving device (not shown in the figures) of a pickup 103, and, thereby, the reflected light from the optical disk 102 at this time for the trial writing is converted into a reflected-light signal RF, and is outputted to a sampling circuit 113.

From the reflected-light signal RF obtained from the first trial writing zone on which recording is performed by multi-pulse series, with reference FIG. 16, the maximum level Ipk is held by a peak hold circuit 114 of the sampling circuit 113, the minimum level Ibtm is held by the bottom hold circuit 115, and, then, the average level Idc obtained through a high-frequency region removal process by a low-pass filter 116 is detected. These signals are sampled by a first sample-and-hold circuit 117 at predetermined detection positions so as to provide sampled signals, respectively, and, the thus-obtained sampled levels are converted into a digital signal by an A-D converter (not shown in the figure).

In the same manner, from the reflected-light signal RF obtained from the second trial writing zone on which recording is performed by the detection pulse, the maximum level Ipk is held by a peak hold circuit 114 of the sampling circuit 113, the minimum level Ibtm is held by the bottom hold circuit 115, and, then, the average level Idc obtained through a high-frequency region removal process by a low-pass filter 116 is detected. These signals are sampled by a second sample-and-hold circuit 118 at predetermined detection positions so as to provide sampled signals, respectively, and, the thus-obtained sampled levels are converted into a digital signal by an A-D converter (not shown in the figure).

A first power calculation circuit 120 and a second power calculation circuit 121 calculate the optimum heating power Pw1o for the multi-pulse series and the optimum heating power Pw2o for the detection pulses by the above-described processes. In the trial writing, trial writing is performed on the third trial writing zone by the heating power Pw2o calculated by the second power calculation circuit 121. Then, the reflected light from the optical disk 102 obtained during the recording operation is received by the light-receiving device, not shown in the figure, and, the thus-obtained detection signal is sampled and held by the sampling circuit 113 as described above.

Since this detected signal level changes according to the luminous energy emitted from the LD at the time, the signal RFsmp obtained at the time is normalized as a result of being divided by the light-emission luminous energy level Pw2 through a dividing circuit 125 of a recording-condition information calculation circuit 123, and, thus, a recording-condition information value RFopc which reflects the mark formation condition is calculated. This recording-condition information value RFopc obtained during the trial writing is stored in a RAM of the system controller 112, or the like, as a target value RFopco.

A comparator 124 compares the magnitude of this target value RFopco with the recording-condition information value RFopc obtained at predetermined intervals as described above. The second power calculation circuit 121 calculates the optimum heating power Pw2o for the detection pulse according to the result of this comparison each time.

A heating power correction circuit 122 outputs the optimum heating power Pw1o or Pw2o calculated by the first power calculation circuit 120 and the second power calculation circuit 121 to an LD driving current source 109 or 110, and the LD driving current sources 109 or 110 performs control such that the LD emits the optimum heating power Pw1o or Pw2o.

Figure 17:
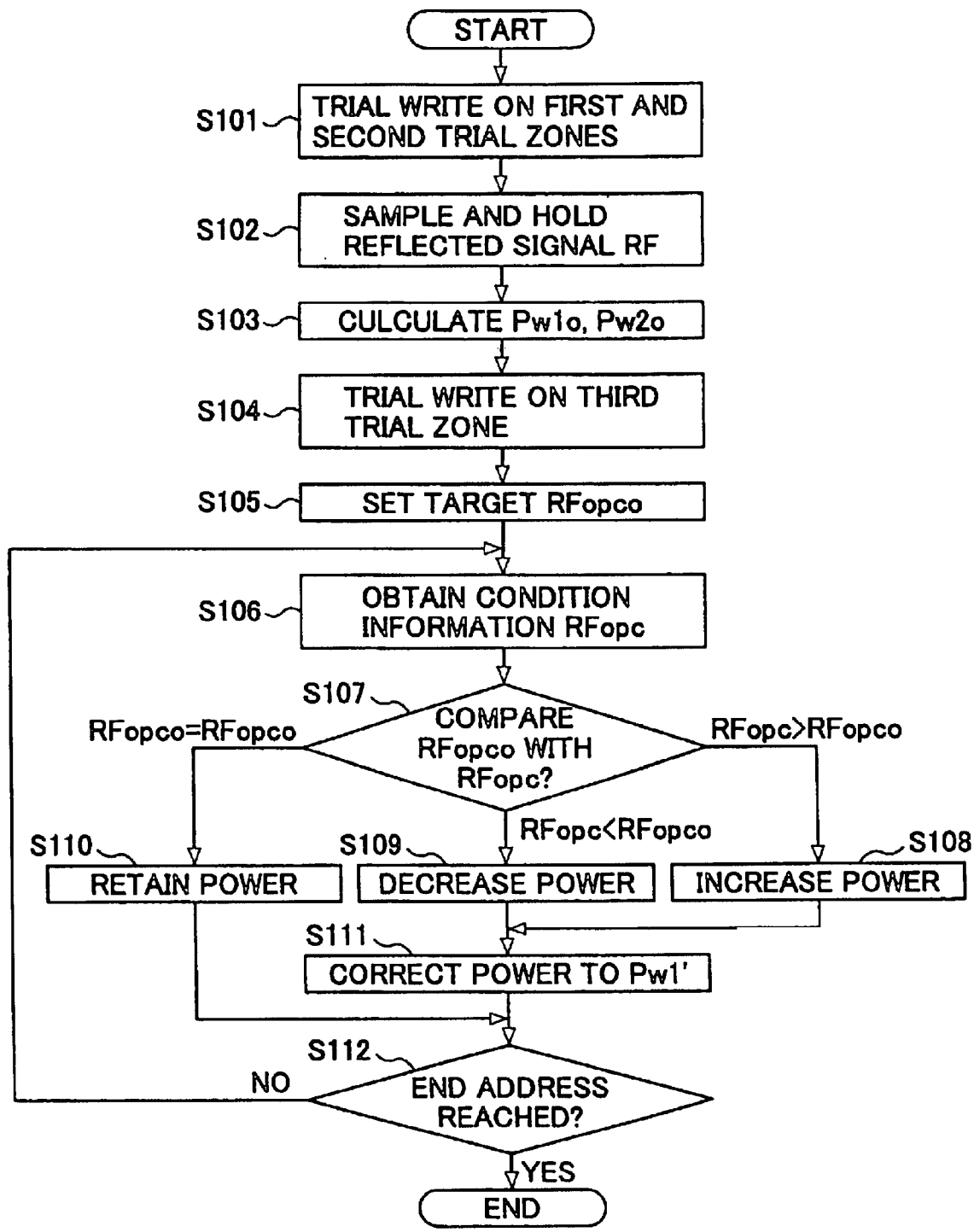
FIG. 17 shows an operation flow chart illustrating operation of the optical disk apparatus according to the second embodiment of the present invention.

With reference to FIG. 17, the trial writing operation and subsequent normal recording operation will now be described. First, trial writing is performed onto the first and second trial writing zones as described above (in a step S101). Then, sampling and holding of the reflected-light signal RF on this recording is carried out as described above by the sampling circuit 113 (in a step S102). Then, the optimum heating powers Pw1o and Pw2o are calculated by the first and second power calculation circuits 120 and 121 by using the data sampled and held as mentioned above (in a step S103). Then, trial writing is performed onto the third trial writing zone by the thus-obtained heating power Pw2o (in a step S104). Then, as described above, the recording-condition information value RFopco is obtained as described above from the results of the above-mentioned recording, this value is set as the target value RFopco (in a step S105), and thus, a series of trial writing is ended. The steps S101 through S105 is a trial writing process as a whole, and the step S105 is a target value acquisition process.

After the end of trial writing, the R-OPC operation is started after starting of the normal recording onto the optical disk 102, and, then, the recording-condition information value RFopc is obtained as described above at predetermined intervals (in a step S106). The comparator 124 compares the target value RFopco with the current recording-condition information value RFopc each time (in a step S107).

When the current recording-condition information value RFopc is larger than the target value Ropco, that is, RFopc>RFopco, it can be determined that the record mark formed is left smaller than an ideal size by determination of the step S107, and, thus, the heating power of the detection pulse is increased (in a step S108). In contrast thereto, when the current recording-condition information value RFopc is smaller than the target value Ropco, that is, RFopc<RFopco, it can be determined that the record mark formed has already become larger than the ideal size by determination of the step S107, and, thus, the heating power of the detection pulse is decreased (in a step S109). When the current recording-condition information value RFopc is equal to the target value RFopco, that is, RFopc=RFopco, the heating power for the detection pulse is maintained as the current value (in a step S110).

Thereby, only the detection pulse is controlled to have a proper heating power according to the condition of mark formation. Accordingly, the heating power for the normal multi-pulse series is then corrected by the first power calculation circuit 120 by performing operation such that the thus-corrected heating power Pw2' for the detection pulse is divided by the predetermined heating power ratio α. That is, while the detection pulse is used for detecting excess or shortage in recording condition during the normal recording, and the heating power of the detection pulse is appropriately corrected according to the result thereof to Pw2', and, also, the heating power for the multi-pulse series is appropriately corrected to Pw1' (in a step S111). Each time the heating power for the detection pulse is corrected as described above, the heating power for the multi-pulse series is also corrected such that "Pw1'=Pw2'/α".

The above processing of the steps S106 through S110 is performed until the end address of recording data is reached (in a step S112).

Figure 18:
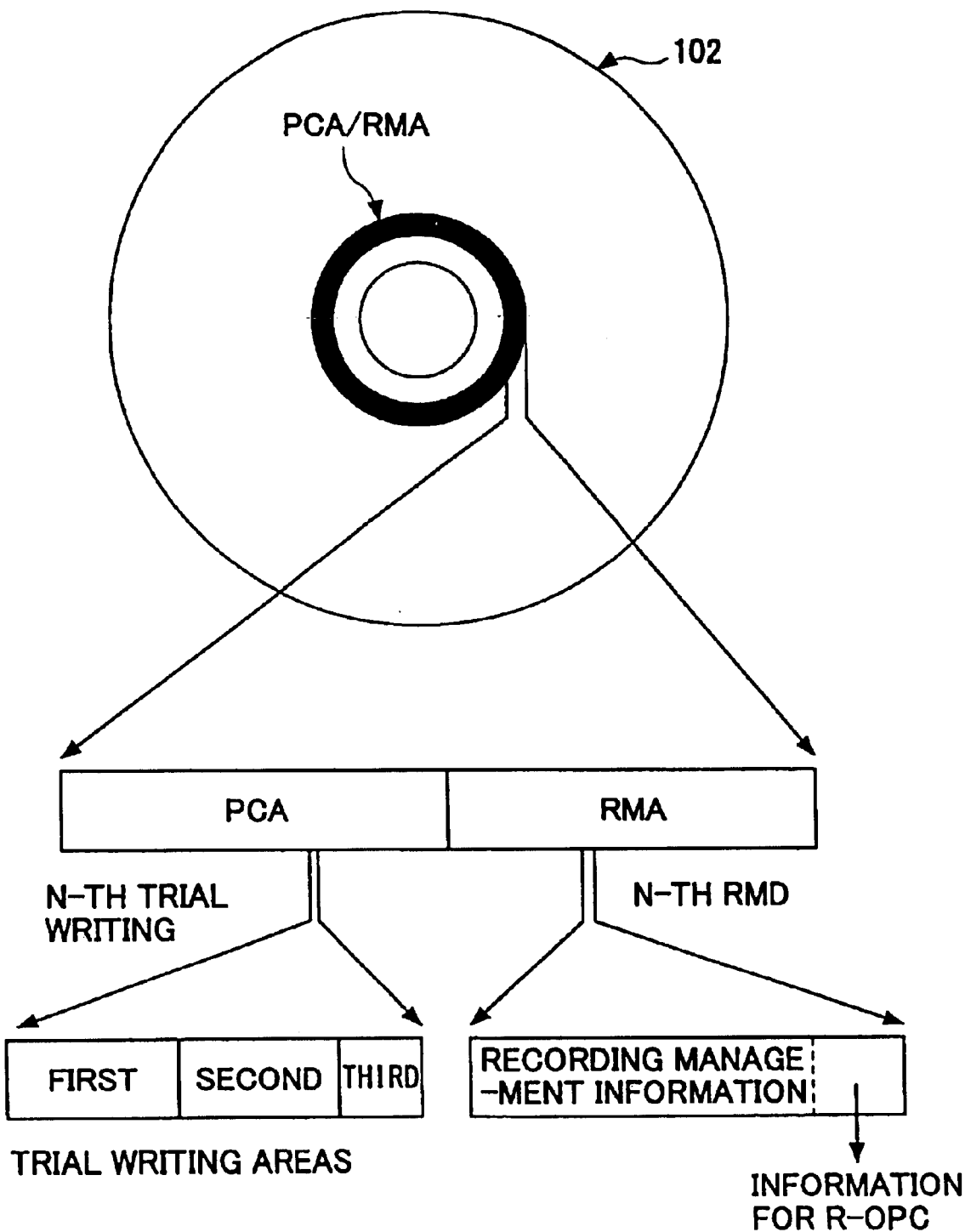
FIG. 18 illustrates an RMA of an optical disk medium which is utilized by the second embodiment of the present invention.
Figure 19A:
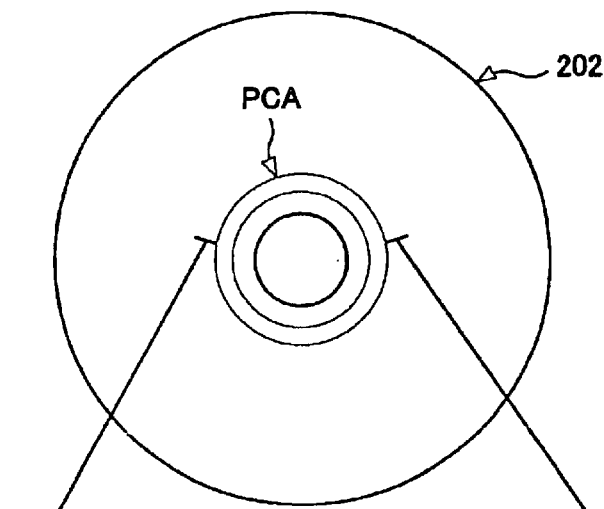
FIGS. 19A through 19F illustrate a PCA of an optical disk and trial writing performed thereon according to a third embodiment of the present invention.
Figure 19B:
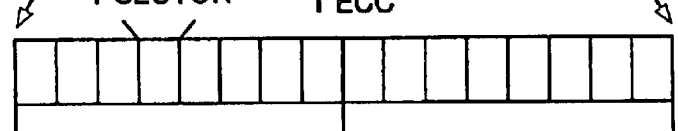
Figure 19C:
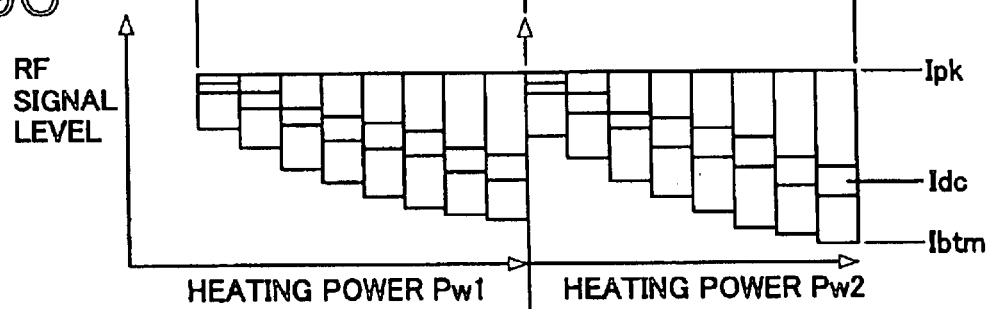
Figure 19D:
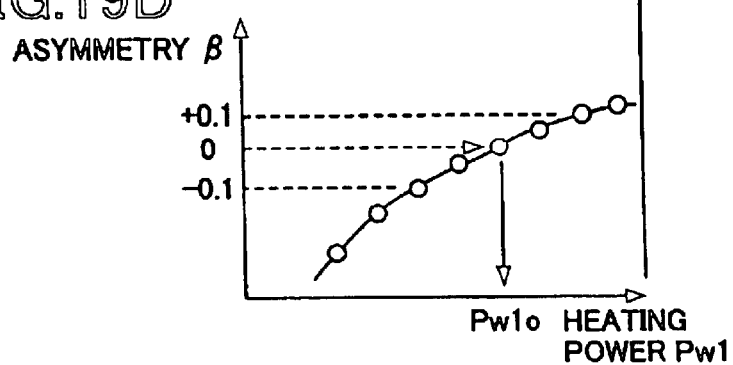
Figure 19E:
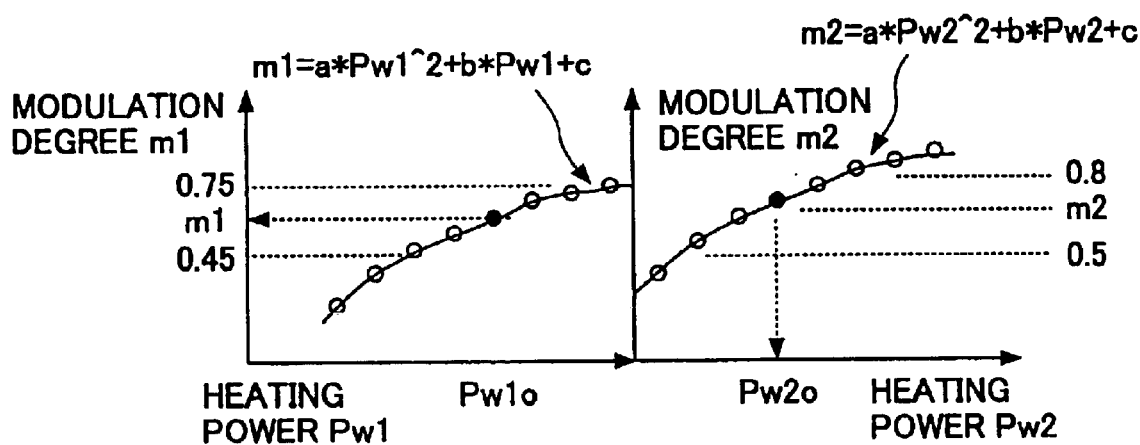
Figure 19F:
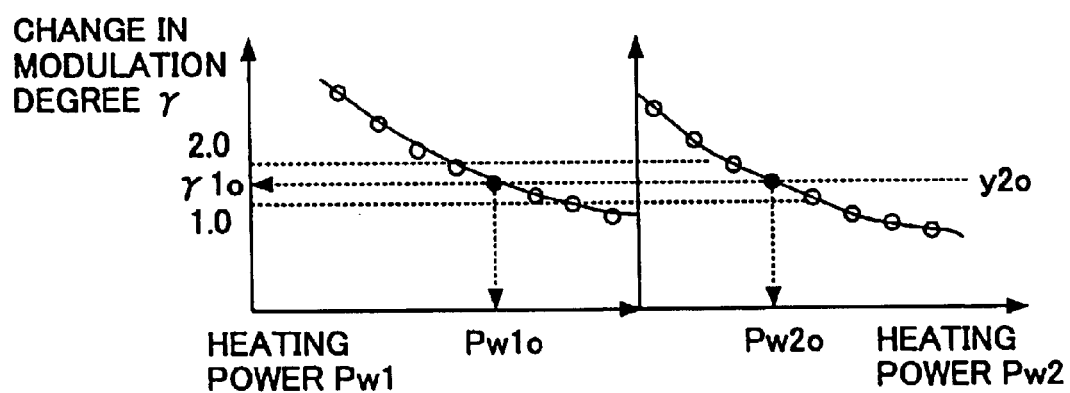

Thus, as recording to the optical disk 102 is performed while the R-OPC operation always thus corrects the heating powers for the multi-pulse series and detection pulse, the heating powers can be always kept as the optimum ones even when various change in performance of the driving apparatus due to aging or the like occurs. Thereby, it is possible to attain recording on the optical disk 102 with uniform and low jitter As shown in FIG. 18, the recordable optical disk 102 such as a DVD-R, or the like has a recording management area (RMA) to which recording management data (RMD) obtained by the trial writing is recorded, other than the trial writing area (PCA). This RMD recorded onto the RMA can have various information concerning recording written thereto, such as disk ID, drive ID, a recording strategy setting, record date/time, address of trial writing, optimum heating power, etc.

Generally, as the R-OPC is designed for the particular disk driving apparatus arbitrarily, information concerning the R-OPC operation is not recorded in the RMA. Therefore, it is necessary to perform trial writing to obtain the above-mentioned optimum heating powers for the multi-pulse series and detection pulse and the above-mentioned recording-condition information onto the optical disk 102 each time.

Therefore, the optimum heating power for multi-pulse series and the optimum heating power for the detection pulse obtained by the above trial writing are made to be written in as information of the RMA. The position thereof to be used for this purpose may be a part of a predetermined area prepared for drive ID data such as serial number and/or model number of the driving apparatus, or an area for reserved data to be newly allocated therefor.

Thus, the above-mentioned information concerning R-OPC may be written there such that, the optical disk 102 on which the trial writing has been performed and the specific optical disk apparatus 101 are determined, and, thereby, the specific combination can be identified from the thus-written information. Furthermore, instead of the optimum heating power for multi-pulse series and the optimum heating power for the detection pulse themselves, the ratio of the optimum heating power for multi-pulse series and the optimum heating power for the detection pulse calculated from the data obtained by trial writing, Pw2o/Pw1o, may be written there.

One example of R-OPC performed using the information recorded on the above-mentioned RMA will now be described.

That is, the optical disk apparatus 101 recognizes the optical disk 102, and reads the latest recording management information written in the RMA concerning the results of the trial writing performed in the past, as preparation for actual recording. From this record management information, the information to be used for R-OPC operation is selected written in a previously allocated position. Then, the optical disk apparatus 101 determines as to whether or not the information concerning the R-OPC operation has been written in the optical disk 102 by the same optical disk apparatus 101 in the past. When it has not been written in the past, the above-mentioned trial writing can newly be performed, thereby, the optimum powers for multi-pulse series and the detection pulse and the recording-condition information value are obtained, and, thereby, the R-OPC operation can be performed.

On the other hand, when the information concerning the R-OPC operation has been written in the past, the ratio Pw2o/Pw1o which is calculated from the optimum powers for multi-pulse series and detection pulse read therefrom, or the ratio of the optimum heating powers Pw2o/Pw1o, read therefrom is held in a RAM, or the like of the system controller 112. Trial writing to be newly performed in this case is only such that, thereby, the optimum heating power for multi-pulse series is obtained, and then, the optimum heating power for the detection pulse can be calculated by carrying out the multiplication of the ratio of the optimum heating powers held in the RAM or the like. Then, by performing trial writing for obtaining the recording-condition information value using this optimum heating power, all the information needed for the R-OPC operation is obtained. Thus, by reading the information concerning R-OPC operation from the RMA, trial writing for the detection pulse can be omitted, and, thereby, the area to be used in the PCA can be made into a small-sized one.

Moreover, it can also become possible that only trial writing for obtaining the recording-condition information value RFopc is performed using the information concerning R-OPC operation read from the RMA, and, thereby, the trial writing can be simplified further.

A third embodiment of the present invention will now be described.

In the third embodiment, as shown in FIGS. 19A through 19F, different from the above-described second embodiment described with reference to FIGS. 12A through 12F, 8 sectors of the PCA are used for the first trial writing for multi-pulse series, the other 8 sectors thereof are used for the second trial writing for the detection pulse, and no third trial writing is performed. The other configuration and operation of the trial writing of the third embodiment are the same as those of the second embodiment, and duplicated description thereof is omitted.

Figure 20:
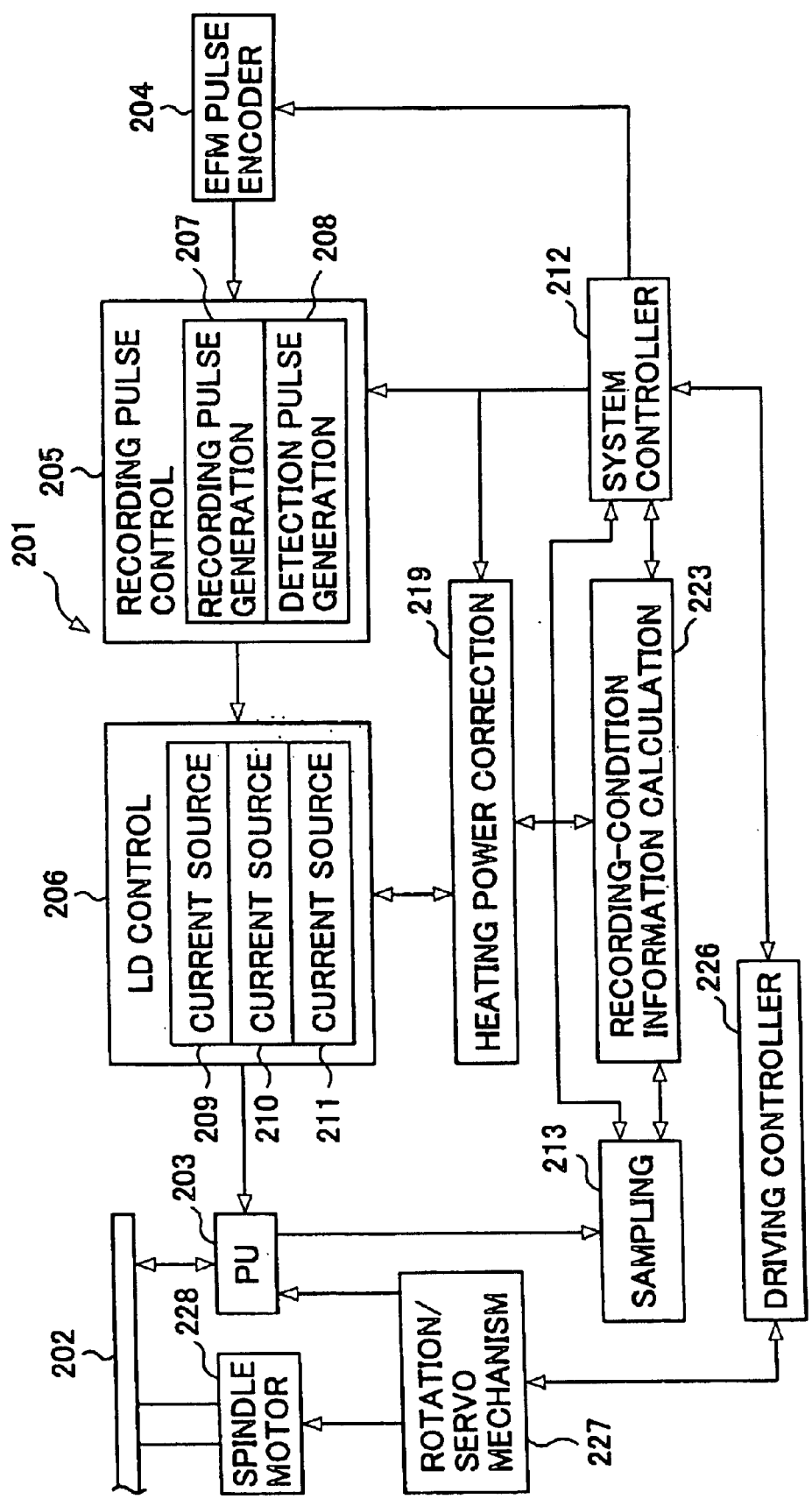
FIG. 20 shows a block diagram illustrating a general configuration of an optical disk apparatus in the third embodiment of the present invention.
Figure 21:
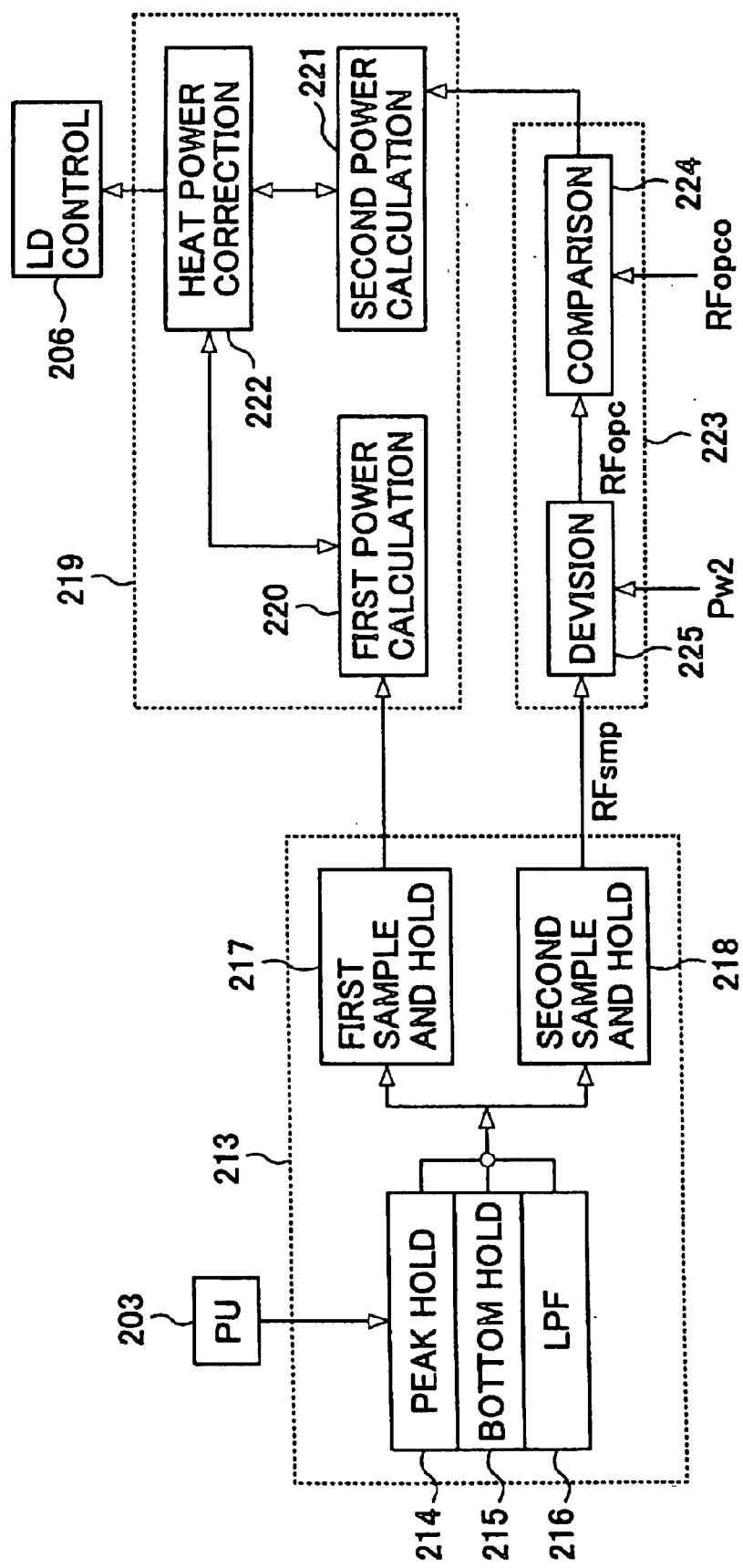
FIG. 21 shows a block diagram illustrating part of the configuration shown in FIG. 20 in detail.
Figure 22:
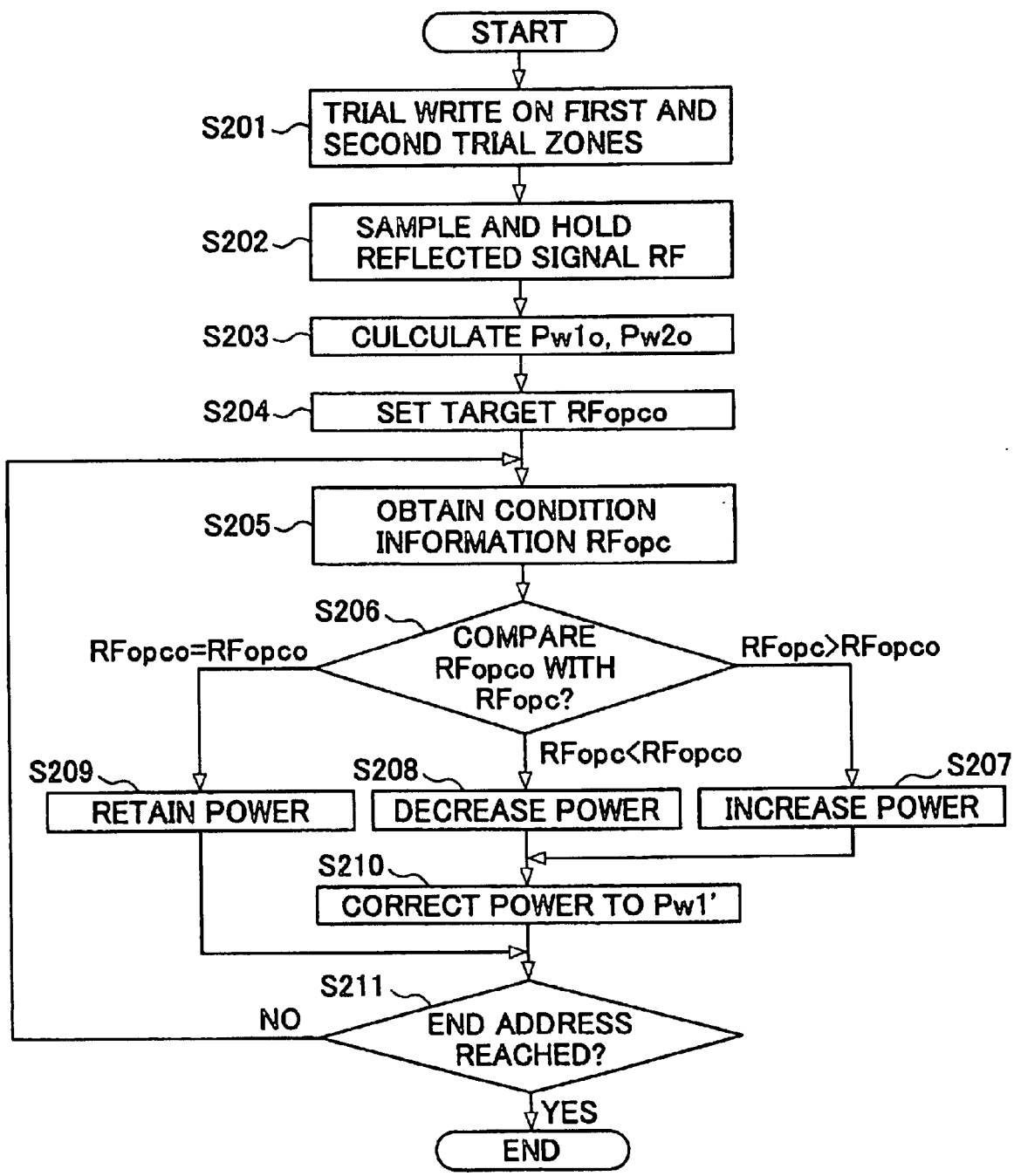
FIG. 22 shows an operation flow chart illustrating operation of the optical disk apparatus in the third embodiment of the present invention.

Furthermore, as shown in FIGS. 20 and 21, the block configuration of an optical disk apparatus 201 in the third embodiment of the present invention is the same as that of the above-described second embodiment described with reference FIGS. 15 and 16. Also, as shown in FIG. 22, the operation of the third embodiment is the same as that of the second embodiment described above with reference to FIG. 17, except that, in the third embodiment, the third trial witting is omitted as mentioned above, each of the first and second trial writing zones includes 8 sectors as mentioned above, and the target value RFopco is obtained through trial writing made onto the first and second trial writing zones. The other configuration and operation of the third embodiment is the same as those of the second embodiment, and duplicated description thereof is omitted.

A fourth embodiment of the present invention will now be described.

First, same as in the above-described embodiments, a record mark corresponding to each mark data length nT (n denotes an integer in a range between 3 and 14, and T denotes a recording clock period) is formed by a plurality of heating pulses (multi-pulse series) for the pigment-recording-layer type (pigment-type) optical disk.

As a basic setting of the above-mentioned plurality of heating pulses for each mark data length nT, the number of pulses, n–x (x is 1 or 2), and the ratio of the pulse width of the top pulse to the recording clock period, Ttop, the ratio of the pulse width of the subsequent pulses to the recording clock period, Tmp, and the ratio of the pulse width of the last pulse to the recording clock period, Ttail are determined. Moreover, there are a recording power Pw of the heating pulse part for forming a mark and a bias power Pb for forming a cooling pulse part during the mark and a space between marks. The condition of mark formation is strongly affected by the recording line velocity Lv and thus has a strong correlation therewith. That is, as the recording line velocity becomes larger, the optimum value of recording power becomes larger, as well-known in the art. Moreover, there is a ratio in recording power "ρ=Pmax/Pmin" of the optimum recording power Pmax for the most outer (peripheral) zone of the optical disk (namely, for the maximum recording line velocity) to the optimum recording power Pmin for the most inner (central) zone of the optical disk (namely, for the minimum recording line velocity), which shows recording-line-velocity dependency on the disk.

In the fourth embodiment of the present invention, setting is made in detail for the above-mentioned ratio Ttop of the head heating pulse width to the recording clock period T, the ratio Ttail of the pulse width of the last heating pulse to the recording clock period T, and the above-mentioned ratio ρ of the recording powers, according to the recording line velocity. Especially, finely correction is made on the recording power (heating power).

When recording control is made by the above-mentioned CAT scheme for a pigment-type (pigment-recording-layer type) DVD disk of 120-mm diameter, generally speaking, the recording line velocity at the most inner zone of the disk is approximately 3.5 m/s, and is approximately 8.5 m/s for the most outer zone. The recording clock frequency is approximately 63.7 MHz for the most outer zone, and is approximately 26.2 MHz for the most inner zone. of the disk. Thereby, difference in the recording line velocity is approximately 2.4 times therebetween. In such a condition, when recording were made by fixed setting of the pulse width and heating power of recording pulse series throughout the entirety of the recording area of the pigment-type optical disk, the following problem would occur: Excess or insufficiency would occur for a preliminary heating by the head heating pulse, the modulation degree of RF signal would not be uniform, and the asymmetry of the RF signal would become larger as the recording line velocity becomes higher (for the outer zone). Moreover, the optimum value of the pulse width of the tail heating pulse would be changed, and, thereby, the record mark width would become uneven.

According to the fourth embodiment of the present invention, it becomes possible to attain recording by record marks having uniform signal characteristic and low jitter throughout the disk medium in the range between the most inner zone and the most outer zone.

Figure 24:
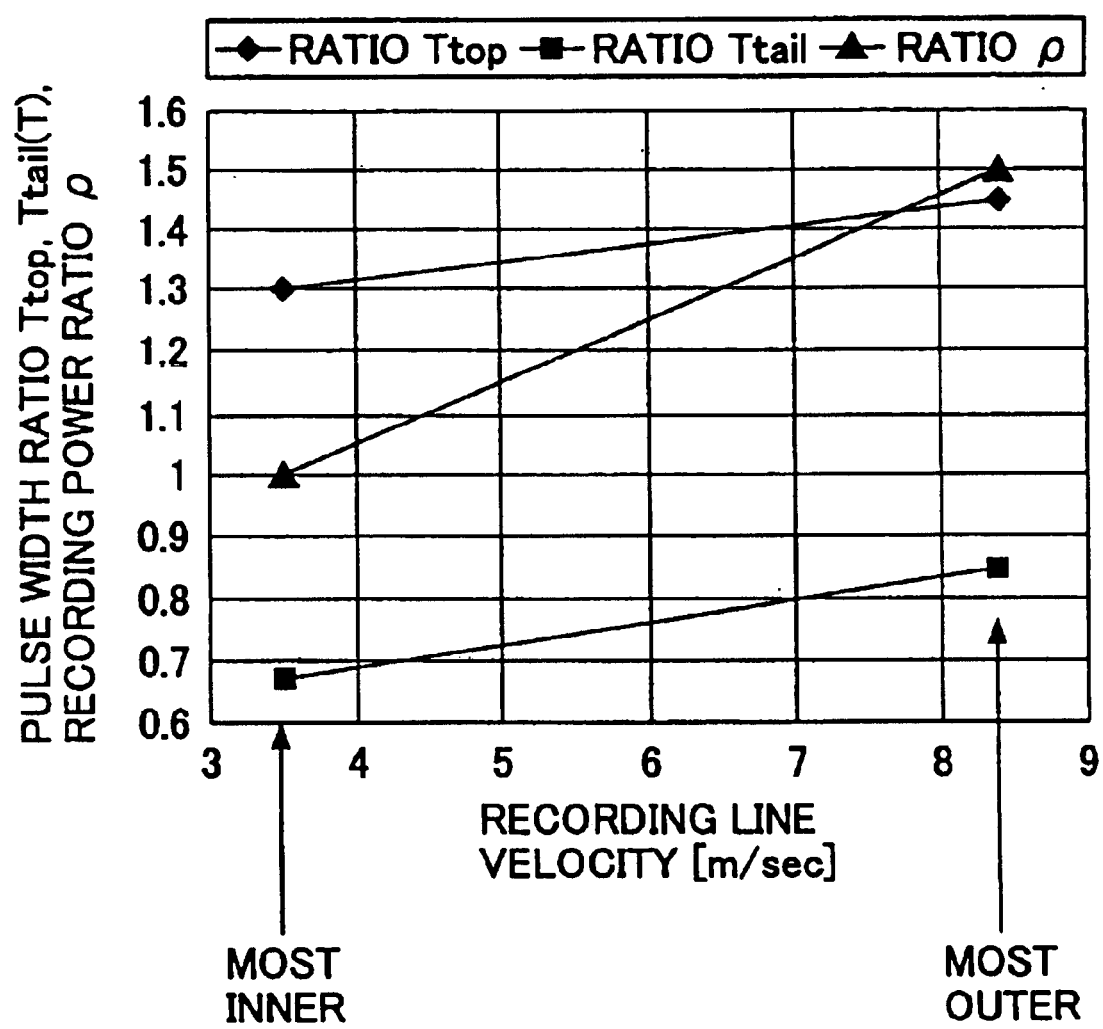
FIG. 24 illustrates characteristics of pulse width ratios and recording power ratio with respect to recording line velocity according to the fourth embodiment of the present invention.

First, as shown in FIG. 24, setting is made for the most inner zone such that: the number of heating pulses of the recording pulse series is n–1 (n denotes a mark data length); the ratio Ttop of the pulse width of the head heating pulse is 1.30 T, each of the ratio Tmp of the pulse width of each subsequent intermediate pulse and the ratio Ttail of the pulse width of the tail heating pulse is 0.65 T, and the optimum recording power Pwmin (or Pmin) of the heating pulse is 9.0 mW. These setting values are typical numerical values for a pigment-type disk medium, and, may be changed depending on various tuning and/or recording material thereof.

Then, as shown in FIG. 24, as the recording line velocity increases, the ratios Ttop and Ttail are made increased, and, also a ratio of recording powers "ρ=Pw/Pmin" is made increased. Thereby, the optimum heating energy is applied for a head portion and a tail portion of each record mark, and, also, the optimum recording power is applied, for recording. Thereby, it is possible to make the width of marks uniform, and, also, the jitter characteristic can be kept non-problematic.

Thus, when the recording line velocity changes as the radial position on the disk changes according to the CAV recording control scheme, satisfactory recording performance can be ensured by updating these setting values, as follows:

Namely, the pulse width ratio Ttop of the head recording pulse with respect to the recording clock period is changed from 1.30 T (≈49.7 (ns)) at the most inner zone to 1.45 T (≈22.8 ns) at the most outer zone. Thus, change is made by total 0.15 T.

Furthermore, the pulse width ratio Ttail to the recording clock period T of the tail heating pulse changes from 0.65 T (≈24.8 (ns)) at the most inner zone to 0.85 T (≈13.3 (ns)) at the most outer zone. Thus, totally, it changes by 0.20 T.

Furthermore, the rear edge of the head heating pulse and the rear edge of following each intermediate heating pulse are always synchronized with the recording clock pulses. Further, the pulse width ratio Tmp of each intermediate pulse is fixed as 0.65 T The recording power is updated such that: the ratio ρ (=Pw/Pmin) of the recording power Pw at the relevant radial position (for the relevant recording line velocity) to the optimum recording power Pmin of the heating pulse at the most inner zone (namely, for the minimum recording line velocity) is updated and changed from 1.0 to 1.50. Thus, totally, the ratio ρ is changed by 0.50 according to the radial position corresponding to the increase in recording line velocity so that it may become larger.

FIGS. 25A, 25B and 25C comparatively show light-emission waveforms of the thus-set recording pulses at the most inner zone and most outer zone together in such a time scale that the periods of the recording channel clock pulses are caused to be equal to one another.

Each setting value will now be described in detail. When recording is made at different recording line velocities on the pigment-type optical disk, generally speaking, the recording power is approximately proportional to the squire root of the recording line velocity, as well known, for example, see Japanese Laid-Open Patent Application No. 10-106008 mentioned above.

That is, the recording power Pw is calculated by $Pw = Klv \sqrt{Lv}$ where Lv denotes the recording line velocity, and Klv denotes a constant. However, in order to optimize all the setting values including the above-mentioned pulse width ratios Ttop and Ttail, and the recording power ratio ρmax=Pwmax/Pwmin (the ratio of the recording power Pwmax for the maximum recording line velocity at the most outer zone to the minimum recording line velocity at the most inner zone), according to the recording line velocity, the recording powers obtained from the above-mentioned recording-power ratio ρ obtained from linear approximation with the following formula have proper values for the recording line velocities throughout the recording zone of the optical disk:

$\rho = Klv \times Lv + Kpw$ where Kpw denotes a constant.

Furthermore, for the ratios Ttop and Ttail, the optimum setting values can be obtained according to the recording line velocity throughout the recording zone of the disk by using the setting value calculated through similar linear approximation. Specifically, the following approximation formulas are used:

$Ttop = 0.030 \times Lv + 1.195$ $Ttail = 0.036 \times Lv + 0.544$ $Pw = Pwmin \times \rho = Pwmin \times (0.100 \times Lv + 0.650)$ Instead of using these formulas with respect to the recording line velocity, it is possible to set and update the recording pulses as a function of the radial position on the disk, or to update the same according to addresses obtained by the preformat information of the disk. Thereby, it becomes possible to calculate the optimum setting values with respect to any recording line velocity by the above-described method through simple calculation, according to the fourth embodiment of the present invention.

A combination of the recording pulse series according to the CAV recording control scheme is not limited to the above-described one. Other than it, the basic concept of the fourth embodiment of the present invention may be applied to a case where, as being applied for CD-R disk, the front edge position and rear edge position of a single rectangle wave pulse which is not a multi-pulse series but a head portion is emphasized are corrected according to a mark length, a case where, as being applied for DVD-R disk, both the edge positions at the front and rear of the head heating pulse are corrected, and so forth. Specifically, in each of the above-mentioned cases, the setting may be finely optimized with respect to the recording line velocity in a similar manner. However, in contrast thereto, according to the fourth embodiment of the present invention, the front edge position of the head heating pulse and the rear edge position of the tail heating pulse are made to be changed as described above as shown in FIG. 25C, and, thereby, control can be simplified.

Figure 26A:
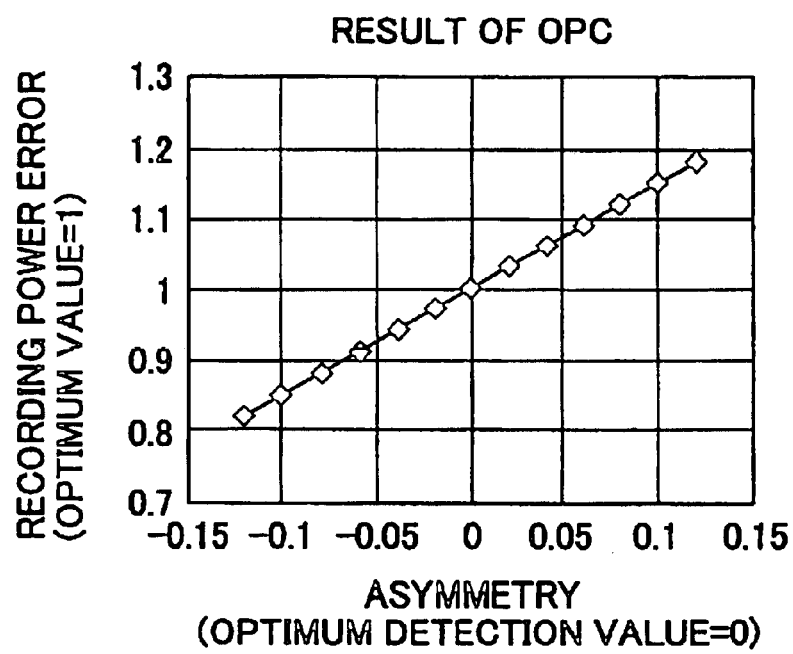
FIG. 26A illustrates recording-power dependency of Asymmetry of a pigment-type (write-once) optical disk medium.
Figure 26B:
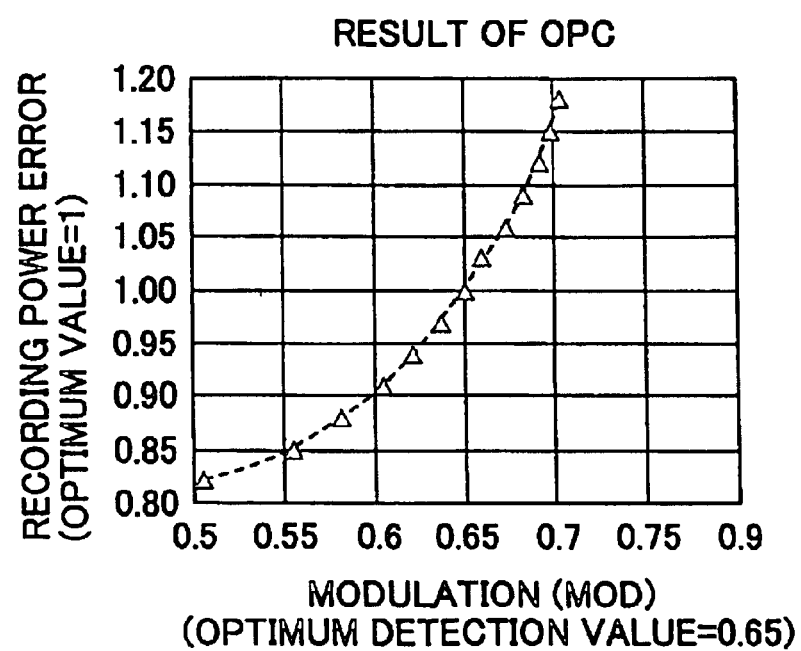
FIG. 26B illustrates recording-power dependency of Modulation of a phase-change-type (erasable) optical disk medium.

In more detail, as shown in FIGS. 26A and 26B, recording is made on the trial writing zone provided at the most inner position of the optical disk medium while the recording power is changed by a plurality steps, as in the previously described embodiments, and an optimum recording power is determined such that the characteristic values obtained from the respective reproduction signals may have satisfactory values. Moreover, trial writing at the maximum recording line velocity can also be performed, and thereby, a basic approximation formula for the recording power with respect to the entire zone of the optical disk according to the CAV recording scheme may be calculated.

Specifically, two types of optical disks will now be described in detail.

First, in a case of a pigment-type optical disk, as the characteristic value of the reproduction signal, 3 T modulation degree (asymmetry: Asy.) is preferably employed as the characteristic value of the reproduction signal, and, "Asy.=0" is determined as the optimum detection value. As shown in FIG. 26A, 'asymmetry' is a value obtained through normalization of a difference between the average level on the longest data amplitude of the RF signal and the average level on the shortest data amplitude thereof by the longest data amplitude, and shows the asymmetry between the mark length and space length. In case of EFM pulse modulation, $$\text{Asymmetry} = \frac{\frac{I_{14H} + I_{14L}}{2} - \frac{I_{3H} + I_{3L}}{2}}{I_{14H} - I_{14L}}$$

where $I_{14H}$ denotes a 14T space level, $I_{14L}$ denotes a 14T mark level, $I_{3T}$ denotes a 3T space level, $I^{3L}$ denotes a 3T mark level. According to the fourth embodiment, the optimum recording power (Pmin=9.0 (mW)) for the most inner zone is thus calculated, which is then changed into the optimum recording power (Pmax=13.6 (mW)) for the most outer zone, as the above-described ratio βmax is increased into 1.50. Moreover, according to OPC in the present embodiment, by a plurality of recording powers, as shown in FIG. 26A, recording-power dependency of the asymmetry is detected. Accordingly, an asymmetry approximation formula of "Pw=0.9×Asy.+5.9" is calculated, in the case of recording powers shown in FIG. 26A. Further, as will be described later, by detecting a shift of asymmetry, it is possible to calculate a shift of the recording power ΔPw by using the above-mentioned approximation formula.

In a case of a phase-change type optical disk, as the characteristic value of the reproduction signal, 14T modulation degree (Mod.) is preferably employed, and, "Mod.= 0.65" is determined as the optimum detection value. As shown in FIG. 26B, Mod. is a value obtained through normalization of the longest data amplitude of the RF signal by the maximum level on the longest data, and shows a relative ratio of reflectance difference between the mark and space on the maximum length data. In case of EFM pulse modulation, $$\text{Modulation} = \frac{I_{14H} - I_{14L}}{I_{14H}}$$

where $I_{14H}$ denotes a 14T space level, and $I_{14L}$ denotes a 14T mark level. With regard to the optimum recording power for the phase-change type optical disk, a γ method may be used in many cases in which a recording power Pt such that an inclination γt of a target Mod. change may be obtained is multiplied by a constant ρt, and, thus, the optimum recording power is obtained. However, description thereof is omitted. Moreover, all the other drawings illustrating the fourth embodiment illustrate the pigment-type-optical disk.

Moreover, according to OPC in the present embodiment, by the plurality of recording powers, as shown in FIG. 26B, recording-power dependency of the Modulation is detected. Accordingly, a Modulation approximation formula of "Pw= 8.8×Mod.²+8.9×Mod.+3.1" is calculated, in the case of recording power shown in FIG. 26B. Further, by detecting a shift of Modulation during recording, it is possible to calculate a shift of the recording power ΔPw by using the above-mentioned approximation formula. In fact, actually measured values well coincide with the thus-calculated quadratic approximated values.

A specific processing method of the above-described scheme according to the fourth embodiment of the present invention will now be described.

Generally, a groove for acquiring a tracking error signal (push pull signal) is formed onto a recording disk such CD or DVD, and a wobble signal is recorded by bending the groove in a zigzag manner. This wobble signal is detected by a programmable BPF for various recording line velocities, and, therefrom, coded information such as that coded by frequency modulation or phase modulation is restored. Accordingly, even from a non-recorded disk, address information and disk information unique to the disk can be obtained. A method by which the above-mentioned information may be generated from a slit-like intermittent pit formed in a land (LPP: Land-Prepit signal) is also known.

Especially, according to a wobble scheme by a phase modulation in DVD, it is possible to set the frequency thereof to very high, and, with regard to the scheme by LPP, it is possible to demodulate from a signal formed into a minute figure equivalent to a data length. Accordingly, highly precise position detection is possible with respect to pre-addresses given to the disk. Therefore, it becomes possible to connect and record on the terminus part of a last record at an accuracy of approximately ±5T by detecting and demodulating this preformat information, even in case where record data is added to follow the last record, or interrupting record and resuming is performed.

From the preformat information employing a low-frequency-band wobble signal which is different from a recording data band as in CD-R or CD-RW, it is difficult to connect to the terminus part of a last record at sufficiently high accuracy. Accordingly, in this case, a recording clock signal is generated by PLL with reproduction of the already recorded immediately preceding data, and also, a recording clock signal is generated from the wobble-signal, thereby, the clock signal to be used beings switched at a time the target address is reached from the already reached data. Thereby, it becomes possible to add record data so as to follow a last record or to interrupt record and resume. Therefore, even in a case where a lot of data is recorded together in a write-at-once manner, it is possible to perform recording without causing any problem for reproduction data, by resuming and adding recording data so as to follow as mentioned above after interrupting recording.

Figure 28:
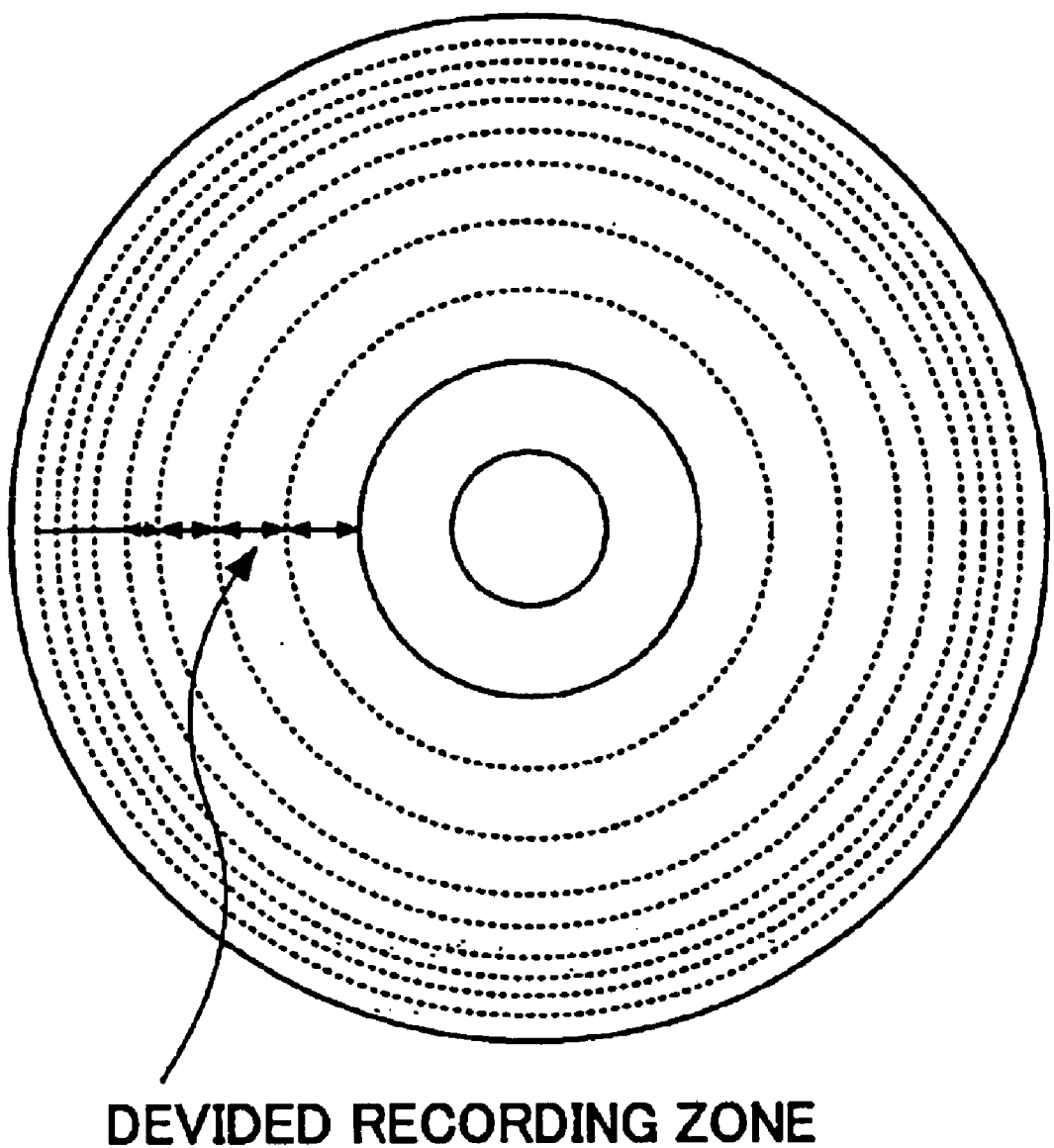
FIG. 28 shows a plan view of a plurality of recording zones divided concentrically.

In the fourth embodiment of the present invention, as shown in FIG. 28, in case where a plurality of recording zones separate concentrically are set, it is possible to use a well-corrected optimum recording power for each recording zone according to the method as will now be described, and, to attain recording such as to provide jitter characteristic which is uniform throughout the disk recording area and non-problematic.

Figure 29:
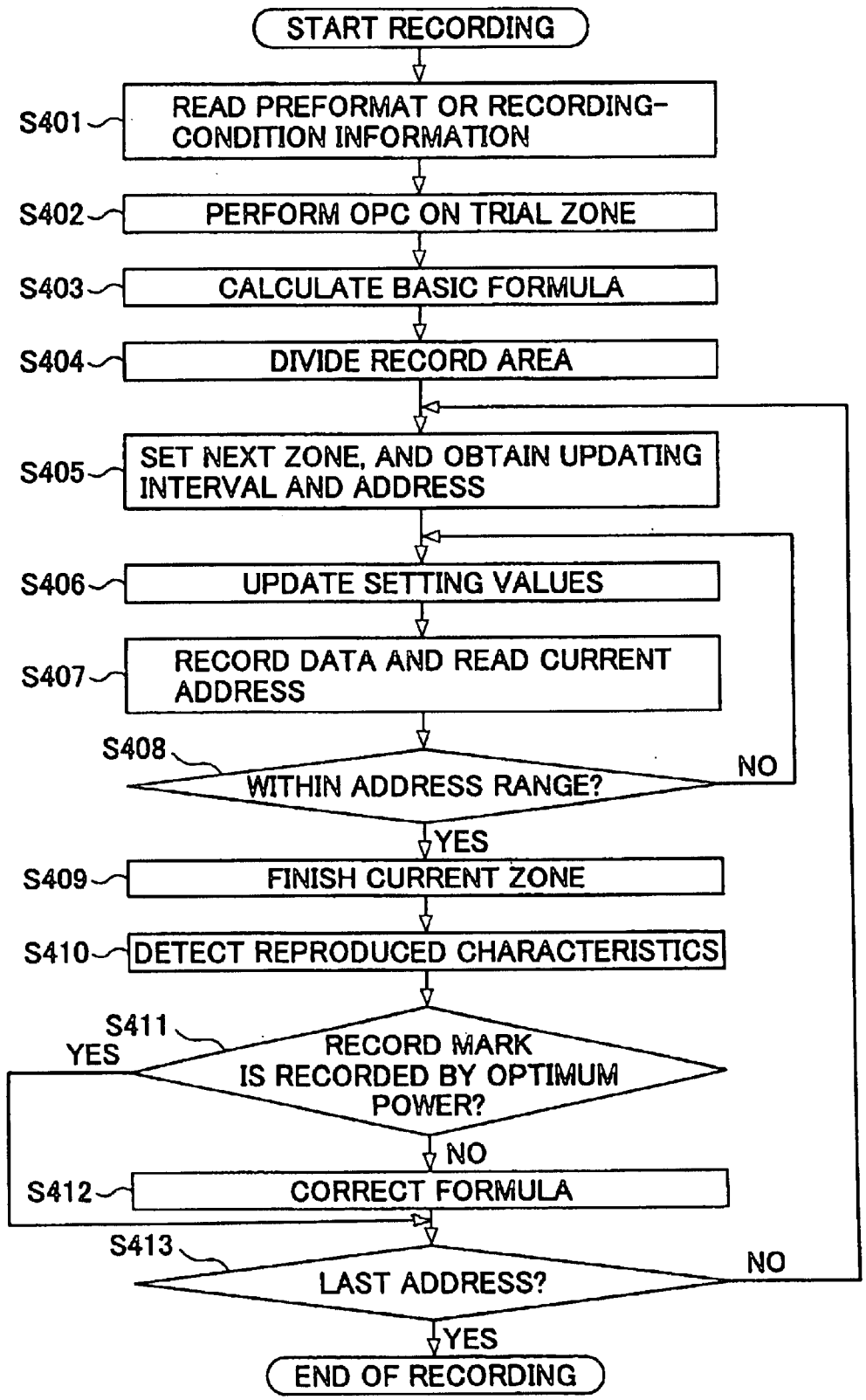
FIG. 29 shows an operation flow illustrating operation according to the fourth embodiment of the present invention.

The information recording method in this fourth embodiment of the present invention will now be described with reference to FIG. 29. The above-described recommended setting values of the recording pulse widths for a plurality of recording line velocities including the minimum (most inner) recording line velocity and the maximum (most outer) recording line velocity, and intermediate recording line velocity, and the recommended setting values of the recording powers or the ratio ρmax of the recording powers (the ratio ρ in recording power between those for the inner and outer zones) are read from the preformat information of the optical disk medium 401 (in a step S401). The optimum recording powers are newly reset by using the result of trial writing (OPC) on the minimum (most inner) recording line velocity and the maximum (most outer) recording line velocity by the information record apparatus 401 (S402).

Next, the basic approximation formula (first approximation formula) for respective pulse widths and recording powers with respect to the recording line velocities for the entire recording area of the optical disk medium 401 is derived so that the setting values may be calculated (S403). The recording area of the recording medium 401 is divided as shown in FIG. 28 corresponding to the data amount to be recorded, and, an address range for each recording zone is calculated individually (S404).

Then, an interval of updating the pulse width and recording power setting values for a first recording zone (most inner first recording zone), and an address range corresponding thereto are determined, and, then, the pulse width and recording power setting values for the first recording zone are calculated for updating (S406). Then, while recording is performed by actual CAV control, the current address is read from the preformat information (S407), and it is determined whether or not the read address is within a range in which the setting value is retained (S408). When it is not within the range (N of S408), the newly calculated setting values are used for updating the current values (S406 and S407). Thereby, it is possible to perform recording continuously across different recording zones. When the current address is within the range (Y of S408), the recording is performed by CAV control as described above. The same processing is repeated until the end address of the current recording zone is reached (S409).

Next, after recording onto the current recording zone is completed, the end track of this recording zone is jumped back to, and reproduction is performed thereon. Therefrom, asymmetry detection is performed immediately (S410). Thereby, it is determined whether or not the record marks have been formed by the optimum recording powers. Specifically, the determination is made by a difference $\Delta Pw$ from the optimum recording power calculated by the OPC according to the above-mentioned recording-power dependency (Asy or Mod approximation formula) (S411). When the determination result is no good (N of S411), the basic approximation formula is corrected by the amount of $\Delta Pw$ (S412). Thus, by using the thus-corrected basic approximation formula (referred to as a second approximation formula, henceforth) for setting the recording powers, the same operation is repeated for the subsequent recording zone (S405 through S410).

When the above-mentioned determination result is good (Y of S411), the same operation is repeated for the subsequent recording zone still using the basic approximation formula (first approximation formula) for setting the recording power (S405 through S410).

Then, the same processing (S405 through S413) is repeated until the end address for the data to be recorded is reached, recording is performed by CAV control as described above, and, after the end address is reached (S413), the current processing is finished.

By applying such a recording method, a load needed for control management for recording pulses borne by the controller can be effectively reduced.

Figure 27A:
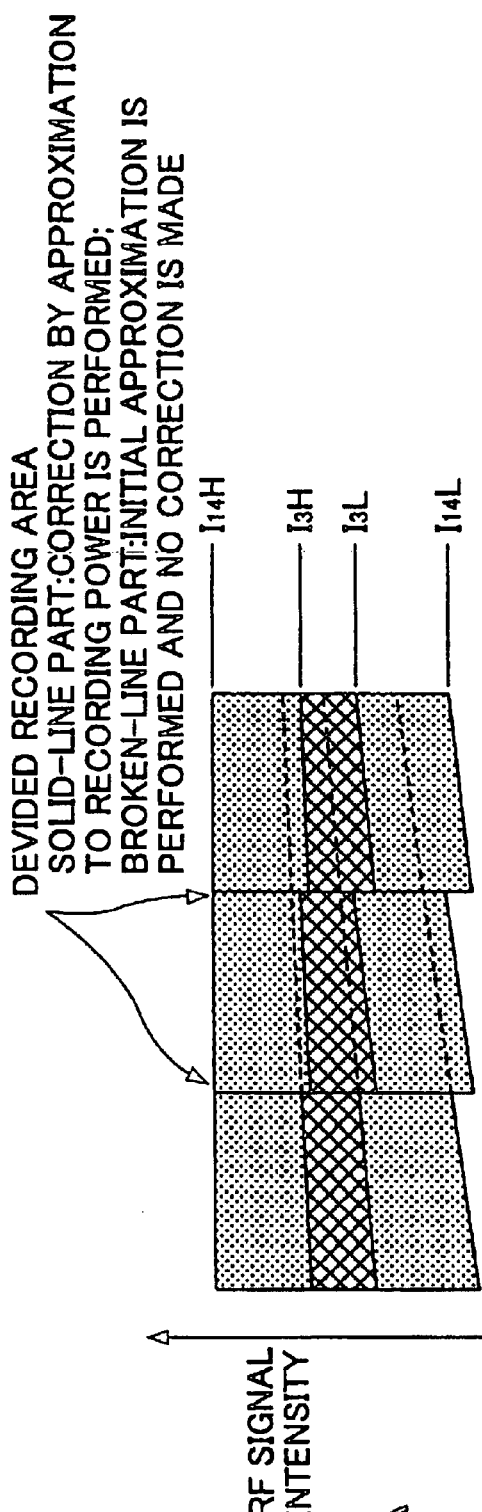
FIGS. 27A and 27B illustrate Asymmetry, Modulation and jitter for illustrating effect of the fourth embodiment of the present invention.
Figure 27B:
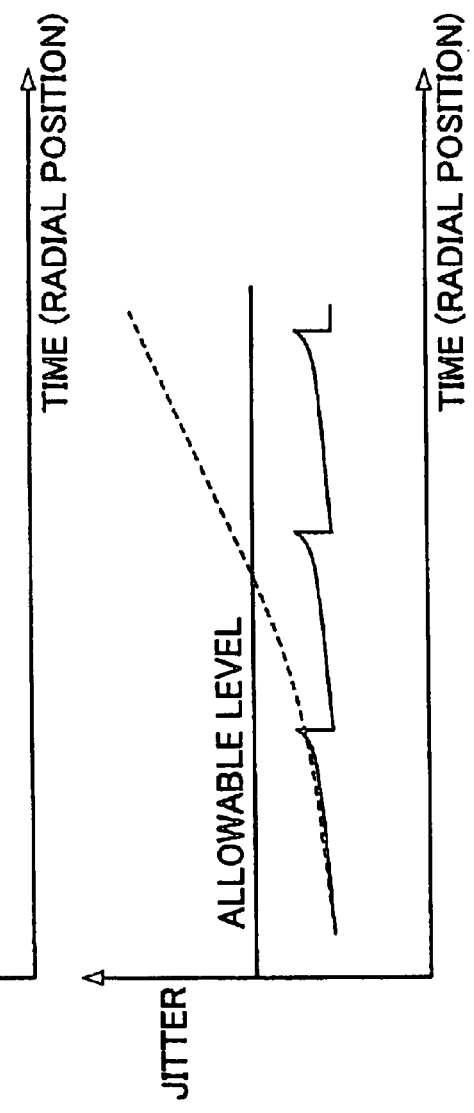
Figure 30:
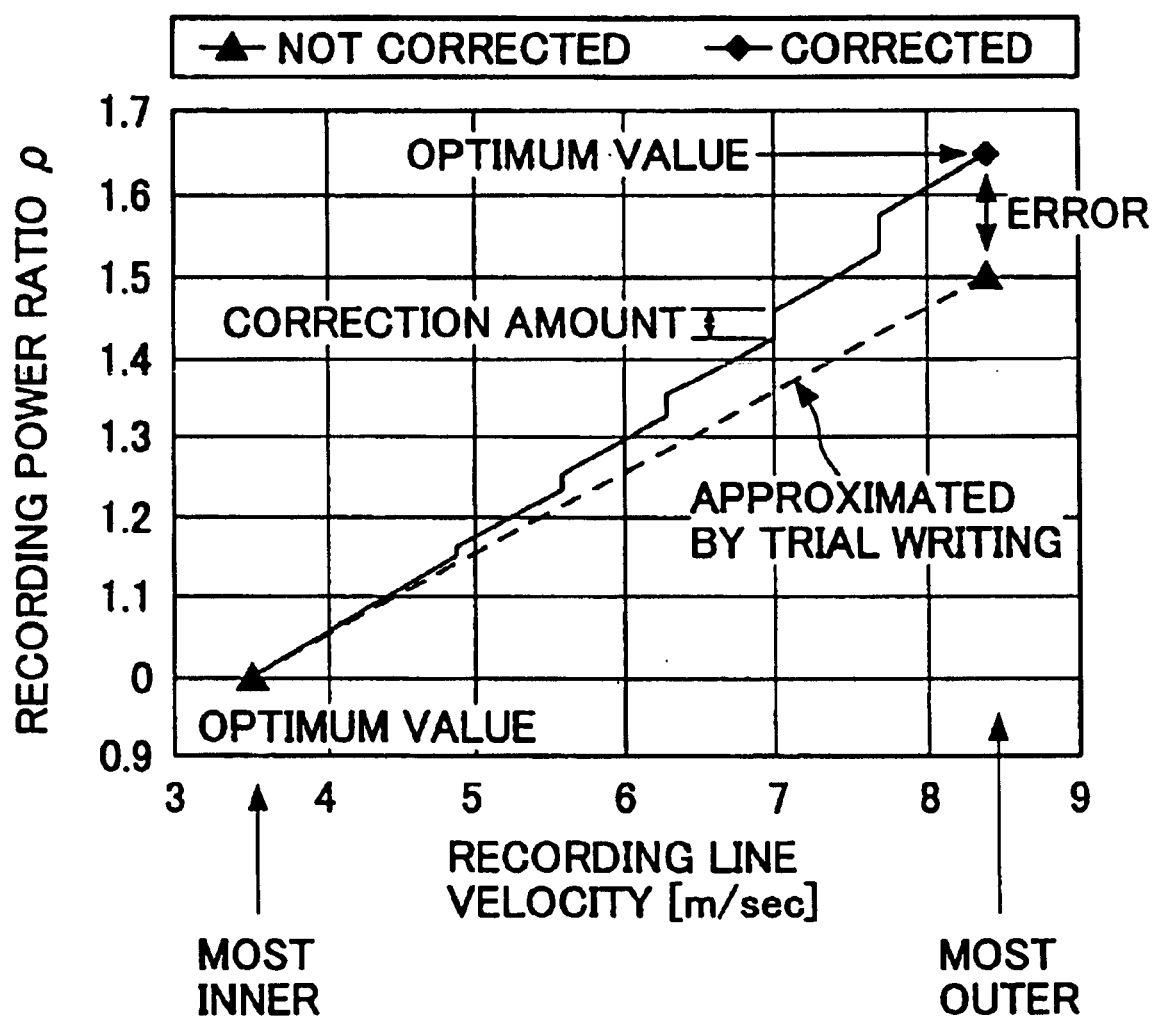
FIG. 30 illustrates the operation of the fourth embodiment of the present invention in which the recording power is corrected for each recording zone.

Thus, in actually recording a lot of data all over the optical disk medium 401, as shown in FIG. 30, the characteristic value of the reproduction signal is detected for each recording zone, and recording is performed with correction of the approximation formula. Thereby, even when the sensitivity varies throughout the recording area of the optical disk medium 401, and/or change in recording power occurs due to temperature characteristic and/or mechanical shift in the recording apparatus, or the like, the recording power can be approximately corrected into the currently optimum one, and, thereby, it becomes possible to perform recording throughout the optical disk medium 401 with satisfactory recording performance. Especially, for the disk peripheral (most outer) part, if recording were made only by using the approximation formula of the recording power obtained from the trial writing, jitter characteristic would get worse and exceed a permissible value in a time of reproduction due to a large recording power error (indicated by broken lines in FIGS. 27A and 27B). In contrast thereto, according to the present invention, as the approximation formula is corrected as described above, as shown in solid lines of FIGS. 27A and 27B, the allowable level of the jitter is not exceeded at all. Thus, according to the fourth embodiment of the present invention, while a fixed jitter level can be not exceeded, recording can be performed with change in 14T modulation degree (Modulation), 3T modulation degree (Resolution), or Asymmetry being well controlled.

The approximation formula for setting the recording power should be calculated according to characteristics of the optical disk medium 401 as described above, and, for this purpose, another manner, for example, linear approximation, or another polynominal approximation formula may also be used. The approximation formula thus obtained for the setting values are used according to the relevant recording line velocity. Therefore, the relevant recording line velocity should be determined from the address information obtained from demodulation of the above-mentioned wobble signal or LPP signal. In fact, specific addresses are predetermined for the range between the most inner position and most outer position, and have correspondences with the recording line velocities to be used.

Figure 31:
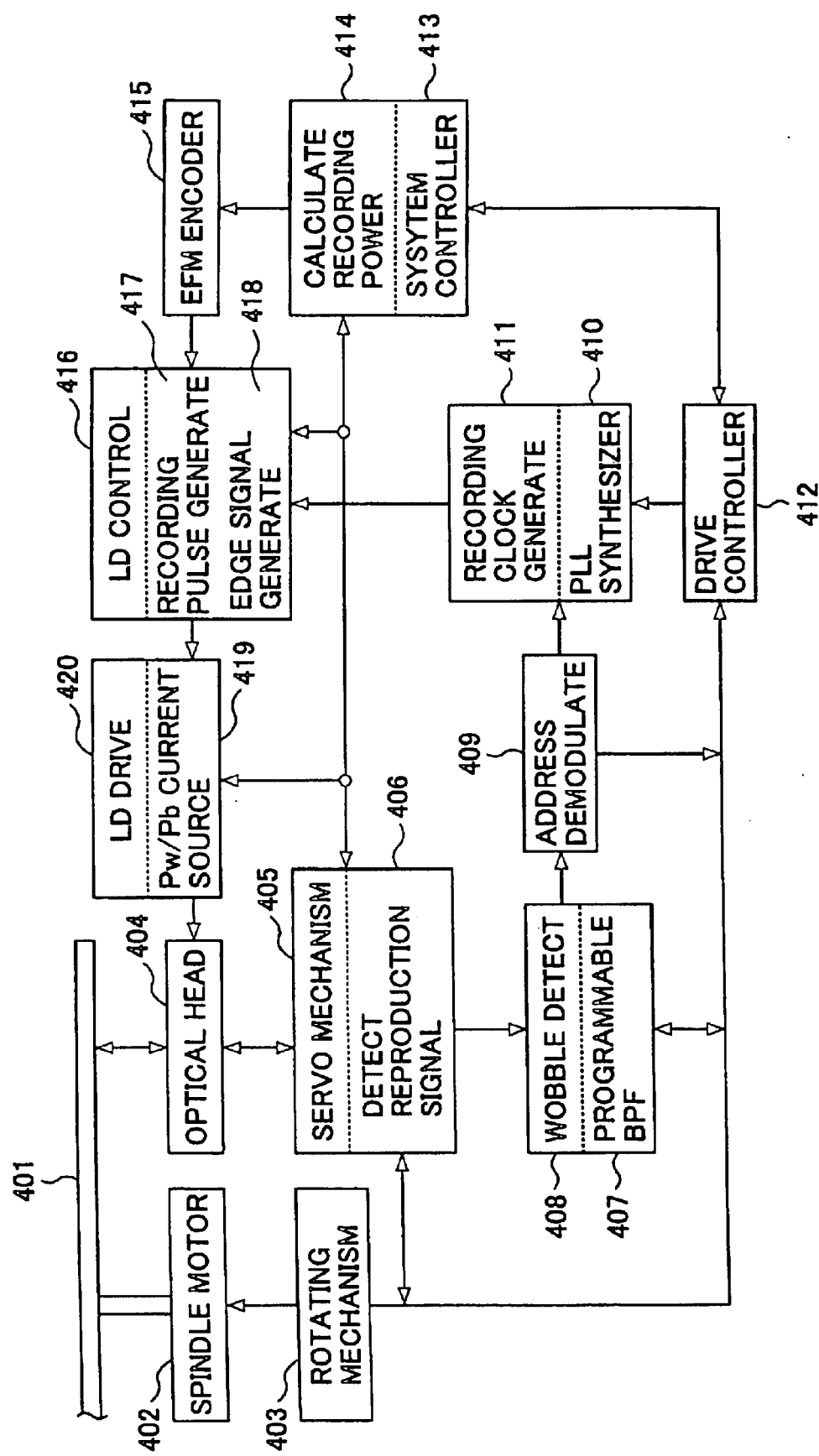
FIG. 31 shows a block diagram illustrating a general configuration of an optical disk apparatus according to the fourth embodiment of the present invention.

With reference to FIG. 31, an information recording apparatus in this fourth embodiment of the present invention for recording on the optical disk medium 401 according to the above-described method will now be described.

First, while a rotation mechanism 403 containing a spindle motor 402 which carries out rotation drive of this optical disk medium 401 is provided. An optical head 404 including a light source, such as a semiconductor laser, an objective lens, and so forth, is provided, for applying laser light to the disk medium 401, while the head 404 can perform seeking operation along a disk radial direction. A servomechanism 405 is connected to an objective lens driving device and an output system of the optical head 404.

Moreover, a reproduction signal detection part 406 performing reproduction operation, calculating the modulation degrees or asymmetries and so forth from the reproduction signal detected by the light-receiving device of the optical head 404 is provided. A wobble detection part 408 containing a programmable BPF 407 is connected to the servomechanism 405 and the reproduction signal detection part 406.

An address demodulation circuit 409 which demodulates addresses from the detected wobble signal is connected to the wobble detection part 408. A PLL synthesizer circuit 410 is provided in a recording clock generation part 411 which is connected with the address demodulation circuit 409. A drive controller 412 is connected to the PLL synthesizer circuit 410. The rotation mechanism 403, servomechanism 405, the reproduction signal detection part 406, the wobble detection part 408, and the address demodulation circuit 409 are also connected to this drive controller 412 which is connected to the system controller 413.

Moreover, a system controller 413 has a recording power calculation part 414, and, is connected to an EFM encoder 415, and to an LD controlling part 416 acting as a laser light source controlling part. This LD control part 416 contains an edge signal generation part 418 described later besides a recording pulse series generation part 417 which generates a heating multi-pulse control signal containing the above-mentioned head heating pulse and tail heating pulse.

An LD drive part 420 which is a driver circuit as a laser light source drive part to make the semiconductor laser in the optical head 4 drive by switching respective sources 419 of driving currents for the recording power Pw and bias power Pb is connected to the output side of LD control part 416.

In such a configuration, the central frequency of the BPF 407 corresponding to the recording line velocity is set to the programmable BPF 407 by the drive controller 412. Then, while carrying out address demodulation by the address demodulation circuit 409 from the wobble signal detected by the wobble detection part 408, the recording channel clock signal for each recording line velocity is generated by the PLL synthesizer circuit 410 having the basic clock frequency thereof changed by the drive controller 412, and it is provided to the recording pulse series generation part 417.

In order to generate the recording pulses from the semiconductor laser, the recording channel clock signal and the EFM data which is record information are respectively input into the recording pulse series generation part 417 from the recording clock generation part 411 and the EFM encoder 415, and the recording pulse control signals for the recording pulses which contain the head heating pulse, tail heating pulse, and intermediate heating multi-pulse series are generated by the recording pulse series generation part 417.

Figure 23:
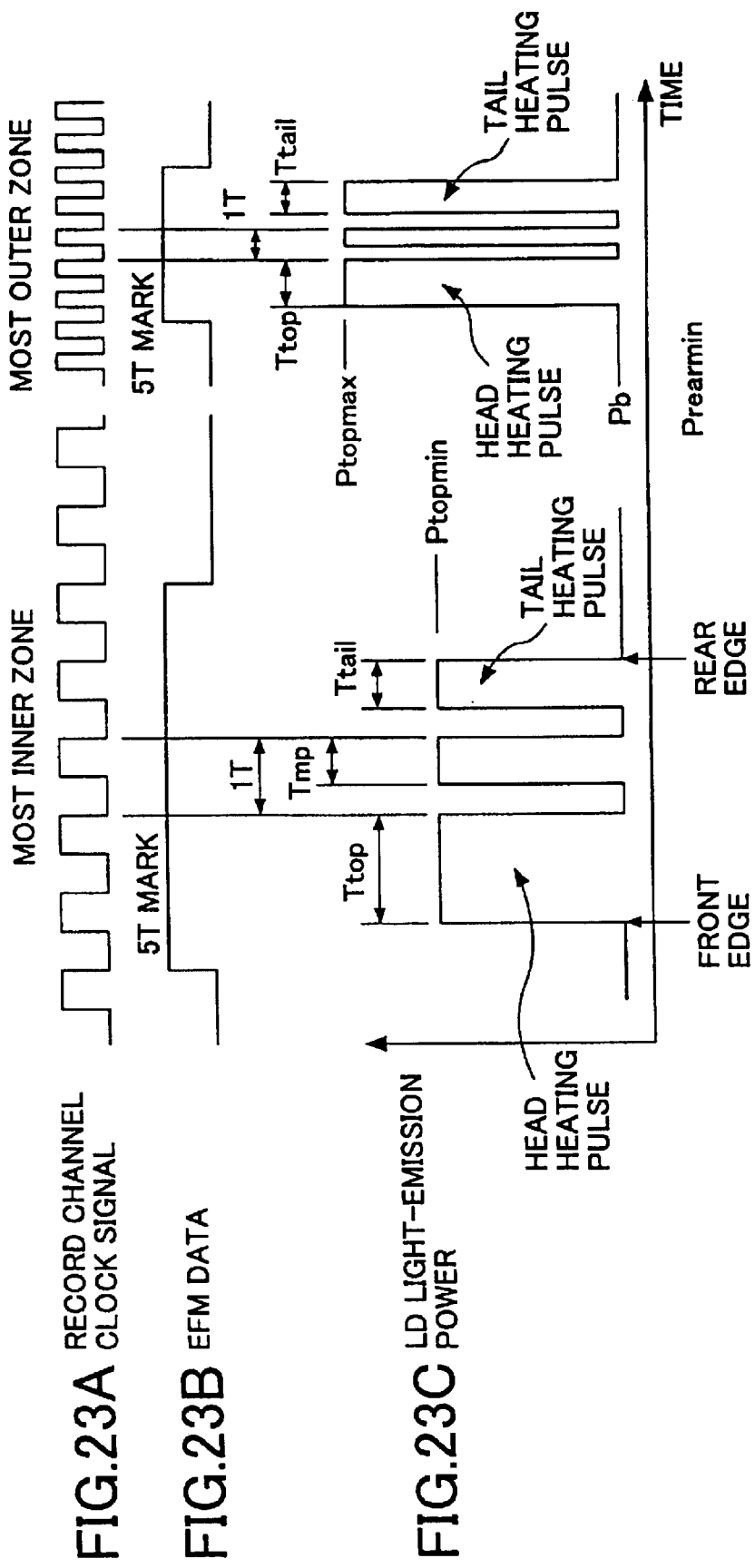
FIGS. 23A through 23C show waveforms illustrating recording pulse series including a head heating pulse and subsequent heating pulses in relationship with other signals according to a fourth embodiment of the present invention.

The respective sources 419 of driving currents for the recording power Pw and the bias power Pb are appropriately switched by the LD drive part 420. The semiconductor laser is made to emit light by the bias power Pb corresponding to reproduction power constantly by the source of bias current at a time of recording, and, a laser light-emission waveform of the recording pulses as shown in FIG. 23C is provided from the recording pulse control signal-generated in the above-mentioned recording pulse series generation part 417.

In this embodiment, as a front edge signal generation part for the head heating pulse, in the edge signal generation part 418, a multi-stage delay circuit having a delay amount of approximately 0.5 ns employing gate devices is provided. There, after being input into an edge selector having a configuration of a multiplexer, the recording pulse control signal (front edge signal) for the head heating pulse which controls the front edge position by the edge pulse selected by the system controller 413 is generated. Similarly, a multi-stage delay device having a delay amount of approximately 0.5 ns employing gate devices is provided, in an edge signal generation part in the edge signal generation part 418 which controls the rear edge position of the tail heating pulse. There, after being input into an edge selector, the recording pulse control signal (rear edge signal) for the tail heating pulse is generated by the edge pulse selected by the system controller 413.

Such a configuration determines each setting value as described above, the optimum edge pulse is selected for a relevant recording line velocity, and thus, the proper recording pulse is generated. As the recording pulse generated by this configuration is updated at predetermined intervals, each setting value changes as shown in FIG. 24. Further, in case the multi-stage delay device is used, during an interval between successive updating, each pulse width is fixed, and, as the recording channel clock signal changes, the ratio of the pulse widths and duty are changed accordingly.

As another example of this embodiment, instead of the multi-stage delay devices for the head heating pulse and tail end heating pulse in the edge signal generation part 418, a pulse edge generation part having a PLL configuration emptying a phase comparator, a loop filter, a VCO (voltage controlled oscillator), and a frequency divider may be used. In this configuration, the frequency of the recording channel clock signal is multiplied by 20, and, the thus-obtained high-resolution clock signal is generated by the PLL, and, thus, the pulse edge signal has a resolution of 0.05T, i.e., approximately in a range between 1.9 ns and 0.8 ns. After this multi-stage pulse edge signal is input into an edge selector having a multiplexer configuration, the front edge signal which controls the front edge position of the head heating pulse by the edge pulse selected by the system controller 413 is generated. Similarly, a pulse edge generation part of a PLL configuration is provided in an edge pulse generation circuit of the edge signal generation part 418 which controls the rear edge position of the tail heating pulse. There, after being input into an edge selector, the rear edge signal which controls the rear edge position of the tail heating pulse is generated by the edge pulse selected by the system controller 413.

By such a configuration, each setting value is determined as described above, the optimum edge pulse is selected for each recording line velocity, and thus, a desired recording pulse is generated. In case the thus-generated recording pulse is updated at predetermined intervals, each setting value changes stepwise in a saw-teeth manner. Then, in case the edge pulse generation part of PLL configuration described above is used, each of the ratios of the pulse widths Ttop and Ttail are fixed even the recording clock signal changes in frequency changes during an interval between successive updating.

According to the fourth embodiment of the present invention, for any of these configurations, uniform recording is possible at a time of CAV recording, and various circuit configurations may be used for the recording pulse generation part. Thus, according to the fourth embodiment of the present invention, recording according to CAV control including updating of setting values of the ratio of pulse width of the head heating pulse Ttop, the ratio of the pulse width of the tail heating pulse Ttail, and the recording power ratio ρ can be performed, by a simple and small-scale circuit configuration.

As described above, after trial writing (OPC) at the minimum recording line velocity and the maximum recording line velocity using the trial writing zone of the optical disk medium 401 is performed, reproduction signal detection part 406 connected to the optical head 404 detects the 3T and 14T mark and space levels of the RF signal, and the asymmetry or the degrees of modulation (Modulation), and the approximation formulas thereof are calculated by the system controller 413. Then, the system controller 413 calculates the basic approximation formula (first approximation formula) for each pulse width and recording power for the recording line velocity, divides the recording area into a plurality of recording zones according to data amounts to be recorded, and calculates address ranges for the respective recording zones individually.

The interval of updating the pulse width and recording power setting values for the first recording zone (the most inner recording zone), and the corresponding address range are allocated, and the pulse widths and recording powers are calculated for the updating interval in the first recording zone. While performing recording according to CAV control, the address demodulation circuit 409 reads the current address from the preformat information of the disk 401, and, it is determined whether or not it is within the range of updating the setting values, i.e., the address range, by the system controller 413. When the current address is out of the updating range, the newly calculated setting values are set, and recording is performed continuously.

Immediately after completing recording onto the current recording zone, recording operation is once interrupted under control by the system controller 413. Then, by a tracking servo unit contained in the servomechanism 405, the last track of the recording-finished recording zone is jumped back to, and reproduction is performed thereon. Then, therefrom, detection of the asymmetry or the modulation degree (Modulation) is performed by the reproduction signal detection part 406. Next, by the recording power calculating part 414 of the system controller 413, from the recording-power dependency (through the above-described Asy or Mod approximation formula) in the OPC, a difference from the optimum recording power ΔPw is calculated. Then, by the amount of ΔPw, the basic approximation formula for setting the recording power is corrected for the subsequent recording zone.

By using the thus-obtained approximation formula (referred to as a second approximation formula) for setting the recording power, under control by the system controller 413, recording operation is restarted from the starting edge part of the subsequent recording zone, and, then, the same operation is repeated. Thereby, the modulated data of the recording information can be continuously recorded across the terminus part of each recording zone and the starting, edge part of the subsequent recording zone.

Figure 32:
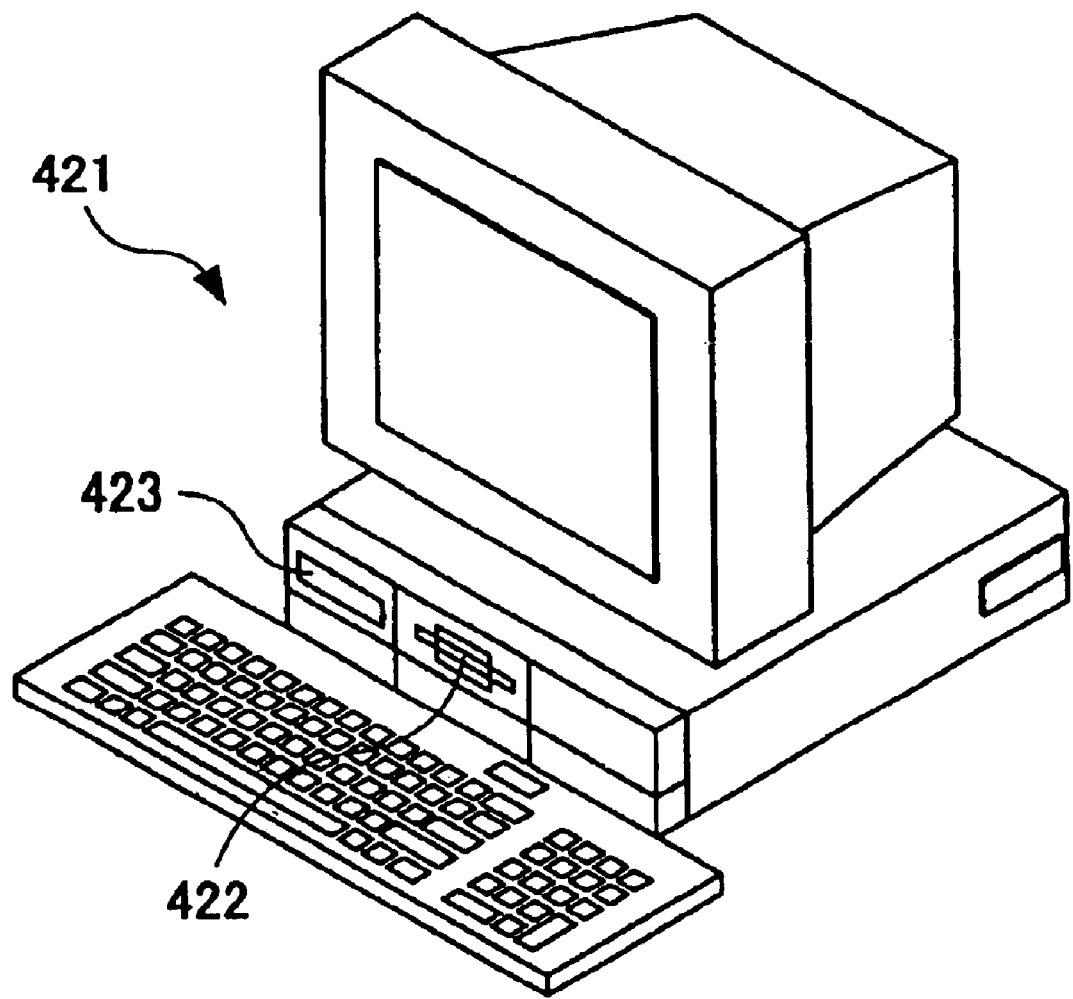
FIG. 32 illustrates a general perspective view illustrating an example of application the fourth embodiment of the present invention to a personal computer.

As shown in FIG. 32, an application of each of the above-described embodiments of the present invention to a general-purpose computer such as a personal computer 421 will now be described. This computer 421 includes an DVD-R drive 423 besides a 3.5-inch-type FD drive 422 built therein. The DVD-R drive 423 acts as the information recording apparatus according to the above-described relevant embodiment of the present invention.

Since the information recording apparatus 423 is built in the personal computer 421, when information is recorded into an optical disk medium by using the recording pulse series which includes the head heating pulse and successive heating pulses containing the tail heating pulse, while the optical disk medium is rotated, it is possible to perform recording onto the optical disk medium with signal characteristic uniform throughout the recording area thereof according to the CAV manner, while the compatibility with the conventional recording format for media only for reproduction is maintained, without performing variable velocity control of the rotation speed of the optical disk medium.

Especially in case a lot of data is recorded on the optical disk medium, the optical disk medium may be divided concentrically into a plurality of recording zones in consideration of difference between the data transfer rate from the personal computer body 421 to the information recording apparatus 423 and the data recording rate of the information recording apparatus 423 itself, and thus, control should be made such that recording operation is interrupted and resumed across the thus-divided different recording zones. Even in such a case, throughout all over the optical disk medium, recording with uniform signal characteristic can be performed, and, thus, the information recording apparatus 423 can be effectively used together with the personal computer body 421.

Further, the present invention is not limited to the above-described embodiments, and variations and modifications may be made without departing from the scope of the present invention.

The present application is based on Japanese priority applications Nos. 2000-360017, 2000-362367, 2000-348777 and 2001-003409, filed on Nov. 27, 2000, Nov. 29, 2000, Nov. 15, 2000 and Jan. 11, 2001, respectively, the entire contents of which are hereby incorporated by reference.

What is claimed is:

1. An information recording apparatus of performing optical recording onto a recording medium with a record mark by using a light beam modulated in a manner of multi-pulse series, comprising:

a detection pulse generating part generating a detection pulse to replace a multi-pulse series; and a detection power control part controlling the power of the detection pulse to be smaller than the power of the multi-pulse series.

2. The apparatus as claimed in claim 1, further comprising a recording power setting part setting the power of the multi-pulse series such that a ratio in power between the detection pulse and multi-power series may be fixed.

3. The apparatus as claimed in claim 2, wherein said ratio of power of the detection pulse to the multi-pulse series is in a range of 0.6 and 0.9.

4. The apparatus as claimed in claim 1, wherein said power control part controls the power of recording pulses by using a recording-condition information value obtained by normalizing an output value of a photodetector which receives reflected light from the recording medium during recording operation, by luminous energy currently emitted by a light-emitting device to the recording medium.

5. The apparatus as claimed in claim 1, wherein said detection pulse generating part replaces mark data of multi-pulse series by the detection pulse.

6. The apparatus as claimed in claim 1, further comprising:

a medium-type detecting part detecting a type of the recording medium loaded; and a selection part selecting as to whether a single pulse or a multi-pulse series is used for forming each record mark.

7. The apparatus as claimed in claim 6, wherein said detection level control part controls so that the power of the detection pulse is approximately the same as that of normal recording pulses when said selection part determines that a single pulse is used for forming each record mark, but the power of the detection pulse is smaller than that of normal recording pulses when said selection part determines that multi-pulse series is used for forming each record mark.

8. An information recording apparatus of performing optical recording onto a recording medium with a record mark by using a light beam modulated in a manner of multi-pulse series, comprising:

a detection pulse generating part generating a detection pulse to replace a multi-pulse series;

a trial writing part performing trial writing onto a predetermined zone of the recording medium by using a plurality of different powers applied in sequence; and a detection power control part controlling the power of the detection pulse according to a light-reception signal obtained from record data recorded onto the recording medium by said trial writing part.

9. The apparatus as claimed in claim 8, further comprising a recording power setting part setting the power of multi-pulse series according to a light-reception signal obtained from record data recorded onto the recording medium by said trial writing part but different from the record data used by said detection power control part in position on the predetermined zone prepared for trial writing.

10. The apparatus as claimed in claim 9, wherein said trial writing part performs the trial writing in such a manner that:

power is changed stepwise for trial writing onto a first portion of the predetermined zone for said detection power control part;

power is changed stepwise for trial writing onto a second portion of the predetermined zone for said recording power setting part; and said first and second portions are adjacent in position.

11. The apparatus as claimed in claim 9, wherein said trial writing part performs the trial writing in such a manner that:

power is changed stepwise for trial writing onto first portions of the predetermined zone for a use by said detection power control part;

power is changed stepwise for trial writing onto second portions of the predetermined zone for a use by said recording power setting part; and said first and second portions are arranged alternately one by one in position.

12. The apparatus as claimed in claim 8, wherein said trial writing part performs trial writing in such a manner that:

trial writing is performed onto a first portion of the predetermined zone;

trial writing is performed onto a second portion of the predetermined zone;

trial writing is performed onto a third portion of the predetermined zone; and the power to be used for the trial writing onto the third portion is adjusted based on at least a light-reception signal obtained from the record data of the trial writing recorded onto one of the first and second portions.

13. The apparatus as claimed in claim 12, wherein the trial writing part performs trial writing in such a manner that:

multi-pulse series is used for performing trial writing onto the second and third portions of the predetermined zone; and the thus-used multi-pulse series are replaced by the detection pulses at a predetermined frequency or all of the multi-pulse series are replaced by the detection pulses.

14. The apparatus as claimed in claim 12, wherein the trial writing part performs trial writing in such a manner that:

trial writing onto all of the first, second and third portions is performed at a stretch.

15. The apparatus as claimed in claim 12, wherein the trial writing part performs trial writing in such a manner that:

a target value for the light-reception signal to be used for recording onto the recording medium is determined based on the light-reception signal in trial writing performed onto the third portion of the predetermined zone.

16. The apparatus as claimed in claim 9, wherein at least one of the power of the detection pulse and a ratio in power between the detection pulse and multi-pulse series obtained based on the light-reception signal obtained from the trial writing is stored as recording-condition information in the recording medium.

17. An information recording apparatus of performing optical onto a recording medium recording with a record mark by using a light beam modulated in a manner of multi-pulse series, comprising:

a detection pulse generating part generating a detection pulse to partially replace the multi-pulse series; and a power control part controlling the powers of the detection pulse and multi-pulse series according to data of at least one of the powers of the detection pulse and multi-pulse series or a ratio therebetween previously recorded as recording management information on the recording medium.

18. A recording medium to which information can be recorded, comprising recording management information recorded therein, said recording management information comprising data of at least one of powers of a detection pulse and multi-pulse series or a ratio therebetween.

19. An information recording apparatus of performing optical recording onto a recording medium with a record mark by using a light beam modulated in a manner of multi-pulse series, comprising:

a detection pulse generating part generating a detection pulse to replace a multi-pulse series;

a trial writing part performing trial writing onto the recording medium by using a plurality of different powers applied in sequence;

a calculating part calculating modulation degrees for the detection pulse based on a light-reception signal obtained from record data recorded on the recording medium by said trial writing part; and a detection power control part controlling the power of the detection pulse based on the thus-obtained modulation degrees.

20. The apparatus as claimed in claim 19, wherein said detection power control part determines the power such that the modulation degree obtained from the record data made by said trial writing part by said trial power may fall in a range between 0.5 and 0.8 as an optimum power.

21. The apparatus as claimed in claim 19, wherein said detection power control part controls the power of the detection pulse based on a change of the modulation degree with respect to the relevant power applied.

22. The apparatus as claimed in claim 21, wherein said detection power control part determines the power such that the change of the modulation degree obtained from the record data made by said trial writing part with respect to the power applied may fall in a range between 1.0 and 2.0 as an optimum power.

23. The apparatus as claimed in claim 19, further comprising:

a recording modulation calculation part obtaining the modulation degrees for the multi-pulse series based on the light-reception signal; and a recording power control part controlling the power of the multi-pulse series based on the thus-obtained modulation degrees.

24. The apparatus as claimed in claim 23, wherein said detection power control part determines such a power as an optimum power of the detection pulse as that resulting in the modulation degree approximately equal to the modulation degree obtained for the multi-pulse series by said recording modulation calculating part.

25. The apparatus as claimed in claim 23, wherein:

said detection power control part obtains a change of the modulation degree obtained by said calculation part with respect to the relevant power applied; and said recording power control part obtains a change of the modulation degree obtained by said recording modulation calculation part with respect to the relevant power applied; and said detection power control part determines such a power as an optimum power of the detection pulse as that resulting in the change of the modulation degree with respect to the power applied approximately equal to the change of the modulation degree obtained for the multi-pulse series by said recording modulation calculating part with respect to the power applied.

26. The apparatus as claimed in claim 23, wherein said recording power control part controls the power of multi-pulse series so that a ratio thereof to the power of the detection pulse controlled by said detection power control part may fall in a predetermined fixed value.

27. The apparatus as claimed in claim 26, wherein said recording power control part controls the power of multi-pulse series so that a ratio in power of an optimum value for the multi-pulse series obtained thereby to an optimum value for the detection pulse obtained by said detection power control part may fall in the predetermined fixed value.

28. An information recording method of performing optical recording onto a recording medium with a record mark by using a light beam modulated in a manner of multi-pulse series, comprising the steps of:

a) generating a detection pulse to replace a multi-pulse series;

b) performing trial writing onto the recording medium by using a plurality of different powers applied in sequence;

c) calculating modulation degrees for the detection pulse based on a light-reception signal obtained from record data made by said step b); and d) controlling the power of the detection pulse based on the thus-obtained modulation degrees.

29. The method as claimed in claim 28, wherein said step d) determines the power such that the modulation degree obtained from the record data made by said trial writing part by said power may fall in a range between 0.5 and 0.8 as an optimum power.

30. The method as claimed in claim 28, wherein said step d) controls the power of the detection pulse based on a change of the modulation degree with respect to the power applied.

31. The method as claimed in claim 30, wherein said step d) determines the power such that the change of the modulation degree obtained from the record data made by said step b) with respect to the relevant power applied may fall in a range between 1.0 and 2.0 as an optimum power.

32. The method as claimed in claim 28, further comprising the steps of:

e) obtaining the modulation degree for the multi-pulse series based on the light-reception signal; and f) controlling the power of the multi-pulse series based on the thus-obtained modulation degrees.

33. The method as claimed in claim 32, wherein said step d) determines such a power as an optimum power of the detection pulse as that resulting in the modulation degree approximately equal to the modulation degree obtained for the multi-pulse series by said step e).

34. The method as claimed in claim 32, wherein:

said step d) obtains a change of the modulation degree obtained by said step c) with respect to the power applied; and said step f) obtains a change of the modulation degree obtained by said step e) with respect to the power applied; and said step d) determines such a power as an optimum power for the detection pulse as that resulting in the change of the modulation degree with respect to the power applied approximately equal to the change of the modulation degree obtained for the multi-pulse series obtained by step e) with respect to the power applied.

35. The method as claimed in claim 32, wherein said step f) controls the power of multi-pulse series so that a ratio thereof to the power of the detection pulse controlled by said step d) may fall in a predetermined fixed value.

36. The method as claimed in claim 35, wherein said step f) controls the power of the multi-pulse series so that a ratio in power of an optimum value for the multi-pulse series obtained thereby to an optimum value for the detection pulse obtained by said step d) may fall in the predetermined fixed value.

* * * * *